United States Patent
Kawamura et al.

(10) Patent No.: US 12,386,157 B2
(45) Date of Patent: Aug. 12, 2025

(54) IMAGING LENS AND IMAGING APPARATUS

(71) Applicant: FUJIFILM Corporation, Tokyo (JP)

(72) Inventors: Daiki Kawamura, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/496,189

(22) Filed: Oct. 27, 2023

(65) Prior Publication Data

US 2024/0077707 A1 Mar. 7, 2024

Related U.S. Application Data

(63) Continuation of application No. 17/155,283, filed on Jan. 22, 2021, now Pat. No. 11,841,486.

(30) Foreign Application Priority Data

Jan. 29, 2020 (JP) ................................. 2020-012799
Dec. 28, 2020 (JP) ................................. 2020-219164

(51) Int. Cl.
G02B 15/14 (2006.01)
G02B 15/20 (2006.01)
G02B 27/00 (2006.01)

(52) U.S. Cl.
CPC ......... G02B 15/1421 (2019.08); G02B 15/20 (2013.01); G02B 27/0025 (2013.01)

(58) Field of Classification Search
CPC ................ G02B 15/1421; G02B 15/20; G02B 27/0025; G02B 7/04; G02B 9/12;

(Continued)

(56) References Cited

U.S. PATENT DOCUMENTS 4,852,984 A * 8/1989 Takahashi .............. G02B 13/02
359/740
7,944,625 B2 5/2011 Hatada
(Continued)

FOREIGN PATENT DOCUMENTS

JP 2015-141384 A 8/2015
JP 2015-172611 A 10/2015
(Continued)

OTHER PUBLICATIONS

An Office Action; "Notice of Reasons for Refusal," mailed by the Japanese Patent Office on Oct. 4, 2022, which corresponds to Japanese Patent Application No. 2020-219164 and is related to U.S. Appl. No. 17/155,283; with English language translation.
(Continued)

*Primary Examiner* — Thomas K Pham
*Assistant Examiner* — Kuei-Jen L Edenfield
(74) *Attorney, Agent, or Firm* — Studebaker Brackett PLLC

(57) ABSTRACT

An imaging lens includes a positive first lens group and a second lens group, which are continuous in order from the position closest to the object side, as lens groups. During focusing, the distance between the first lens group and the second lens group changes. A stop is disposed closer to the image side than a lens which is second from the object side. A combined refractive power of all lenses closer to the object side than the stop is positive. The imaging lens includes an LA positive lens and an LB positive lens that satisfy a predetermined conditional expression at a position closer to the object side than the stop. An Abbe number of the LB positive lens is the maximum among Abbe numbers of all positive lenses closer to the object side than the stop.

10 Claims, 61 Drawing Sheets

EXAMPLE 12

(58) Field of Classification Search
CPC . G02B 9/14; G02B 9/08; G02B 15/14; G02B 27/00; G02B 15/143; G02B 15/143101; G02B 15/143103; G02B 15/143105; G02B 7/09; G02B 7/105
USPC ....... 359/689, 690, 691, 692, 693, 698, 705, 359/739
See application file for complete search history.

(56) References Cited

U.S. PATENT DOCUMENTS

| | | |
|---|---|---|
| 2012/0293879 A1 | 11/2012 | Hayashi et al. |
| 2013/0155527 A1* | 6/2013 | Yoneyama ............... G02B 7/04 359/745 |
| 2014/0368926 A1 | 12/2014 | Suzuki |
| 2015/0002946 A1 | 1/2015 | Mori |
| 2015/0212302 A1 | 7/2015 | Suzuki |
| 2016/0274336 A1 | 9/2016 | Kawamura |
| 2017/0176709 A1 | 6/2017 | Fukuta |
| 2017/0293124 A1 | 10/2017 | Kawamura |
| 2018/0100988 A1* | 4/2018 | Kondo ................... G02B 9/14 |
| 2020/0301101 A1 | 9/2020 | Nomura |
| 2021/0231928 A1 | 7/2021 | Sashima et al. |

FOREIGN PATENT DOCUMENTS

| | | |
|---|---|---|
| JP | 2016-006469 A | 1/2016 |
| JP | 2016-173398 A | 9/2016 |
| JP | 2017-111275 A | 6/2017 |
| JP | 2017-215491 A | 12/2017 |
| JP | 2019-144477 A | 8/2019 |
| JP | 2019-219472 A | 12/2019 |

OTHER PUBLICATIONS

An Office Action; mailed by the Unites States Patent and Trademark Office on Dec. 26, 2024, which corresponds to U.S. Appl. No. 18/498,290 and is related to U.S. Appl. No. 18/496,189.

* cited by examiner

EXAMPLE 1

EXAMPLE 2

EXAMPLE 3

EXAMPLE 3

EXAMPLE 4

EXAMPLE 4

EXAMPLE 5

EXAMPLE 5

EXAMPLE 6

EXAMPLE 6

EXAMPLE 7

EXAMPLE 7

EXAMPLE 7

EXAMPLE 8

EXAMPLE 8

EXAMPLE 9

EXAMPLE 9

EXAMPLE 9

EXAMPLE 10

EXAMPLE 10

EXAMPLE 11

EXAMPLE 11

EXAMPLE 12

EXAMPLE 13

EXAMPLE 13

EXAMPLE 13

EXAMPLE 14

EXAMPLE 14

EXAMPLE 14

EXAMPLE 15

EXAMPLE 15

EXAMPLE 15

EXAMPLE 16

EXAMPLE 16

EXAMPLE 16

EXAMPLE 17

EXAMPLE 17

EXAMPLE 17

EXAMPLE 18

EXAMPLE 18

EXAMPLE 18

EXAMPLE 19

EXAMPLE 19

EXAMPLE 19

EXAMPLE 20

EXAMPLE 20

EXAMPLE 20

IMAGING LENS AND IMAGING APPARATUS

CROSS-REFERENCE TO RELATED APPLICATIONS

The present application is a Continuation of U.S. patent application Ser. No. 17/155,283, filed on Jan. 22, 2021, which claims priority under 35 U.S.C. § 119 to Japanese Patent Application No. 2020-012799, filed on Jan. 29, 2020, and Japanese Patent Application No. 2020-219164, filed on Dec. 28, 2020, the contents of which are hereby expressly incorporated herein by reference in their entirety.

BACKGROUND OF THE INVENTION

1. Field of the Invention

The present disclosure relates to an imaging lens and an imaging apparatus.

2. Description of the Related Art

Conventionally, as an imaging lens that can be used in an imaging apparatus such as a digital camera, imaging lenses described in JP2015-141384A and JP2016-173398A below are known.

SUMMARY OF THE INVENTION

In recent years, there has been a demand for a suitable imaging lens which has a small F number and in which various aberrations are satisfactorily corrected.

The present disclosure has been made in consideration of the above-mentioned situation, and its object is to provide a suitable imaging lens, which has a small F number and in which various aberrations are satisfactorily corrected, and an imaging apparatus comprising the imaging lens.

According to an aspect of the present disclosure, there is provided an imaging lens comprising, as lens groups, successively in order from a position closest to an object side to an image side: a first lens group that has a positive refractive power; and a second lens group that has a refractive power, in which during focusing, a distance between the first lens group and the second lens group changes, and mutual distances between all lenses in the first lens group and mutual distances between all lenses in the second lens group are constant, a stop is disposed closer to the image side than a lens which is second from the object side, a combined refractive power of all lenses closer to the object side than the stop is positive, at least one LA positive lens and at least one LB positive lens are provided closer to the object side than the stop, an Abbe number of the LB positive lens based on a d line is a maximum of Abbe numbers of all the positive lenses closer to the object side than the stop based on the d line, a refractive index of the LA positive lens at the d line is NdA, an Abbe number of the LA positive lens based on the d line is vdA, and assuming that the Abbe number of the LB positive lens based on the d line is vdB, Conditional Expressions (1), (2), and (3) are satisfied.

$$1.86 < NdA < 2.2 \quad (1)$$

$$10 < vdA < 35 \quad (2)$$

$$57 < vdB < 105 \quad (3)$$

It is preferable that the imaging lens according to the aspect of the present disclosure satisfies at least one of Conditional Expression (1-1), (2-1), or (3-1).

$$1.88 < NdA < 2.15 \quad (1\text{-}1)$$

$$13.5 < vdA < 31 \quad (2\text{-}1)$$

$$62 < vdB < 92 \quad (3\text{-}1)$$

It is preferable that the first lens group includes at least two positive lenses and at least two negative lenses.

It is preferable that the second lens group includes at least two positive lenses and at least two negative lenses.

It is preferable that the first lens group remains stationary with respect to an image plane and the second lens group moves during focusing.

It is preferable that only one lens group moves during focusing. In that case, it is preferable that the lens group that moves during focusing is only the second lens group.

It is preferable that the first lens group includes at least two negative lenses. Assuming that an average value of Abbe numbers of two negative lenses based on the d lines is vdn1 here the two negative lenses are selected from negative lenses having smaller Abbe numbers based on the d line among the negative lenses included in the first lens group, it is preferable that the imaging lens of the present disclosure satisfies Conditional Expression (4), and it is more preferable that the imaging lens satisfies Conditional Expression (4-1).

$$15 < vdn1 < 28 \quad (4)$$

$$16 < vdn1 < 25 \quad (4\text{-}1)$$

It is preferable that during focusing, the first lens group remains stationary with respect to an image plane, and the first lens group includes at least one LA positive lens.

In the imaging lens according to the aspect of the present disclosure, assuming that a sum of a distance on an optical axis from a lens surface closest to the object side to a lens surface closest to the image side and a back focal length at an air-converted distance in a state where an object at infinity is in focus is TL, an F number of the imaging lens in the state where the object at infinity is in focus is FNo, and a focal length of the imaging lens in the state where the object at infinity is in focus is f, it is preferable that Conditional Expression (5) is satisfied.

$$1.5 < TL \times FNo/f < 5 \quad (5)$$

It is preferable that the imaging lens according to the aspect of the present disclosure comprises, in order from an object side to an image side, as lens groups, only two lens groups consisting of the first lens group that remains stationary with respect to an image plane during focusing and the second lens group that moves during focusing, or comprises, in order from the object side to the image side, as lens groups, only three lens groups consisting of the first lens group that remains stationary with respect to the image plane during focusing, the second lens group that moves during focusing, and a third lens group that consists of two or less lenses and remains stationary with respect to the image plane during focusing.

The second lens group may be a lens group having a positive refractive power.

It is preferable that the first lens group includes at least three negative lenses.

It is preferable that the second lens group includes at least two positive lenses and at least three negative lenses.

The imaging lens according to the aspect of the present disclosure may be configured such that, in a case where one lens component is one single lens or one cemented lens, among the lens component closest to the object side and the lens component which is second from the object side, one lens component has a negative refractive power and the other lens component has a positive refractive power, and on-axis ray emitted from a lens surface closest to the image side in the one lens component having a negative refractive power to the image side in a state where the object at infinity is in focus is divergent light.

It is preferable that at least one of the lens closest to the object side or a lens which is second from the object side is a negative lens of which the object side lens surface has a concave shape.

It is preferable that the lens closest to the object side is a negative lens.

It is preferable that the imaging lens according to the aspect of the present disclosure comprises, successively in order from the position closest to the object side: a single lens that has a negative refractive power, a single lens that has a positive refractive power, and a single lens that has a positive refractive power.

It is preferable that the object side lens surface of the lens closest to the object side has a concave shape.

It is preferable that the imaging lens according to the aspect of the present disclosure comprises at least one LC positive lens closer to the object side than the stop, in which the LC positive lens is a positive lens having a maximum or second largest Abbe number based on the d line among all positive lenses closer to the object side than the stop, and assuming that the Abbe number of the LC positive lens based on the d line is vdC, Conditional Expression (6) is satisfied.

$$57 < vdC < 102 \tag{6}$$

Assuming that a minimum value of refractive indexes of all positive lenses closer to the object side than the stop at the d line is Ndfm, it is preferable that the imaging lens according to the aspect of the present disclosure satisfies Conditional Expression (7).

$$1.46 < Ndfm < 1.72 \tag{7}$$

It is preferable that the stop is disposed in a lens group which remains stationary with respect to an image plane during focusing, or the stop is disposed between the lens groups.

It is preferable that the stop is disposed between the first lens group and the second lens group, and the first lens group and the stop remain stationary with respect to an image plane and the second lens group moves during focusing.

It is preferable that the second lens group moves during focusing, and the number of lenses included in the second lens group is preferably 7 or less, more preferably 6 or less, and yet more preferably 5 or less.

The number of lenses disposed closer to the object side than the stop is preferably 8 or less, more preferably 7 or less.

The number of lenses included in the imaging lens according to the aspect of the present disclosure is preferably 13 or less, and more preferably 12 or less.

The imaging lens according to the aspect of the present disclosure comprises at least two positive lenses closer to the image side than the stop, in which assuming that an average value of the refractive indexes of all positive lenses closer to the image side than the stop at the d line is Ndpr, it is preferable that Conditional Expression (8) is satisfied.

$$1.77 < Ndpr < 2.15 \tag{8}$$

It is preferable that during focusing, the second lens group moves, and the second lens group includes at least one positive lens, and assuming that an average value of refractive indexes of all the positive lenses in the second lens group at the d line is Nd2p, it is preferable that the imaging lens according to the aspect of the present disclosure satisfies Conditional Expression (9).

$$1.7 < Nd2p < 2.2 \tag{9}$$

It is preferable that the second lens group moves during focusing, and the second lens group includes at least two cemented lenses.

It is preferable that three positive lenses are successively arranged in the first lens group. It is more preferable that four positive lenses are successively arranged in the first lens group.

Assuming that a focal length of the first lens group is f1, and a focal length of the imaging lens in a state where an object at infinity is in focus is f, it is preferable that the imaging lens according to the aspect of the present disclosure satisfies Conditional Expression (10).

$$0.5 < f1/f < 3.5 \tag{10}$$

Assuming that a maximum half angle of view of the imaging lens in a state where an object at infinity is in focus is ω max, and an F number of the imaging lens in the state where the object at infinity is in focus is FNo, it is preferable that the imaging lens according to the aspect of the present disclosure satisfies Conditional Expression (11).

$$1.8 < 1/\{\tan(\omega\ max) \times FNo\} < 4.5 \tag{11}$$

It is preferable that the second lens group moves during focusing. Assuming that a focal length of the second lens group is f2, and a focal length of the imaging lens in a state where the object at infinity is in focus is f, it is preferable that the imaging lens according to the aspect of the present disclosure satisfies Conditional Expression (12).

$$0.3 < |f2|/f < 2.2 \tag{12}$$

Assuming that a focal length of the first lens group is f1, and a focal length of the second lens group is f2, it is preferable that the imaging lens according to the aspect of the present disclosure satisfies Conditional Expression (13).

$$1 < f1/f2 < 5 \tag{13}$$

It is preferable that the second lens group moves during focusing. Assuming that a lateral magnification of the second lens group in the state where an object at infinity is in focus is β2, and a combined lateral magnification of all lenses closer to the image side than the second lens group in a state where the object at infinity is in focus is βr in a case where a lens is disposed closer to the image side than the second lens group, and βr is set to 1 in a case where no lens is disposed closer to the image side than the second lens group, it is preferable that the imaging lens according to the aspect of the present disclosure satisfies Conditional Expression (14).

$$0.3 < |(1-\beta2^2) \times \beta r^2| < 1.5 \tag{14}$$

Assuming that a distance on an optical axis from a lens surface closest to the object side to the stop in a state where an object at infinity is in focus is Tf, and a sum of a distance on an optical axis from a lens surface closest to the object side to a lens surface closest to the image side and a back focal length at an air-converted distance in the state where the object at infinity is in focus is TL, it is preferable that the imaging lens according to the aspect of the present disclosure satisfies Conditional Expression (15).

$$0.2 < Tf/TL < 0.65 \tag{15}$$

It is preferable that the first lens group includes, successively in order from the position closest to the object side, a first unit which has a negative refractive power and a second unit which is separated from the first unit by a maximum air distance on an optical axis in the first lens group and has a positive refractive power, and the second unit consists of one single lens or one cemented lens. Assuming that a focal length of the imaging lens in a state where an object at infinity is in focus is f, and a combined focal length of all lenses closer to the image side than the second unit of the imaging lens in the state where the object at infinity is in focus is fm, it is preferable that the imaging lens according to the aspect of the present disclosure satisfies Conditional Expression (16).

$$0.7 < f/fm < 0.98 \quad (16)$$

In a case where the first lens group includes the first unit and the second unit, it is preferable that the first unit consists of one negative lens, and the second unit consists of one positive lens.

Assuming that a partial dispersion ratio between a g line and an F line of the LA positive lens is θgFA, it is preferable that the imaging lens according to the aspect of the present disclosure satisfies Conditional Expression (17).

$$0.01 < \theta gFA + 0.00162 \times vdA - 0.64159 < 0.06 \quad (17)$$

Assuming that a partial dispersion ratio of the LB positive lens between a g line and an F line is θgFB, it is preferable that the imaging lens according to the aspect of the present disclosure satisfies Conditional Expression (18).

$$0.01 < \theta gFB + 0.00162 \times vdB - 0.64159 < 0.05 \quad (18)$$

It is preferable that the first lens group includes at least two negative lenses. Assuming that an average value of Abbe numbers of two negative lenses based on the d lines is vdn1 where the two negative lenses are selected from negative lenses having smaller Abbe numbers based on the d line among the negative lenses included in the first lens group, and an average value of partial dispersion ratios of two negative lenses between a g line and an F line is θgFn1 where the two negative lenses are selected from the negative lenses having smaller Abbe numbers based on the d line among the negative lenses included in the first lens group, it is preferable that the imaging lens according to the aspect of the present disclosure satisfies Conditional Expression (19).

$$0.01 < \theta gFn1 + 0.00162 \times vdn1 - 0.64159 < 0.05 \quad (19)$$

The imaging apparatus of the present disclosure includes the imaging lens according to the aspect of the present disclosure.

In the present specification, it should be noted that the terms "consisting of ~" and "consists of ~" mean that the lens may include not only the above-mentioned elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In addition, the term "~ group that has a positive refractive power" in the present specification means that the group has a positive refractive power as a whole. Likewise, the "~ group having a negative refractive power" means that the group has a negative refractive power as a whole. "A lens having a positive refractive power", "a lens having a positive power", and "a positive lens" are synonymous. "A lens having a negative refractive power", "a lens having a negative power", and "a negative lens" are synonymous. The term "a single lens" means one lens that is not cemented.

The "lens group" is not limited to a configuration in which the lens group consists of a plurality of lenses, but the lens group may consist of only one lens. A compound aspheric lens (a lens which is integrally composed of a spherical lens and a film having an aspheric shape formed on the spherical lens, and functions as one aspheric lens as a whole) is not be considered as a cemented lens, and is treated as a single lens. Unless otherwise specified, the sign of the refractive power, the surface shape of the lens surface, and the radius of curvature of a lens including an aspheric surface are considered in the paraxial region. Regarding the sign of the radius of curvature, the sign of the radius of curvature of the surface convex toward the object side is positive and the sign of the radius of curvature of the surface convex toward the image side is negative.

In the present specification, the term "whole system" means "imaging lens". In the present specification, the phrase "closest to the object side in the whole system" is also simply referred to as the "closest to the object side". Further, the phrase "in order from the object side to the image side" regarding the arrangement order is also simply referred to as "in order from the object side". The term "focal length" used in a conditional expression is a paraxial focal length. The value of "FNo" used in the conditional expression is the value of the open F number. The term "back focal length" is the distance on the optical axis from the lens surface closest to the image side to the image side focal position of the imaging lens. The values used in Conditional Expressions are values in the case of using the d line as a reference in a state where the object at infinity is in focus. The partial dispersion ratio θgF between the g line and the F line of a certain lens is defined by θgF=(Ng−NF)/(NF−NC), where Ng, NF, and NC are the refractive indexes of the lens at the g line, the F line, and the C line. The "d line", "C line", "F line", and "g line" described in the present specification are emission lines. The wavelength of the d line is 587.56 nm (nanometers) and the wavelength of the C line is 656.27 nm (nanometers), the wavelength of F line is 486.13 nm (nanometers), and the wavelength of g line is 435.84 nm (nanometers).

According to the present disclosure, it is possible to provide a suitable imaging lens, which has a small F number and in which various aberrations are satisfactorily corrected, and an imaging apparatus comprising the imaging lens.

DESCRIPTION OF THE PREFERRED EMBODIMENTS

Figure 1:
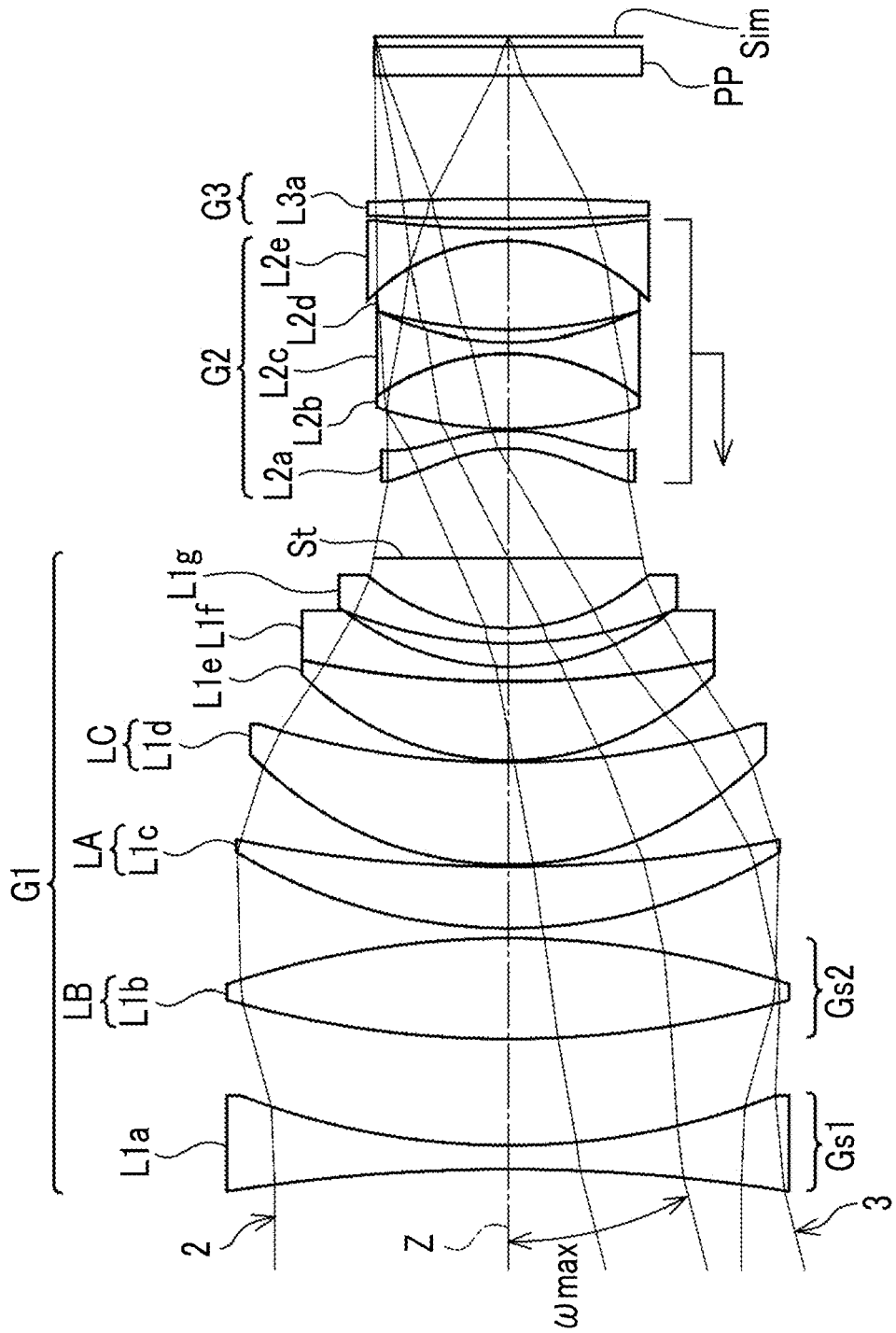
FIG. 1 is a cross-sectional view showing a configuration and rays of an imaging lens (an imaging lens of Example 1) according to an embodiment.

Hereinafter, embodiments of the present disclosure will be described in detail with reference to the accompanying drawings. FIG. 1 is a diagram showing a configuration in a cross section including an optical axis Z of an imaging lens according to an embodiment of the present disclosure. The example shown in FIG. 1 corresponds to the imaging lens of Example 1 to be described later. FIG. 1 shows a state where the object at infinity is in focus, and shows on-axis rays 2 and rays with the maximum angle of view 3, where the left side is the object side and the right side is the image side.

FIG. 1 shows an example in which an optical member PP having a parallel plate shape is disposed between an imaging lens and an image plane Sim under assumption that the imaging lens is applied to the imaging apparatus. The optical member PP is a member assumed to include at various filters, a cover glass, and/or the like. The various filters include, for example, a low pass filter, an infrared cut filter, and a filter that cuts a specific wavelength region. The optical member PP has no refractive power, and the optical member PP may be configured to be omitted.

The imaging lens according to the present disclosure is a single-focus lens, and comprises, successively in order from the position closest to the object side to the image side along the optical axis Z, a first lens group G1 having a positive refractive power, and a second lens group G2 having a refractive power, as lens groups. Further, an aperture stop St is disposed closer to the image side than the lens which is second from the object side. By making the refractive power of the first lens group G1 positive, there is an advantageous in shortening the total lens length.

The imaging lens of the present disclosure may further comprise a lens group closer to the image side than the second lens group G2. It should be noted that the term "lens group" in the present specification refers to a part including the at least one lens, which is a constituent part of the imaging lens and is divided by an air distance that changes during focusing. During focusing, the lens groups move or remain stationary, and the mutual distance between the lenses in one lens group does not change.

As an example, the imaging lens shown in FIG. 1 consists of a first lens group G1, an aperture stop St, a second lens group G2, and a third lens group G3 in order from the object side. Further, the aperture stop St shown in FIG. 1 does not indicate a shape thereof, but indicates a position thereof on the optical axis. In the imaging lens of FIG. 1, as an example, the first lens group G1 consists of seven lenses L1a to L1g in order from the object side, and the second lens group G2 consists of five lenses L2a to L2e in order from the object side, and the third lens group G3 consists of one lens L3a. However, in the imaging lens of the present disclosure, the number of lenses composing each lens group may be different from that in the example shown in FIG. 1.

The imaging lens of the present disclosure is configured such that the distance between the first lens group G1 and the second lens group G2 changes during focusing from an object at infinity to an object at a short distance and the mutual distance between all the lenses in the first lens group and the mutual distance between all the lenses in the second lens group are constant. The phrase "during focusing, the mutual distance is constant" described herein means that the mutual distance remains unchanged during focusing. By changing the distance between the lens groups during focusing, it is possible to suppress fluctuation in field curvature during focusing, as compared with the configuration in which focusing is performed by integrally moving the entire imaging lens. It should be noted that the term "integrally moving" described herein means moving in the same amount and in the same direction at the same time.

In the imaging lens of FIG. 1, as an example, during focusing from the object at infinity to the closest object, the first lens group G1 and the third lens group G3 remain stationary with respect to the image plane Sim, and the second lens group G2 moves to the object side along the optical axis Z. That is, in the imaging lens of FIG. 1, the lens group that moves during focusing (hereinafter referred to as the focusing lens group) consists of the second lens group G2. The horizontal left arrow under the second lens group G2 in FIG. 1 means that the second lens group G2 moves to the object side during focusing from the object at infinity to the closest object.

This imaging lens is configured such that the combined refractive power of all the lenses closer to the object side than the aperture stop St is positive. Further, this imaging lens is configured to include at least one LA positive lens LA and at least one LB positive lens LB closer to the object side than the aperture stop St. The LA positive lens LA is disposed closer to the object side than the aperture stop St, and is a positive lens that satisfies Conditional Expressions (1) and (2), where the refractive index of the LA positive lens LA at the d line is NdA and the Abbe number of the LA positive lens LA based on the d line is vdA.

$$1.86 < NdA < 2.2 \tag{1}$$

$$10 < vdA < 35 \tag{2}$$

The LB positive lens LB is disposed closer to the object side than the aperture stop St, and is a positive lens of which the Abbe number based on the d line is largest among Abbe numbers of all positive lenses closer to the object side than the aperture stop St based on the d line and which satisfies Conditional Expression (3). Here, the Abbe number of the LB positive lens LB based on the d line is vdB.

$$57 < vdB < 105 \tag{3}$$

In the example of FIG. 1, the lens L1c corresponds to the LA positive lens LA and the lens L1b corresponds to the LB positive lens LB.

By not allowing the result of Conditional Expression (1) to be equal to or less than the lower limit, the absolute value of the radius of curvature of the lens is prevented from becoming excessively small. Therefore, occurrence of spherical aberration can be suppressed. By not allowing the result of Conditional Expression (1) to be equal to or greater than the upper limit, the specific gravity of the lens is prevented from becoming excessively large. Thus, there is an advantage in achieving weight reduction.

By not allowing the result of Conditional Expression (2) to be equal to or less than the lower limit, there is an advantage in satisfactorily correcting first-order chromatic aberration. By not allowing the result of Conditional Expression (2) to be equal to or greater than the upper limit, there is an advantage in satisfactorily correcting second-order chromatic aberration. By satisfying Conditional Expression (2), there is an advantage in satisfactorily correcting the first-order chromatic aberration and the second-order chromatic aberration.

By not allowing the result of Conditional Expression (3) to be equal to or less than the lower limit, there is an advantage in satisfactorily correcting chromatic aberration, particularly longitudinal chromatic aberration. By not allowing the result of Conditional Expression (3) to be equal to or greater than the upper limit, it is possible to prevent the refractive index of the LB positive lens LB from becoming excessively low. In a case where a positive lens is composed of a material having a low refractive index, spherical aberration and coma aberration are likely to occur. However, by not allowing the result of Conditional Expression (3) to be equal to or greater than the upper limit, occurrence of spherical aberration and coma aberration can be suppressed.

In the imaging lens of the present disclosure, a high-refractive-index and high-dispersion LA positive lens LA that satisfies Conditional Expressions (1) and (2) is disposed closer to the object side than the aperture stop St, and a low-dispersion LB positive lens LB that satisfies Conditional Expression (3) is also disposed. The plurality of lenses disposed closer to the object side than the aperture stop St have positive refractive power as a whole, and the LA positive lens LA composed of a material satisfying Conditional Expressions (1) and (2) is disposed. Thereby, the correction effect of the second-order chromatic aberration can be obtained. By controlling the amount of chromatic aberration caused by the LA positive lens LA and the LB positive lens LB, the first-order chromatic aberration and the second-order chromatic aberration can be balanced. Further, by disposing the positive lens composed of the high-refractive-index material that satisfies Conditional Expression (1), it is possible to prevent the absolute value of the radius of curvature of each positive lens from becoming excessively small. This facilitates a balanced correction of chromatic aberration and monochromatic aberration such as spherical aberration and coma aberration.

In order to obtain more favorable characteristics, it is preferable that the LA positive lens LA satisfies at least one of Conditional Expression (1-1), (1-2), (2-1), (2-2), or (2-3).

$$1.88 < NdA < 2.15 \quad (1\text{-}1)$$

$$1.91 < NdA < 2.15 \quad (1\text{-}2)$$

$$13.5 < vdA < 31 \quad (2\text{-}1)$$

$$14 < vdA < 28 \quad (2\text{-}2)$$

$$14.5 < vdA < 22 \quad (2\text{-}3)$$

In order to obtain more favorable characteristics, the LB positive lens LB preferably satisfies Conditional Expression (3-1), and more preferably satisfies Conditional Expression (3-2).

$$62 < vdB < 92 \quad (3\text{-}1)$$

$$66 < vdB < 88 \quad (3\text{-}2)$$

Further, assuming that the Abbe number of the LA positive lens LA based on the d line is vdA and the partial dispersion ratio of the LA positive lens LA between the g line and the F line is θgFA, it is preferable to satisfy Conditional Expression (17). By not allowing the result of Conditional Expression (17) to be equal to or less than the lower limit, it is possible to prevent second-order chromatic aberration from being insufficiently corrected. By not allowing the result of Conditional Expression (17) to be equal to or greater than the upper limit, it is possible to prevent second-order chromatic aberration from being excessively corrected. In order to obtain more favorable characteristics, it is more preferable to satisfy Conditional Expression (17-1).

$$0.01 < \theta gFA + 0.00162 \times vdA - 0.64159 < 0.06 \quad (17)$$

$$0.015 < \theta gFA + 0.00162 \times vdA - 0.64159 < 0.055 \quad (17\text{-}1)$$

In Conditional Expression (17), θgFA+0.00162×vdA−0.64159 is ΔθgFA represented by the following expression.

ΔθgFA=θgFA−(−0.00162×vdA+0.64159) ΔθgFA is a value indicating the abnormal dispersion of the material used for the LA positive lens LA, and the larger this value, the higher the abnormal dispersion. The abnormal dispersion can be considered in terms of using an orthogonal coordinate system in which the horizontal axis represents the Abbe number vd based on the d line and the vertical axis represents the partial dispersion ratio θgF between the g line and the F line. In this orthogonal coordinate system, a straight line passing through two points of (vd, θgF)=(60.49, 0.5436) and (vd, θgF)=(36.26, 0.5828) is set as a reference line. The deviation from this reference line indicates the degree of abnormal dispersion. ΔθgFA indicates the deviation of the partial dispersion ratio from this reference line. The above definition of deviation is based on the definition of abnormal dispersion of Ohara Inc.

Likewise, assuming that the partial dispersion ratio of the LB positive lens LB between the g line and the F line is θgFB, it is preferable to satisfy Conditional Expression (18). θgFB+0.00162×vdA−0.64159 in Conditional Expression (18) is a value indicating the abnormal dispersion of the material used for the LB positive lens LB, and the larger this value, the higher the abnormal dispersion. By not allowing the result of Conditional Expression (18) to be equal to or less than the lower limit, it becomes easy to satisfactorily correct chromatic aberration, particularly longitudinal chromatic aberration. By not allowing the result of Conditional Expression (18) to be equal to or greater than the upper limit, a material other than the low refractive index material can be selected. Therefore, the absolute value of the radius of curvature of the lens can be prevented from becoming excessively small. Thereby, it becomes easy to correct spherical aberration and coma aberration. By satisfying conditional expression (18), it becomes easy to correct chromatic aberration, spherical aberration, and coma aberration in a balanced manner. In order to obtain more favorable characteristics, it is more preferable to satisfy Conditional Expression (18-1).

$$0.01 < \theta gFB + 0.00162 \times vdB - 0.64159 < 0.05 \quad (18)$$

$$0.012 < \theta gFB + 0.00162 \times vdB - 0.64159 < 0.035 \quad (18\text{-}1)$$

Another preferable configuration and another possible configuration of the imaging lens of the present disclosure will be described below. It is preferable that during focusing, the first lens group G1 remains stationary with respect to the image plane Sim, and the first lens group G1 includes at least one LA positive lens LA. The reason for this is as follows. In a case where the LA positive lens LA composed of a material having a high refractive index and a high dispersion is disposed in the focusing lens group, fluctuations in chromatic aberration and spherical aberration are likely to be large during focusing. Thus, it is desirable that the LA positive lens LA is disposed in the first lens group that does not move. Alternatively, in a case where the LA positive lens LA is disposed in the focusing lens group, it is necessary for a negative lens to be further disposed in the focusing lens group in order to cancel the aberration occurring in the LA positive lens LA. This leads to an increase in size of the lens group. From the above circumstances, it is more preferable that the first lens group G1 remains stationary with respect to the image plane Sim during focusing, and the first lens group G1 includes all the LA positive lenses LA.

It is preferable that the imaging lens includes at least one LC positive lens LC closer to the object side than the aperture stop St. The LC positive lens LC is a positive lens that is disposed closer to the object side than the aperture stop St and has the largest or second largest Abbe number based on the d line among all the positive lenses closer to the object side than the aperture stop St, and is a positive lens that satisfies Conditional Expression (6). Here, the Abbe number of the LC positive lens LC based on the d line is vdC.

$$57 < vdC < 102 \tag{6}$$

FIG. 1 shows an example in which the lens L1d corresponds to the LC positive lens LC.

By not allowing the result of Conditional Expression (6) to be equal to or less than the lower limit, it is possible to satisfactorily correct chromatic aberration, particularly longitudinal chromatic aberration. By not allowing the result of Conditional Expression (6) to be equal to or greater than the upper limit, the refractive index of the LC positive lens LC is prevented from becoming excessively low. Therefore, occurrence of spherical aberration and coma aberration can be suppressed. The imaging lens has, at a position closer to the object side than the aperture stop St, an LB positive lens LB composed of a low dispersion material that satisfies Conditional Expression (3), and has the LC positive lens LC composed of a low dispersion material that satisfies Conditional Expression (6). Thereby, it is possible to satisfactorily correct chromatic aberration and spherical aberration. In the configuration having the LB positive lens LB and the LC positive lens LC, the refractive power of the LB positive lens LB can be weakened as compared with the configuration in which the positive lens composed of the low dispersion material is only the LB positive lens LB. As a result, the absolute value of the radius of curvature of the LB positive lens LB is prevented from becoming excessively small. Therefore, occurrence of spherical aberration can be suppressed. Further, it is possible to make the refractive index of the LC positive lens LC higher than that of the LB positive lens LB due to the characteristics of the refractive index and Abbe number of the optical material. Therefore, in a case where the imaging lens has two positive lenses formed of a low-dispersion material closer to the object side than the aperture stop St, as compared with the configuration in which both of these two lenses are LB positive lenses LB, in the configuration in which these two lenses are one LB positive lens LB and one LC positive lens LC, the absolute value of the radius of curvature of these two positive lenses can be increased. Thus, there is an advantage in suppressing occurrence of spherical aberration.

In order to obtain more favorable characteristics, the LC positive lens LC preferably satisfies Conditional Expression (6-1), and more preferably Conditional Expression (6-2).

$$62 < vdC < 88 \tag{6-1}$$

$$66 < vdC < 80 \tag{6-2}$$

Assuming that the minimum value of the refractive indexes of all positive lenses closer to the object side than the aperture stop St at the d line is Ndfm, it is preferable to satisfy Conditional Expression (7). By not allowing the result of Conditional Expression (7) to be equal to or less than the lower limit, the absolute value of the radius of curvature of the lens is prevented from becoming excessively small, and occurrence of spherical aberration can be suppressed. Further, the positive lens disposed in the first lens group G1 having a large lens diameter is prevented from becoming excessively thick. Thus, there is an advantage in reducing the size of the lens system. By not allowing the result of Conditional Expression (7) to be equal to or greater than the upper limit, a low dispersion material can be selected. Thus, there is an advantage in correcting chromatic aberration. In order to obtain more favorable characteristics, it is more preferable to satisfy Conditional Expression (7-1).

$$1.46 < Ndfm < 1.72 \tag{7}$$

$$1.52 < Ndfm < 1.68 \tag{7-1}$$

It is preferable that the imaging lens includes at least two positive lenses closer to the image side than the aperture stop St. Assuming that the average value of the refractive indexes of all the positive lenses closer to the image side than the aperture stop St at the d line is Ndpr, it is preferable to satisfy Conditional Expression (8). By disposing two or more positive lenses closer to the image side than the aperture stop St, astigmatism and field curvature can be satisfactorily corrected. By not allowing the result of Conditional Expression (8) to be equal to or less than the lower limit, the absolute value of the radius of curvature of the lens is prevented from becoming excessively small. As a result, it becomes easy to satisfactorily correct astigmatism and field curvature. By not allowing the result of Conditional Expression (8) to be equal to or greater than the upper limit, materials other than high-dispersion materials can be selected. Thus, there is an advantage in correcting chromatic aberration. In order to obtain more favorable characteristics, it is more preferable to satisfy Conditional Expression (8-1), and it is yet more preferable to satisfy Conditional Expression (8-2).

$$1.77 < Ndpr < 2.15 \tag{8}$$

$$1.81 < Ndpr < 2.1 \tag{8-1}$$

$$1.87 < Ndpr < 2.05 \tag{8-2}$$

It is preferable that the first lens group G1 includes at least two positive lenses and at least two negative lenses. In such a case, spherical aberration, coma aberration, and longitudinal chromatic aberration can be satisfactorily corrected. As a result, it becomes easy to suppress fluctuation in aberration caused by change in distance between the first lens group G1 and the second lens group G2 during focusing.

It is preferable that three positive lenses are successively arranged in the first lens group. In such a case, the height of the on-axis marginal ray can be gently lowered by the three positive lenses successively arranged. Therefore, occurrence of spherical aberration can be suppressed. In order to more satisfactorily suppress occurrence of spherical aberration, it is preferable that four positive lenses are successively arranged in the first lens group.

It is preferable that the first lens group G1 includes at least two negative lenses. Assuming that an average value of Abbe numbers of two negative lenses based on the d lines is vdn1 where the two negative lenses are selected from negative lenses having smaller Abbe numbers based on the d line among the negative lenses included in the first lens group G1, it is preferable to satisfy Conditional Expression (4). The Abbe numbers of "the two negative lenses selected from negative lenses having smaller Abbe numbers" may be equal. Specifically, in a case where there are two or more negative lenses having the minimum Abbe number of all the negative lenses in the first lens group, the minimum value is vdn1. In a case where there is only one negative lens having the minimum Abbe number of all the negative lenses in the first lens group, an average value of the minimum value and a second smallest value of the Abbe numbers of all the negative lenses in the first lens group is vdn1. In order to avoid redundant description, in the above description, the "Abbe number based on the d line" is simply referred to as "Abbe number". By not allowing the result of Conditional Expression (4) to be equal to or less than the lower limit, there is an advantage in satisfactorily correcting second-order chromatic aberration. By not allowing the result of Conditional Expression (4) to be equal to or greater than the upper limit, there is an advantage in satisfactorily correcting first-order chromatic aberration. By satisfying Conditional Expression (4), there is an advantage in correcting first-order chromatic aberration and second-order chromatic aberration in a balanced manner. In order to obtain more favorable characteristics, it is more preferable to satisfy Conditional Expression (4-1).

$$15 < vdn1 < 28 \tag{4}$$

$$16 < vdn1 < 25 \tag{4-1}$$

It is preferable that the first lens group G1 includes at least two negative lenses. Assuming that an average value of Abbe numbers of two negative lenses based on the d lines is vdn1 where the two negative lenses are selected from negative lenses having smaller Abbe numbers based on the d line among the negative lenses included in the first lens group G1, and an average value of partial dispersion ratios of two negative lenses between a g line and an F line is θgFn1 where the two negative lenses are selected from the negative lenses having smaller Abbe numbers based on the d line among the negative lenses included in the first lens group G1, it is preferable to satisfy Conditional Expression (19). Similarly to Conditional Expression (4), in Conditional Expression (19), the Abbe numbers of "the two negative lenses selected from negative lenses having smaller Abbe numbers" may be equal. Similarly to θgFA+0.00162×vdA−0.64159 in Conditional Expression (17), θgFn1+0.00162×vdn1−0.64159 in Conditional Expression (19) is a value indicating the average value of the abnormal dispersion of two negative lenses selected from negative lenses having smaller Abbe numbers among the negative lenses arranged in the first lens group G1, and the larger this value, the higher the abnormal dispersion. By not allowing the result of Conditional Expression (19) to be equal to or less than the lower limit, it becomes easy to satisfactorily correct first-order chromatic aberration. By not allowing the result of Conditional Expression (19) to be equal to or greater than the upper limit, it becomes easy to satisfactorily correct second-order chromatic aberration. By satisfying Conditional Expression (19), it becomes easy to correct first-order chromatic aberration and second-order chromatic aberration in a balanced manner. In order to obtain more favorable characteristics, it is more preferable to satisfy Conditional Expression (19-1).

$$0.01 < \theta gFn1 + 0.00162 \times vdn1 - 0.64159 < 0.05 \tag{19}$$

$$0.016 < \theta gFn1 + 0.00162 \times vdn1 - 0.64159 < 0.042 \tag{19-1}$$

It is preferable that the first lens group G1 includes at least three negative lenses. In such a case, it becomes easy to satisfactorily correct chromatic aberration, and there is also an advantage in correcting field curvature.

Assuming that a focal length of the first lens group G1 is f1 and a focal length of the imaging lens in a state where the object at infinity is in focus is f, it is preferable to satisfy Conditional Expression (10). By not allowing the result of Conditional Expression (10) to be equal to or less than the lower limit, the refractive power of the first lens group G1 is prevented from becoming excessively strong. Thus, there is an advantage in satisfactorily correcting various aberrations, particularly spherical aberration. By not allowing the result of Conditional Expression (10) to be equal to or greater than the upper limit, the refractive power of the first lens group G1 is prevented from becoming excessively weak. Thus, there is an advantage in shortening the total lens length. In order to obtain more favorable characteristics, it is more preferable to satisfy Conditional Expression (10-1), it is yet more preferable to satisfy Conditional Expression (10-2), and it is most preferable to satisfy Conditional Expression (10-3).

$$0.5 < f1/f < 3.5 \tag{10}$$

$$0.7 < f1/f < 3.3 \tag{10-1}$$

$$1.4 < f1/f < 3.2 \tag{10-2}$$

$$1.8 < f1/f < 2.9 \tag{10-3}$$

The first lens group G1 may be configured to include, successively in order from the position closest to the object side, a first unit Gs1 that has a negative refractive power and a second unit Gs2 that is separated from the first unit Gs1 by the maximum air distance on the optical axis in the first lens group and has a positive refractive power. The first unit Gs1 is a unit including at least one lens, and the second unit Gs2 is a unit consisting of one single lens or one cemented lens. In such a case, the first unit Gs1 and the second unit Gs2 can be made to have the same configuration as a wide conversion lens. As a result, it becomes easy to suppress sagittal coma aberration while widening the angle of view. In the example of FIG. 1, the first unit Gs1 consists of the lens L1a, and the second unit Gs2 consists of the lens L1b.

In the configuration in which the first lens group G1 has the first unit Gs1 and the second unit Gs2, assuming that the focal length of the imaging lens in the state where the object at infinity is in focus is f, and the combined focal length of all the lenses closer to the image side than the second unit Gs2 of the imaging lenses in the state where the object at infinity is in focus is fm, it is preferable to satisfy Conditional Expression (16). By not allowing the result of Conditional Expression (16) to be equal to or less than the lower limit, there is an advantage in reducing the coma aberration occurring in the first unit Gs1 and the second unit Gs2. By not allowing the result of Conditional Expression (16) to be equal to or greater than the upper limit, there is an advantage in reducing aberration, particularly coma aberration, occurring in the lens closer to the image side than the second unit Gs2. In order to obtain more favorable characteristics, it is more preferable to satisfy Conditional Expression (16-1).

$$0.7 < f/fm < 0.98 \tag{16}$$

$$0.75 < f/fm < 0.95 \tag{16-1}$$

In a case where the first lens group G1 has the above-mentioned first unit Gs1 and second unit Gs2, it is preferable that the first unit Gs1 consists of one negative lens and the second unit Gs2 consists of one positive lens. In such a case, the number of lenses in the first unit Gs1 and the second unit Gs2 having large lens diameters is small. Thus, there is an advantage in reducing the size and the weight of the imaging lens.

In the lens component closest to the object side and the lens component which is second from the object side of the whole system, one has a negative refractive power and the other has a positive refractive power. In the state where the object at infinity is in focus, it is preferable that the on-axis ray 2 emitted from the lens surface closest to the image side in the one lens component having a negative refractive power to the image side is divergent light. It should be noted that one lens component means one single lens or one cemented lens. In the example of FIG. 1, the lens L1a that is the lens component closest to the object side in the whole system has a negative refractive power, and the lens L1b that is the lens component which is second from the object side of the whole system has a positive refractive power. As shown in FIG. 1, the on-axis ray 2 emitted from the lens L1a to the image side between the lens L1a and the lens L1b has a ray diameter that increases toward the image side and is divergent light.

As described above, by disposing the lens component having a negative refractive power at a position closer to the object, it is possible to decrease the angle of the principal ray with the maximum angle of view, which is emitted from the lens component having a negative refractive power to the image side, with respect to the optical axis Z. Thus, it becomes easy to suppress sagittal coma aberration. Further, by disposing the lens component having a negative refractive power in the first lens group, it is possible to prevent a positive refractive power of the first lens group G1 from becoming excessively strong, and to suppress occurrence of spherical aberration and field curvature. However, in a case where negative refractive powers are successively arranged such that both the lens component closest to the object side and the lens component which is second from the object side have a negative refractive power, the whole lens system becomes large. Therefore, it is preferable that one of the two lens components has a negative refractive power and the other has a positive refractive power. Further, by making the on-axis ray 2 emitted from the one lens component having a negative refractive power as divergent light, it is possible to adopt a configuration in which the ray is once spread and then converged again in the first lens group G1 having a positive refractive power. Thus, there is an advantage in suppressing sagittal coma aberration.

It is preferable that at least one of the lens closest to the object side or the lens which is second from the object side of the whole system is a negative lens of which the object side lens surface is concave. By disposing the negative lens at a position closer to the object in such a manner, it is possible to reduce the angle of the principal ray with the maximum angle of view, which is emitted from the negative lens to the image side, with respect to the optical axis Z. As a result, it becomes easy to suppress sagittal coma aberration. Further, by making the object side lens surface of the negative lens concave, there is an advantage in correcting spherical aberration.

It is preferable that the object side lens surface of the lens closest to the object side in the whole system is concave. In such a case, there is an advantage in correcting spherical aberration.

It is preferable that the lens closest to the object side in the whole system is a negative lens. In such a case, it is possible to reduce the angle of the principal ray with the maximum angle of view, which is emitted from the lens closest to the object side to the image side, with respect to the optical axis Z. Therefore, it becomes easy to suppress sagittal coma aberration.

The imaging lens may be configured to include a single lens having a negative refractive power, a single lens having a positive refractive power, and a single lens having a positive refractive power, successively in order from the closest to the object side in the whole system. By making the lens closest to the object side a negative lens, it becomes easy to suppress sagittal coma aberration as described above. Moreover, since the positive lens that is disposed successively to the lens closest to the object side is able to gently lower the height of the on-axis marginal ray, it is possible to suppress occurrence of spherical aberration. Further, by using only one negative lens among the three lenses of the first lens to the third lens counted from the lens closest to the object side, it is possible to suppress an increase in size of the lens system.

The second lens group G2 may be configured as a lens group having a positive refractive power. In such a case, the height of the on-axis marginal ray should be gently lowered until the light from the object is incident into the first lens group G1 having a positive refractive power and is emitted from the second lens group G2. Therefore, occurrence of spherical aberration can be suppressed even in a case where the F number is reduced.

Assuming that a focal length of the first lens group G1 is f1, and a focal length of the second lens group G2 is f2, it is preferable to satisfy Conditional Expression (13). By not allowing the result of Conditional Expression (13) to be equal to or less than the lower limit, it is possible to prevent the refractive power of the first lens group G1 from becoming excessively strong. By not allowing the result of Conditional Expression (13) to be equal to or greater than the upper limit, it is possible to prevent the refractive power of the second lens group G2 from becoming excessively strong. By satisfying Conditional Expression (13), it becomes easy to suppress various aberrations occurring in each of the first lens group G1 and the second lens group G2. In order to obtain more favorable characteristics, it is more preferable to satisfy Conditional Expression (13-1), it is yet more preferable to satisfy Conditional Expression (13-2), and it is most preferable to satisfy Conditional Expression (13-3).

$$1 < f1/f2 < 5 \tag{13}$$

$$1.2 < f1/f2 < 4.4 \tag{13-1}$$

$$2.3 < f1/f2 < 4.2 \tag{13-2}$$

$$2.5 < f1/f2 < 4 \tag{13-3}$$

It is preferable that the second lens group G2 includes at least two positive lenses and at least two negative lenses. In such a case, various aberrations, particularly, field curvature can be satisfactorily corrected. As a result, it becomes easy to suppress fluctuation in aberration caused by change in distance between the first lens group G1 and the second lens group G2 during focusing.

It is preferable that the second lens group G2 includes at least three positive lenses and at least two negative lenses. In such a case, various aberrations can be satisfactorily corrected. As a result, it becomes easy to suppress fluctuation in aberration during focusing.

Regarding the behavior of each lens group during focusing, it is preferable that the first lens group G1 remains stationary with respect to the image plane Sim and the second lens group G2 moves during focusing. In a lens system having a large aperture ratio, the lens closest to the object side tends to have a large diameter, and thus tends to have a heavy weight. Therefore, in a case where the first lens group G1 is configured to be moved during focusing, a plurality of inconveniences will be described below. First, during focusing, a heavy lens has to be moved, which makes an increase in autofocus speed difficult. Further, a large motor having a high torque is required to move the lens having a large weight. Therefore, the entire lens device becomes large. Furthermore, since the total lens length changes with the movement of the lens closest to the object side having a large diameter, the barycentric position of the imaging lens changes during imaging. For the above reasons, it is preferable to use the inner focus method or the rear focus method. Further, the configuration in which the first lens group G1 does not move during focusing has an advantage that the firmness of the lens device can be easily ensured.

It is preferable that the aperture stop St is disposed between the lens groups, or it is preferable that the aperture stop St is disposed in the lens group that remains stationary with respect to the image plane Sim during focusing. That is, it is preferable that the aperture stop St is not included in the focusing lens group. Since the focusing lens group does not include the aperture stop unit, it is possible to reduce the weight of the focusing lens group and achieve an increase in autofocus speed. Further, in a case where the focusing lens group can be reduced in weight, a large high torque motor becomes unnecessary. Thus, there is an advantage in achieving reduction in size and weight of the whole lens system.

From the above circumstances, in a case where importance is attached to reduction in size and weight and the like, it is preferable that the aperture stop St is disposed between the first lens group G1 and the second lens group G2, and the first lens group G1 and the aperture stop St remain stationary with respect to the image plane Sim and the second lens group G2 moves during focusing.

It is preferable that only one lens group moves during focusing. By using only one lens group that moves during focusing, the structure can be simplified, and reduction in size and weight of the lens device can be achieved. In a lens system having a large aperture ratio, the focal depth is extremely low, and the performance change due to tilting and/or axial misalignment of the lens is likely to be large. In particular, in the focusing lens group which is the movable lens group, it is desirable that the number of the movable lens groups is small since structurally it is difficult to completely eliminate the tilting of the lens and the axial misalignment.

As described above, it is preferable that the first lens group G1 remains stationary with respect to the image plane Sim during focusing, and it is preferable that only one lens group moves during focusing. Therefore, it is preferable that the only lens group that moves during focusing is the second lens group G2.

In a case where the second lens group G2 moves during focusing, it is preferable that the number of lenses included in the second lens group G2 is 7 or less. By reducing the number of lenses in the second lens group G2, which is the focusing lens group, the weight of the focusing lens group can be reduced. Thus, there is an advantage in increasing the autofocus speed. Further, in a case where the focusing lens group can be reduced in weight, a large high torque motor becomes unnecessary. Thus, there is an advantage in achieving reduction in size and weight of the whole lens system. Therefore, in the configuration in which the second lens group G2 moves during focusing, the number of lenses included in the second lens group G2 is more preferably 6 or less, and yet more preferably 5 or less.

In the configuration in which the second lens group G2 moves during focusing, the second lens group G2 includes at least one positive lens. Assuming that the average value of the refractive indexes of all the positive lenses in the second lens group at the d line is $Nd2p$, it is preferable to satisfy Conditional Expression (9). By not allowing the result of Conditional Expression (9) to be equal to or less than the lower limit, it becomes easy to satisfactorily correct astigmatism and field curvature. By not allowing the result of Conditional Expression (9) to be equal to or greater than the upper limit, the specific gravity of the lens material is prevented from becoming excessively large. Therefore, the weight of the focusing lens group can be prevented from becoming heavy. Further, since it is possible to select a material other than the high-dispersion material, it is possible to suppress fluctuation in chromatic aberration in a case where the focusing lens moves. In order to obtain more favorable characteristics, it is more preferable to satisfy Conditional Expression (9-1), it is yet more preferable to satisfy Conditional Expression (9-2), and it is most preferable to satisfy Conditional Expression (9-3).

$$1.7 < Nd2p < 2.2 \quad (9)$$

$$1.77 < Nd2p < 2.15 \quad (9\text{-}1)$$

$$1.81 < Nd2p < 2.1 \quad (9\text{-}2)$$

$$1.87 < Nd2p < 2.05 \quad (9\text{-}3)$$

In a case where the second lens group G2 moves during focusing, it is preferable that the second lens group G2 includes at least two cemented lenses. In this case, it is possible to suppress fluctuation in chromatic aberration during focusing.

In the configuration in which the second lens group G2 moves during focusing, assuming that a focal length of the second lens group G2 is f2, and a focal length of the imaging lens in a state where the object at infinity is in focus is f, it is preferable to satisfy Conditional Expression (12). By not allowing the result of Conditional Expression (12) to be equal to or less than the lower limit, the refractive power of the second lens group G2 is prevented from becoming excessively strong. Therefore, it becomes easy to suppress occurrence of various aberrations occurring in the second lens group G2. By not allowing the result of Conditional Expression (12) to be equal to or greater than the upper limit, the amount of movement of the second lens group G2 during focusing can be reduced. Thus, there is an advantage in reducing the size of the lens system. In order to obtain more favorable characteristics, it is more preferable to satisfy Conditional Expression (12-1), it is yet more preferable to satisfy Conditional Expression (12-2), and it is most preferable to satisfy Conditional Expression (12-3).

$$0.3 < |f2|/f < 2.2 \quad (12)$$

$$0.4 < |f2|/f < 1.9 \quad (12\text{-}1)$$

$$0.45 < |f2|/f < 1.2 \quad (12\text{-}2)$$

$$0.5 < |f2|/f < 1 \quad (12\text{-}3)$$

In the configuration in which the second lens group G2 moves during focusing, assuming that a lateral magnification of the second lens group G2 in the state where an object at infinity is in focus is $\beta2$, and a combined lateral magnification of all lenses closer to the image side than the second lens group G2 in a state where the object at infinity is in focus is $\beta r$ in a case where a lens is disposed closer to the image side than the second lens group G2, and $\beta r$ is set to 1 in a case where no lens is disposed closer to the image side than the second lens group G2, it is preferable to satisfy Conditional Expression (14). In Conditional Expression (14), $|(1-\beta2^2) \times \beta r^2|$ represents the amount of movement of the image plane position with respect to the amount of movement of the second lens group G2 during focusing, and represents so-called focus sensitivity. By not allowing the result of Conditional Expression (14) to be equal to or less than the lower limit, it is possible to reduce the amount of movement of the second lens group G2 during focusing. Thus, there is an advantage in reducing the size of the lens system. By not allowing the result of Conditional Expression (14) to be equal to or greater than the upper limit, it is possible to suppress the strictness in accuracy of the stopping of the focusing lens group in the focusing operation. Further, by not allowing the result of Conditional Expression (14) to be equal to or greater than the upper limit, it becomes unnecessary to increase the refractive power of the second lens group G2 for focus sensitivity. Therefore, it becomes easy to correct spherical aberration and coma aberration. In order to obtain more favorable characteristics, it is more preferable to satisfy Conditional Expression (14-1), and it is yet more preferable to satisfy Conditional Expression (14-2).

$$0.3<|(1-\beta2^2)\times\beta r^2|>1.5 \quad (14)$$

$$0.4<|(1-\beta2^2)\times\beta r^2|>1.4 \quad (14\text{-}1)$$

$$0.6<|(1-\beta2^2)\times\beta r^2|>1 \quad (14\text{-}2)$$

As shown in FIG. 1, it is preferable that the imaging lens of the present disclosure comprises, in order from the object side to the image side, as lens groups, only three lens groups consisting of the first lens group G1 that remains stationary with respect to the image plane Sim during focusing, the second lens group G2 that moves during focusing, and a third lens group G3 that consists of two or less lenses and remains stationary with respect to the image plane Sim during focusing. Alternatively, as shown in examples described below, it is preferable that the imaging lens of the present disclosure comprises, in order from the object side to the image side, as lens groups, only two lens groups consisting of the first lens group G1 that remains stationary with respect to the image plane Sim during focusing and the second lens group G2 that moves during focusing. The first lens group G1 remains stationary with respect to the image plane Sim and the second lens group G2 moves during focusing, and the operational effects are as described above. In a case where the lens is not disposed closer to the image side than the second lens group G2, it becomes easy to ensure the stroke of the second lens group G2, which is the focusing lens group, while suppressing an increase in total lens length. Alternatively, even in a case where the lens is disposed closer to the image side than the second lens group G2, by reducing the number of the arranged lenses to two or less, it becomes easy to ensure the stroke of the second lens group G2, which is the focusing lens group, while suppressing an increase in total lens length. Thereby, it becomes easy to increase the maximum imaging magnification. In a case where a large number of lenses are arranged closer to the image side than the second lens group G2 while maintaining the total lens length, the stroke of the second lens group G2 may be reduced and the maximum imaging magnification may be reduced. Alternatively, in a case where the refractive power of the second lens group G2 is increased in order to obtain the same maximum imaging magnification while maintaining the total lens length, various aberrations, particularly spherical aberration and field curvature, which occur in the second lens group G2, increase.

The number of lenses included in the imaging lens is preferably 13 or less, and more preferably 12 or less. By configuring the imaging lens with a small number of lenses, reduction in size and weight can be achieved.

The number of lenses disposed closer to the object side than the aperture stop St is preferably 8 or less, and more preferably 7 or less. A lens disposed closer to the object side than the aperture stop St is likely to have a large lens outer diameter and a heavy weight. Therefore, it is preferable to keep the number of lenses closer to the object side than the aperture stop St small.

Assuming that a distance on an optical axis from a lens surface closest to the object side to the aperture stop St in a state where an object at infinity is in focus is Tf, and a sum of a distance on an optical axis from a lens surface closest to the object side to a lens surface closest to the image side and a back focal length at an air-converted distance in the state where the object at infinity is in focus is TL, it is preferable to satisfy Conditional Expression (15). The first lens group G1 disposed closest to the object side has a positive refractive power. Thus, by not allowing the result of Conditional Expression (15) to be equal to or less than the lower limit, It is possible to further reduce the height of the ray in the lens disposed closer to the image side than the aperture stop St. Thereby, there is an advantage in suppressing occurrence of various aberrations in the lens disposed closer to the image side than the aperture stop St. Further, by not allowing the result of Conditional Expression (15) to be less than or equal to the lower limit, it becomes easy to dispose as many lenses as necessary for correcting spherical aberration, longitudinal chromatic aberration, and the like at the position closer to the object side than the aperture stop St. By not allowing the result of Conditional Expression (15) to be equal to or greater than the upper limit, it is possible to suppress an increase in diameter of the lens disposed closer to the object side than the aperture stop St. Thus, it becomes easy to achieve reduction in size and weight of the whole lens system. In order to obtain more favorable characteristics, it is more preferable to satisfy Conditional Expression (15-1), and it is yet more preferable to satisfy Conditional Expression (15-2).

$$0.2<Tf/TL<0.65 \quad (15)$$

$$0.4<Tf/TL<0.64 \quad (15\text{-}1)$$

$$0.48<Tf/TL<0.61 \quad (15\text{-}2)$$

Assuming that a sum of a distance on an optical axis from a lens surface closest to the object side to a lens surface closest to the image side and a back focal length at an air-converted distance in a state where an object at infinity is in focus is TL, an F number of the imaging lens in the state where the object at infinity is in focus is FNo, and a focal length of the imaging lens in the state where the object at infinity is in focus is f, it is preferable that Conditional Expression (5) is satisfied. By not allowing the result of Conditional Expression (5) to be equal to or less than the lower limit, there is an advantage in satisfactorily correcting various aberrations. More specifically, it becomes easy to arrange the optimum number of lenses to correct various aberrations. Thus, there is an advantage in obtaining higher imaging performance. By not allowing the result of Conditional Expression (5) to be equal to or greater than the upper limit, there is an advantage in suppressing an increase in size of the lens system. In order to obtain more favorable characteristics, it is more preferable to satisfy Conditional Expression (5-1), and it is yet more preferable to satisfy Conditional Expression (5-2).

$$1.5<TL\times FNo/f<5 \quad (5)$$

$$1.8<TL\times FNo/f<3.5 \quad (5\text{-}1)$$

$$2<TL\times FNo/f<3.2 \quad (5\text{-}2)$$

Assuming that a maximum half angle of view of the imaging lens in a state where an object at infinity is in focus is ω max, and an F number of the imaging lens in the state where the object at infinity is in focus is FNo, it is preferable to satisfy Conditional Expression (11). Considering Conditional Expression (11) on the assumption that a small F number is maintained, the smaller the value of $1/\{\tan(\omega \max) \times FNo\}$ of Conditional Expression (11) is, the lens system becomes a wider-angle type optical system. As the value becomes lager, the lens system becomes closer to the telephoto type optical system. In a case where the result of Conditional Expression (11) is equal to or less than the lower limit while a small F number is maintained, it becomes difficult to correct sagittal coma aberration. In order to correct sagittal coma aberration, the number of lenses of the first lens group G1 having a large outer diameter increases. As a result, there is a problem in that the size of the lens system may increase. On the other hand, in a case where the result of Conditional Expression (11) is equal to or greater than the upper limit while a small F number is maintained, the entrance pupil diameter becomes large and the diameter of the whole lens system becomes large. As a result, there is a problem in that the size of the lens system may increase. Alternatively, there is a problem in that it may be necessary to increase the total lens length in order to correct longitudinal chromatic aberration that occurs as the lens system becomes closer to a telephoto type optical system. As described above, by satisfying Conditional Expression (11), there is an advantage in achieving both a small F number and reduction in size of the lens system. In order to obtain more favorable characteristics, it is more preferable to satisfy Conditional Expression (11-1), and it is yet more preferable to satisfy Conditional Expression (11-2).

$$1.8 < 1/\{\tan(\omega \max) \times FNo\} < 4.5 \quad (11)$$

$$2.4 < 1/\{\tan(\omega \max) \times FNo\} < 4.2 \quad (11\text{-}1)$$

$$2.8 < 1/\{\tan(\omega \max) \times FNo\} < 3.8 \quad (11\text{-}2)$$

Next, a possible configuration example of the imaging lens of the present disclosure will be described. In each of the first to fifteenth configuration examples described below, only the second lens group G2 is configured to move along the optical axis Z during focusing. In the following description of the configuration examples, "first", "second" and the like attached to the cemented lenses are given for each configuration example. Therefore, for example, even in the case of the "first cemented lens", the configurations of the lenses included in the cemented lens may be different in a case where the configuration examples are different.

The imaging lens of the first configuration example consists of, in order from the object side, a first lens group G1, an aperture stop St, a second lens group G2, and a third lens group G3. The first lens group G1 consists of, in order from the object side, a biconcave lens, a positive lens convex toward the image side, two positive meniscus lenses each of which is convex toward the object side, a first cemented lens, and a negative meniscus lens convex toward the object side. The first cemented lens is configured such that a positive meniscus lens convex toward the object side and a negative meniscus lens convex toward the object side are cemented in order from the object side. The second lens group G2 consists of, in order from the object side, a negative meniscus lens concave toward the object side, a second cemented lens, and a third cemented lens. The second cemented lens is formed by cementing a biconvex lens and a biconcave lens in order from the object side. The third cemented lens is formed by cementing a biconvex lens and a negative lens concave toward the object side in order from the object side. The third lens group G3 consists of only biconvex lenses.

The imaging lens of the second configuration example consists of, in order from the object side, a first lens group G1, an aperture stop St, and a second lens group G2. The first lens group G1 and the second lens group G2 of the second configuration example are the same as the first lens group G1 and the second lens group G2 of the first configuration example, respectively.

The imaging lens of the third configuration example consists of, in order from the object side, a first lens group G1, an aperture stop St, and a second lens group G2. The first lens group G1 consists of, in order from the object side, a biconcave lens, a positive meniscus lens convex toward the object side, a biconvex lens, a positive meniscus lens convex toward the object side, a first cemented lens, and a negative meniscus lens convex toward the object side. The first cemented lens is configured such that a positive meniscus lens convex toward the object side and a negative meniscus lens convex toward the object side are cemented in order from the object side. The second lens group G2 consists of, in order from the object side, a second cemented lens, a negative meniscus lens concave toward the object side, and a third cemented lens. The second cemented lens is formed by cementing a biconcave lens and a biconvex lens in order from the object side. The third cemented lens is formed by cementing a biconvex lens and a biconcave lens in order from the object side.

The imaging lens of the fourth configuration example consists of, in order from the object side, a first lens group G1, an aperture stop St, and a second lens group G2. The first lens group G1 consists of, in order from the object side, a biconcave lens, a biconvex lens, three positive lenses convex toward the object side, a first cemented lens, and a negative meniscus lens convex toward the object side. The first cemented lens is formed by cementing a biconvex lens and a biconcave lens in order from the object side. The second lens group G2 consists of, in order from the object side, a second cemented lens, a biconcave lens, and a third cemented lens. The second cemented lens is formed by cementing a biconcave lens and a biconvex lens in order from the object side. The third cemented lens is formed by cementing a biconvex lens and a negative meniscus lens concave toward the object side in order from the object side.

The imaging lens of the fifth configuration example consists of, in order from the object side, a first lens group G1, an aperture stop St, and a second lens group G2. The first lens group G1 consists of, in order from the object side, a biconcave lens, a biconvex lens, three positive meniscus lenses each of which is convex toward the object side, and two negative meniscus lenses convex toward the object side. The second lens group G2 consists of, in order from the object side, a negative meniscus lens concave toward the object side, a first cemented lens, and a second cemented lens. The first cemented lens is formed by cementing a biconvex lens and a biconcave lens in order from the object side. The third cemented lens is formed by cementing a biconvex lens and a negative meniscus lens concave toward the object side in order from the object side.

The imaging lens of the sixth configuration example consists of, in order from the object side, a first lens group G1, an aperture stop St, a second lens group G2, and a third lens group G3. The first lens group G1 consists of, in order from the object side, three positive meniscus lenses each of which is convex toward the object side, a first cemented lens, and a second cemented lens. The first cemented lens is formed by cementing a negative meniscus lens convex toward the object side and a biconvex lens in order from the object side. The second cemented lens is formed by cementing a biconcave lens and a positive meniscus lens convex toward the object side in order from the object side. The second lens group G2 consists of, in order from the object side, a third cemented lens and a fourth cemented lens. The third cemented lens is formed by cementing a biconcave lens and a biconvex lens in order from the object side. The fourth cemented lens is formed by cementing a positive meniscus lens concave toward the object side and a biconcave lens in order from the object side. The third lens group G3 consists of, in order from the object side, a biconvex lens, a fifth cemented lens, a biconvex lens, and a biconcave lens. The fifth cemented lens is formed by cementing a positive lens convex toward the image side and a biconcave lens in order from the object side.

The imaging lens of the seventh configuration example consists of, in order from the object side, a first lens group G1, an aperture stop St, a second lens group G2, and a third lens group G3. The first lens group G1 consists of, in order from the object side, a biconcave lens, a biconvex lens, two positive meniscus lenses each of which is convex toward the object side, a first cemented lens, and a second cemented lens. The first cemented lens is formed by cementing a negative meniscus lens convex toward the object side and a biconvex lens in order from the object side. The second cemented lens is formed by cementing a biconcave lens and a positive lens convex toward the object side in order from the object side. The second lens group G2 and the third lens group G3 of the seventh configuration example are similar to the second lens group G2 and the third lens group G3 of the sixth configuration example, respectively.

The imaging lens of the eighth configuration example consists of, in order from the object side, a first lens group G1 and a second lens group G2. The first lens group G1 consists of, in order from the object side, a biconcave lens, a first cemented lens, a biconvex lens, a second cemented lens, a biconvex lens, and a positive meniscus lens convex toward the object side. The first cemented lens is formed by cementing a biconcave lens and a biconvex lens in order from the object side. The second cemented lens is formed by cementing a biconvex lens and a negative meniscus lens concave toward the object side in order from the object side. The second lens group G2 consists of, in order from the object side, a positive meniscus lens convex toward the object side, a third cemented lens, an aperture stop St, a negative meniscus lens concave toward the object side, and a fourth cemented lens. The third cemented lens is formed by cementing a biconvex lens and a biconcave lens in order from the object side. The fourth cemented lens is formed by cementing a biconvex lens, a biconcave lens, and a biconvex lens in order from the object side.

The imaging lens of the ninth configuration example consists of, in order from the object side, a first lens group G1 and a second lens group G2. The first lens group G1 consists of, in order from the object side, a positive lens convex toward the image side, a biconcave lens, a first cemented lens, a second cemented lens, a biconvex lens, and a positive meniscus lens convex toward the object side. The first cemented lens is formed by cementing a biconcave lens and a biconvex lens in order from the object side. The second cemented lens is formed by cementing a biconvex lens and a negative meniscus lens concave toward the object side in order from the object side. The second lens group G2 consists of, in order from the object side, a positive meniscus lens convex toward the object side, a third cemented lens, an aperture stop St, a fourth cemented lens, and a biconvex lens. The third cemented lens is formed by cementing a biconvex lens and a biconcave lens in order from the object side. The fourth cemented lens is configured such that a negative meniscus lens concave toward the object side and a positive meniscus lens concave toward the object side are cemented in order from the object side.

The imaging lens of the tenth configuration example consists of, in order from the object side, a first lens group G1 and a second lens group G2. The first lens group G1 of the tenth configuration example is similar to the first lens group G1 of the ninth configuration example. The second lens group G2 of the tenth configuration example consists of, in order from the object side, a positive meniscus lens convex toward the object side, a third cemented lens, an aperture stop St, a negative meniscus lens concave toward the object side, a positive meniscus lens concave toward the object side, and a fourth cemented lens. The third cemented lens is formed by cementing a biconvex lens and a biconcave lens in order from the object side. The fourth cemented lens is formed by cementing a biconvex lens and a biconcave lens in order from the object side.

The imaging lens of the eleventh configuration example consists of, in order from the object side, a first lens group G1, a second lens group G2, and a third lens group G3. The first lens group G1 consists of, in order from the object side, a positive meniscus lens convex toward the image side, a biconcave lens, a biconvex lens, a first cemented lens, and a second cemented lens. The first cemented lens is formed by cementing a biconcave lens and a biconvex lens in order from the object side. The second cemented lens is formed by cementing a biconvex lens and a negative meniscus lens concave toward the object side in order from the object side. The second lens group G2 consists of, in order from the object side, a positive meniscus lens convex toward the object side, a third cemented lens, an aperture stop St, a fourth cemented lens, and a biconvex lens. The third cemented lens is formed by cementing a biconvex lens and a biconcave lens in order from the object side. The fourth cemented lens is formed by cementing a biconcave lens and a biconvex lens in order from the object side. The third lens group G3 consists of a cemented lens in which a positive meniscus lens concave toward the object side and a negative meniscus lens concave toward the object side are cemented in order from the object side.

The imaging lens of the twelfth configuration example consists of, in order from the object side, a first lens group G1 and a second lens group G2. The first lens group G1 consists of, in order from the object side, a biconcave lens, a first cemented lens, a biconvex lens, a second cemented lens, a third cemented lens, and a biconvex lens. The first cemented lens is formed by cementing a biconcave lens and a biconvex lens in order from the object side. The second cemented lens is formed by cementing a biconcave lens and a positive meniscus lens convex toward the object side in order from the object side. The third cemented lens is formed by cementing a biconvex lens and a negative meniscus lens concave toward the object side in order from the object side. The second lens group G2 consists of, in order from the object side, a positive meniscus lens convex toward the object side, a fourth cemented lens, an aperture stop St, a biconcave lens, and a fifth cemented lens. The fourth cemented lens is formed by cementing a biconvex lens and a biconcave lens in order from the object side. The fifth cemented lens is formed by cementing a biconvex lens, a biconcave lens, and a biconvex lens in order from the object side.

The imaging lens of the thirteenth configuration example consists of, in order from the object side, a first lens group G1, an aperture stop St, a second lens group G2, and a third lens group G3. The first lens group G1 consists of, in order from the object side, a biconvex lens, a first cemented lens, a biconvex lens, a second cemented lens, a third cemented lens, two positive meniscus lenses each of which is convex toward the object side, a fourth cemented lens, and a negative meniscus lens convex toward the object side. The first cemented lens is formed by cementing a biconcave lens and a biconvex lens in order from the object side. The second cemented lens is formed by cementing a positive meniscus lens concave toward the object side and a biconcave lens in order from the object side. The third cemented lens is formed by cementing a biconvex lens and a negative meniscus lens concave toward the object side in order from the object side. The fourth cemented lens is formed by cementing a biconvex lens and a biconcave lens in order from the object side. The second lens group G2 consists of, in order from the object side, a negative meniscus lens concave toward the object side, and a fifth cemented lens. The fifth cemented lens is formed by cementing a biconvex lens, a biconcave lens, and a biconvex lens in order from the object side. The third lens group G3 consists of only a plano-concave lens concave toward the object side.

The imaging lens of the fourteenth configuration example consists of, in order from the object side, a first lens group G1, an aperture stop St, and a second lens group G2. The first lens group G1 consists of, in order from the object side, a biconcave lens, a first cemented lens, a biconvex lens, a biconcave lens, a second cemented lens, a biconvex lens, a positive meniscus lens convex toward the object side, a third cemented lens, and a negative meniscus lens convex toward the object side. The first cemented lens is formed by cementing a biconcave lens and a biconvex lens in order from the object side. The second cemented lens is formed by cementing a biconvex lens and a negative meniscus lens concave toward the object side in order from the object side. The third cemented lens is formed by cementing a biconvex lens and a biconcave lens in order from the object side. The second lens group G2 consists of, in order from the object side, a biconcave lens, a fourth cemented lens, and a biconvex lens. The fourth cemented lens is formed by cementing a biconvex lens and a biconcave lens in order from the object side.

The imaging lens of the fifteenth configuration example consists of, in order from the object side, a first lens group G1, an aperture stop St, a second lens group G2, and a third lens group G3. The first lens group G1 consists of, in order from the object side, a biconcave lens, a first cemented lens, a biconvex lens, a second cemented lens, a third cemented lens, a biconvex lens, two positive meniscus lenses each of which is convex toward the object side, a fourth cemented lens, and a negative meniscus lens convex toward the object side. The first cemented lens is formed by cementing a biconcave lens and a biconvex lens in order from the object side. The second cemented lens is formed by cementing a positive meniscus lens concave toward the object side and a biconcave lens in order from the object side. The third cemented lens is formed by cementing a biconvex lens and a negative meniscus lens concave toward the object side in order from the object side. The fourth cemented lens is formed by cementing a biconvex lens and a biconcave lens in order from the object side. The second lens group G2 consists of, in order from the object side, a negative meniscus lens concave toward the object side, and a fifth cemented lens. The fifth cemented lens is formed by cementing, in order from the object side, a biconvex lens, a negative meniscus lens concave toward the object side, and a positive meniscus lens concave toward the object side. The third lens group G3 consists of a plano-convex lens convex toward the object side.

The above-mentioned preferred configurations and available configurations may be optional combinations, and it is preferable to selectively adopt the configurations in accordance with required specification. According to the technology of the present disclosure, it is possible to realize a suitable imaging lens which has a small F number and in which aberration is satisfactorily corrected.

Next, numerical examples of the imaging lens of the present disclosure will be described.

Example 1

FIG. 1 shows a cross-sectional configuration of an imaging lens of Example 1, and an illustration method and a configuration thereof is as described above. Therefore, repeated description is partially omitted herein. The imaging lens of Example 1 consists of, in order from the object side, a first lens group G1 that has a positive refractive power, an aperture stop St, a second lens group G2 that has a positive refractive power, and a third lens group G3 that has a positive refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side. The third lens group G3 consists of one lens L3a.

Regarding the imaging lens of Example 1, Table 1 shows basic lens data, Table 2 shows a specification, Table 3 shows variable surface distances, and Table 4 shows aspheric surface coefficients. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, the column of vd shows an Abbe number of each constituent element based on the d line, and the column of θgF shows a partial dispersion ratio of each constituent element between the g line and the F line.

In Table 1, the sign of the radius of curvature of the surface convex toward the object side is positive and the sign of the radius of curvature of the surface convex toward the image side is negative. Table 1 also shows the aperture stop St and the optical member PP, and in the column of the surface number of the surface corresponding to the aperture stop St, the surface number and (St) are noted. A value at the bottom place of D in Table 1 indicates a distance between the image plane Sim and the surface closest to the image side in the table. In Table 1, the variable surface distances, which are distances variable during focusing, are referenced by the reference signs DD[ ], and are written into places of D, where object side surface numbers of distances are noted in [ ].

Table 2 shows values of the focal length f, the F number FNo., and the maximum total angle of view 2ω max of the imaging lens. FNo. is the same as FNo used in the above conditional expression. The unit of 2ω max is degree. The values shown in Table 2 are values in the case of using the d line as a reference in a state where the object at infinity is in focus.

In Table 3, the column labelled "Infinity" shows values of the variable surface distance in the state where the object at infinity is in focus and the column labelled "0.7 m" shows values of the variable surface distance in the state where an object at a distance of 0.7 m (meters) from the object to the image plane Sim is in focus.

In Table 1, the reference sign * is attached to surface numbers of aspheric surfaces, and numerical values of the paraxial radius of curvature are written into the column of the radius of curvature of the aspheric surface. In Table 4, the row of Sn shows surface numbers of the aspheric surfaces, and the rows of KA and Am (m is an integer of 3 or more, and is different for each surface) shows numerical values of the aspheric surface coefficients for each aspheric surface. The "E±n" (n: an integer) in numerical values of the aspheric surface coefficients of Table 4 indicates "'$10^{\pm n}$'". KA and Am are the aspheric surface coefficients in the aspheric surface expression represented by the following expression.

$$Zd = C \times h^2 / \{1 + (1 - KA \times C^2 \times h^2)^{1/2}\} + \Sigma Am \times h^m$$

Here,

Zd is an aspheric surface depth (a length of a perpendicular from a point on an aspheric surface at height h to a plane that is perpendicular to the optical axis and contacts with the vertex of the aspheric surface), h is a height (a distance from the optical axis to the lens surface), C is an inverse of paraxial radius of curvature, KA and Am are aspheric surface coefficients, and $\Sigma$ in the aspheric surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | vd | θgF |
|---|---|---|---|---|---|
| 1 | −202.46222 | 2.400 | 1.61750 | 36.25 | 0.58409 |
| 2 | 84.17703 | 10.655 | | | |
| 3 | 116.82988 | 10.000 | 1.45860 | 90.19 | 0.53516 |
| 4 | −99.70316 | 1.010 | | | |
| 5 | 58.97589 | 6.168 | 2.00272 | 19.32 | 0.64514 |
| 6 | 157.48112 | 0.200 | | | |
| 7 | 39.80574 | 10.250 | 1.59282 | 68.62 | 0.54414 |
| 8 | 93.85195 | 0.200 | | | |
| 9 | 32.50135 | 7.910 | 1.53945 | 63.48 | 0.53990 |
| 10 | 113.27635 | 1.500 | 1.85896 | 22.73 | 0.62844 |
| 11 | 30.08960 | 2.350 | | | |
| 12 | 48.57213 | 1.500 | 1.98613 | 16.48 | 0.66558 |
| 13 | 23.70172 | 7.000 | | | |
| 14(St) | ∞ | DD[14] | | | |
| *15 | −16.62654 | 1.800 | 1.68948 | 31.02 | 0.59874 |
| *16 | −20.47694 | 0.200 | | | |
| 17 | 46.52462 | 7.524 | 1.95375 | 32.32 | 0.59015 |
| 18 | −24.94567 | 1.110 | 1.78555 | 25.72 | 0.61045 |
| 19 | 32.92450 | 1.205 | | | |
| 20 | 53.58123 | 8.896 | 1.95375 | 32.32 | 0.59015 |
| 21 | −21.67977 | 1.210 | 1.63849 | 34.39 | 0.58799 |
| 22 | 121.65386 | DD[22] | | | |
| 23 | 350.00000 | 2.000 | 1.90602 | 23.33 | 0.62075 |
| 24 | −350.00000 | 12.401 | | | |

TABLE 1-continued

Example 1

| Sn | R | D | Nd | vd | θgF |
|---|---|---|---|---|---|
| 25 | ∞ | 2.850 | 1.51680 | 64.20 | 0.53430 |
| 26 | ∞ | 1.000 | | | |

TABLE 2

Example 1

| | |
|---|---|
| f | 51.529 |
| FNo. | 1.03 |
| 2ωmax | 30.6 |

TABLE 3

Example 1

| | Infinity | 0.7 m |
|---|---|---|
| DD[14] | 11.000 | 5.227 |
| DD[22] | 1.004 | 6.777 |

TABLE 4

Example 1

| Sn | 15 | 16 |
|---|---|---|
| KA | 1.0000000E+00 | 1.0000000E+00 |
| A3 | 0.0000000E+00 | 0.0000000E+00 |
| A4 | 1.4134736E−05 | 1.5709981E−05 |
| A5 | 2.6259559E−05 | 2.5965284E−05 |
| A6 | −3.3907589E−06 | −4.2475360E−06 |
| A7 | −2.4053109E−07 | −1.2459177E−08 |
| A8 | 1.0812258E−07 | 1.0406812E−07 |
| A9 | −2.4866912E−09 | −8.5930892E−09 |
| A10 | −1.7843185E−09 | −1.0929846E−09 |
| A11 | 1.2258615E−10 | 1.6907154E−10 |
| A12 | 1.6697433E−11 | 4.3662373E−12 |
| A13 | −1.8317390E−12 | −1.5987613E−12 |
| A14 | −7.6120774E−14 | 1.5986683E−14 |
| A15 | 1.4012767E−14 | 8.3615812E−15 |
| A16 | 2.5265457E−17 | −2.3879418E−16 |
| A17 | −5.5017957E−17 | −2.3215598E−17 |
| A18 | 1.1014057E−18 | 9.2450531E−19 |
| A19 | 8.7746514E−20 | 2.6760815E−20 |
| A20 | −2.9531051E−21 | −1.2643529E−21 |

Figure 2:
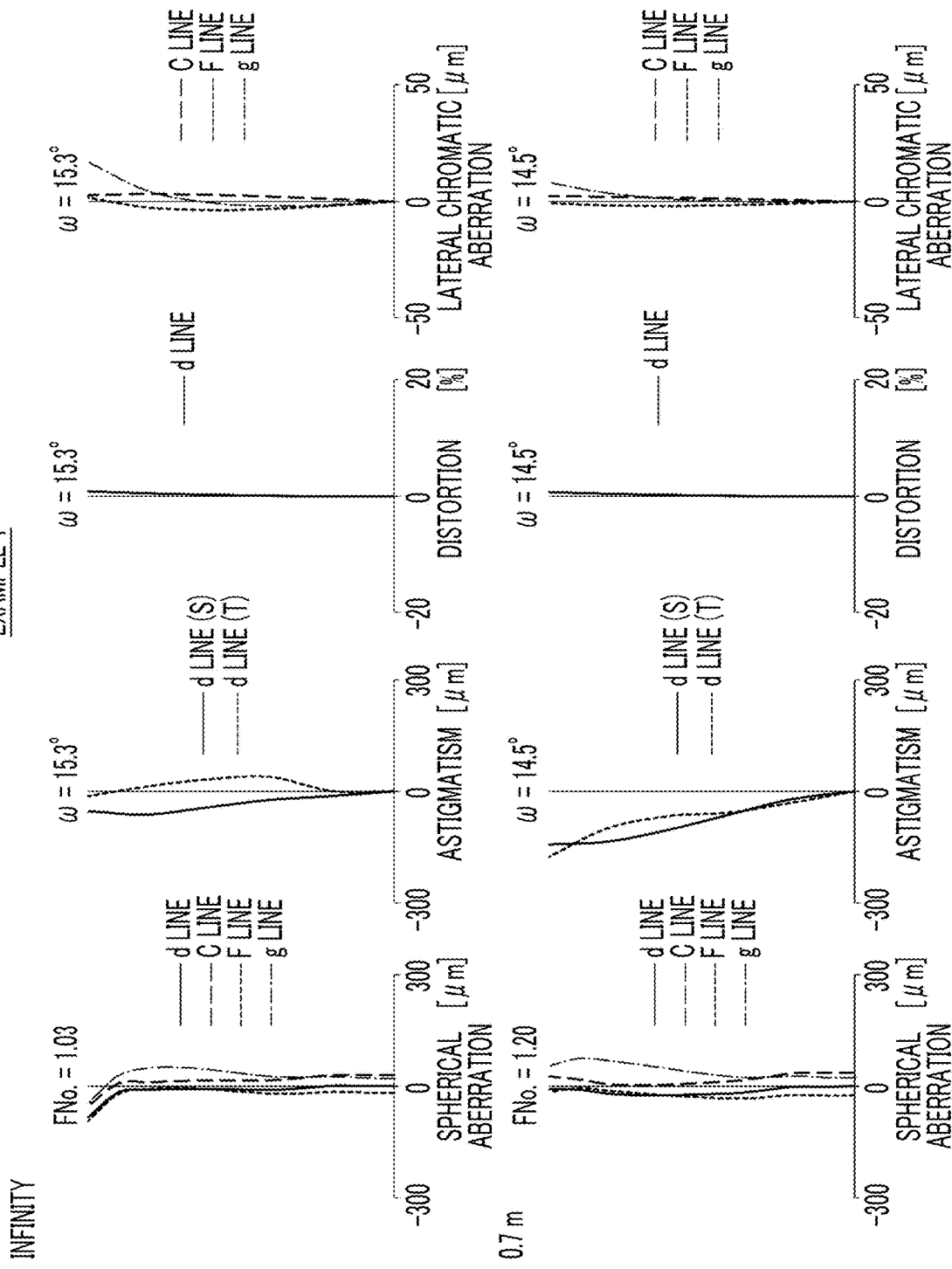
FIG. 2 shows spherical aberration diagrams, astigmatism diagrams, distortion diagrams, lateral chromatic aberration diagrams of the imaging lens of Example 1.
Figure 3:
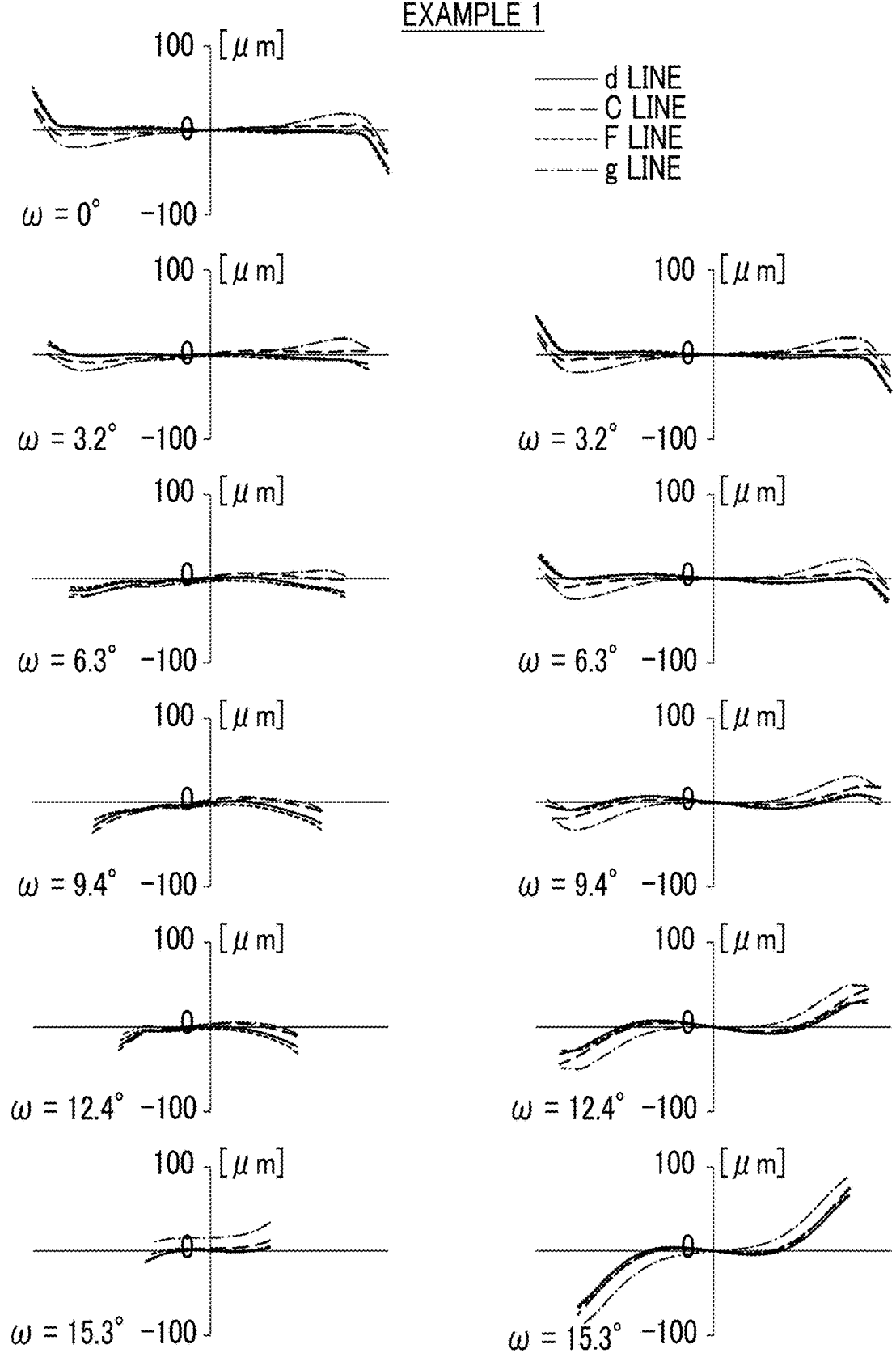
FIG. 3 shows lateral aberration diagrams of the imaging lens according to Example 1.

FIGS. 2 and 3 each show aberration diagrams of the imaging lens of Example 1. FIG. 2 shows spherical aberration diagrams, astigmatism diagrams, distortion diagrams, and lateral chromatic aberration diagrams in order from the left. In FIG. 2, the upper part labeled "INFINITY" shows aberration diagrams in a state where the object at infinity is in focus, and the lower part labeled "0.7 m" shows aberration diagrams in a state where an object at the distance of 0.7 m (meter) from the object to the image plane Sim is in focus. In the spherical aberration diagram, aberrations at the d line, the C line, the F line, and the g line are indicated by the solid line, the long dashed line, the short dashed line, and the chain line, respectively. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line, the F line, and the g line are respectively indicated by the long dashed line, the short dashed line, and the chain line. In the spherical aberration diagram, FNo. indicates an F number. In the other aberration diagrams, w indicates a half angle of view. In FIG. 2, values of FNo. and w corresponding to the upper part in the vertical axis of each diagram are shown next to "=".

FIG. 3 shows lateral aberration diagram in a state wherestate where the object at infinity is in focus. The left column shows tangential aberration and the right column shows sagittal aberration for each angle of view. In FIG. 3, ω means a half angle of view. In the lateral aberration diagram, aberrations at the d line, the C line, the F line, and the g line are indicated by the solid line, the long dashed line, the short dashed line, and the chain line, respectively.

Symbols, meanings, description methods, and illustration methods of the respective data pieces according to Example 1 are the same as those in the following examples unless otherwise noted. Therefore, in the following description, repeated description will be partially omitted.

Example 2

Figure 4:
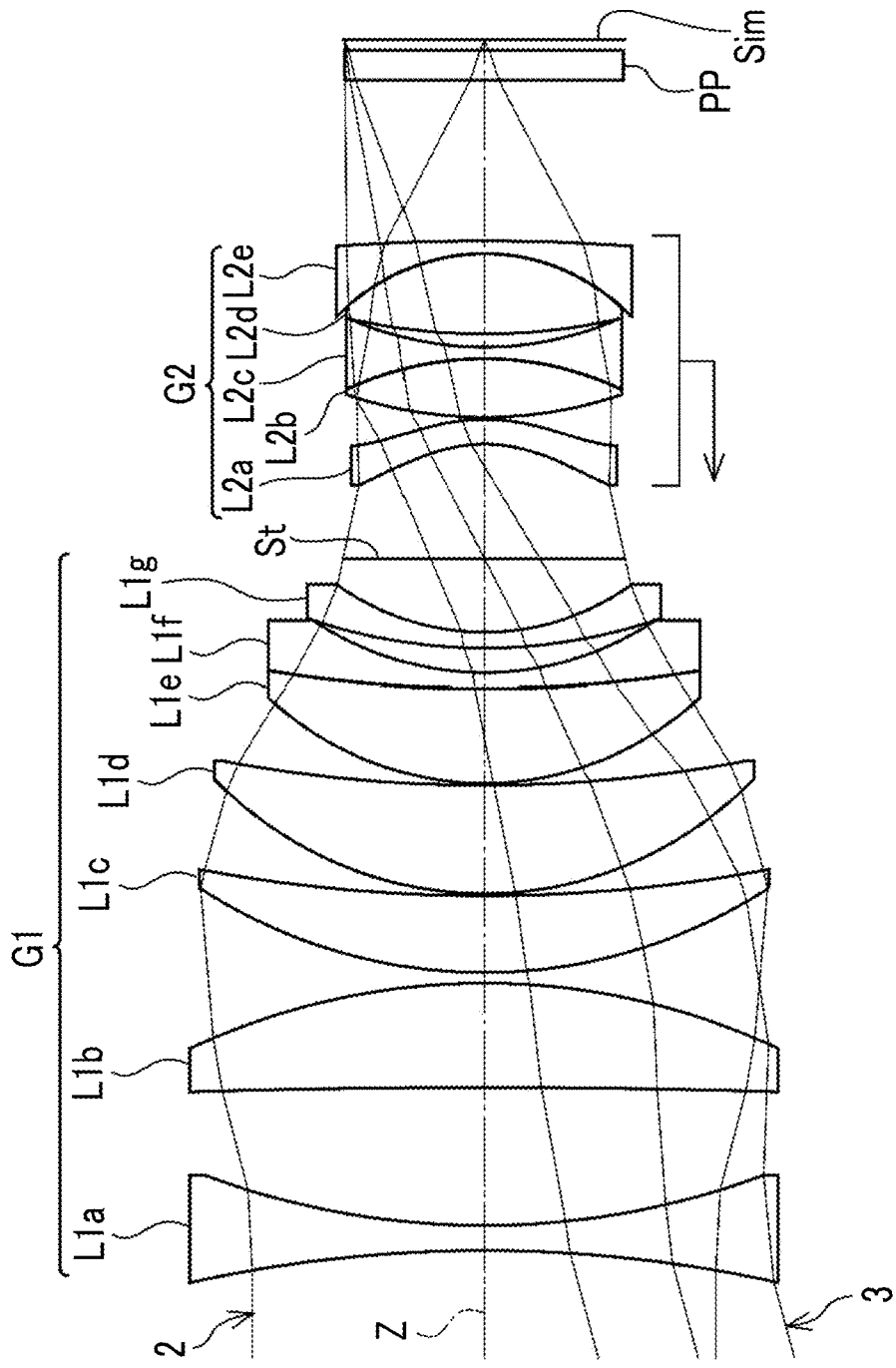
FIG. 4 is a cross-sectional view showing a configuration and rays of an imaging lens of Example 2.

FIG. 4 shows a cross-sectional configuration of the imaging lens of Example 2. The imaging lens of Example 2 consists of, in order from the object side, the first lens group G1 that has a positive refractive power, the aperture stop St, and the second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 5:
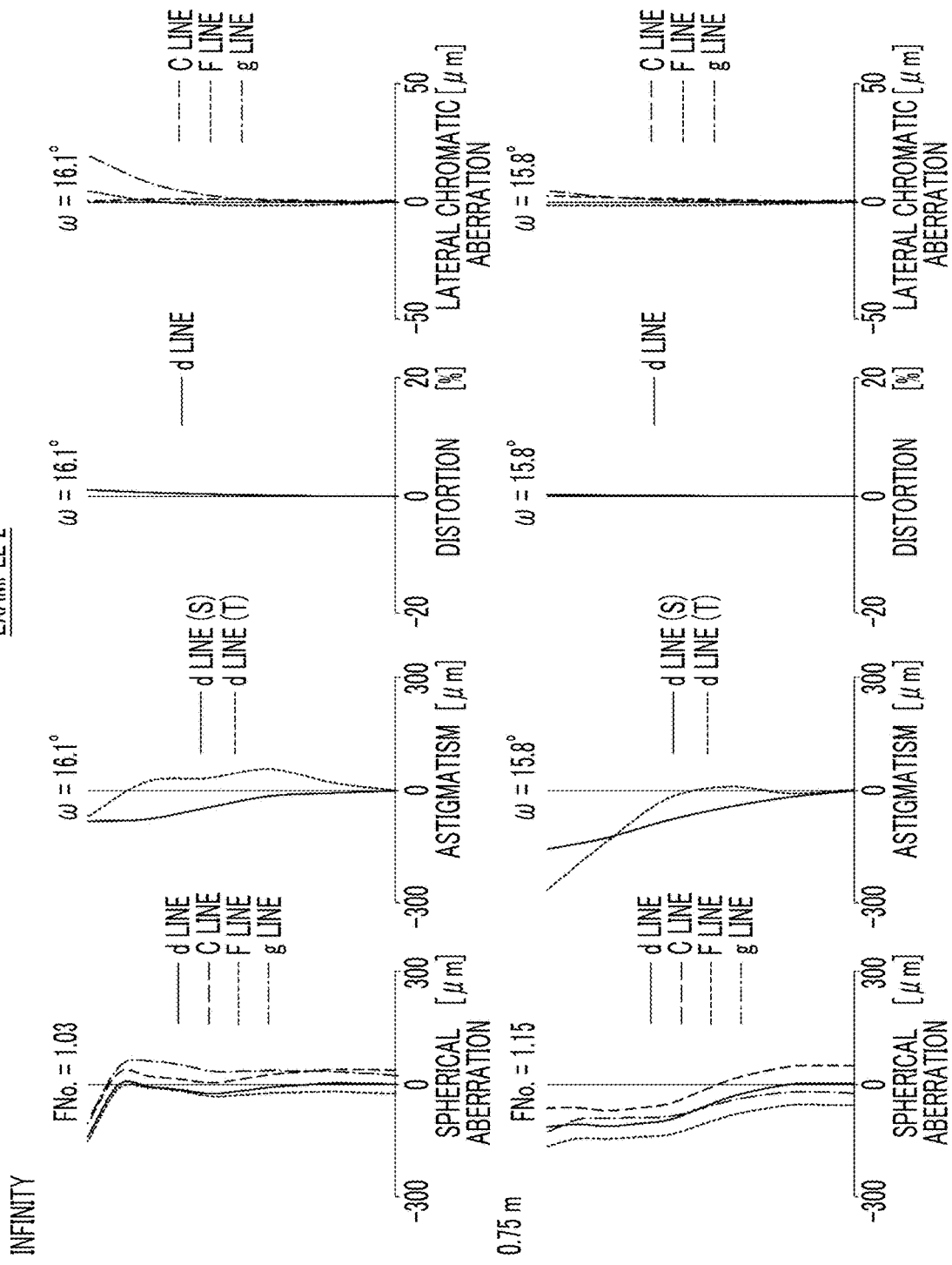
FIG. 5 shows spherical aberration diagrams, astigmatism diagrams, distortion diagrams, lateral chromatic aberration diagrams of the imaging lens of Example 2.
Figure 6:
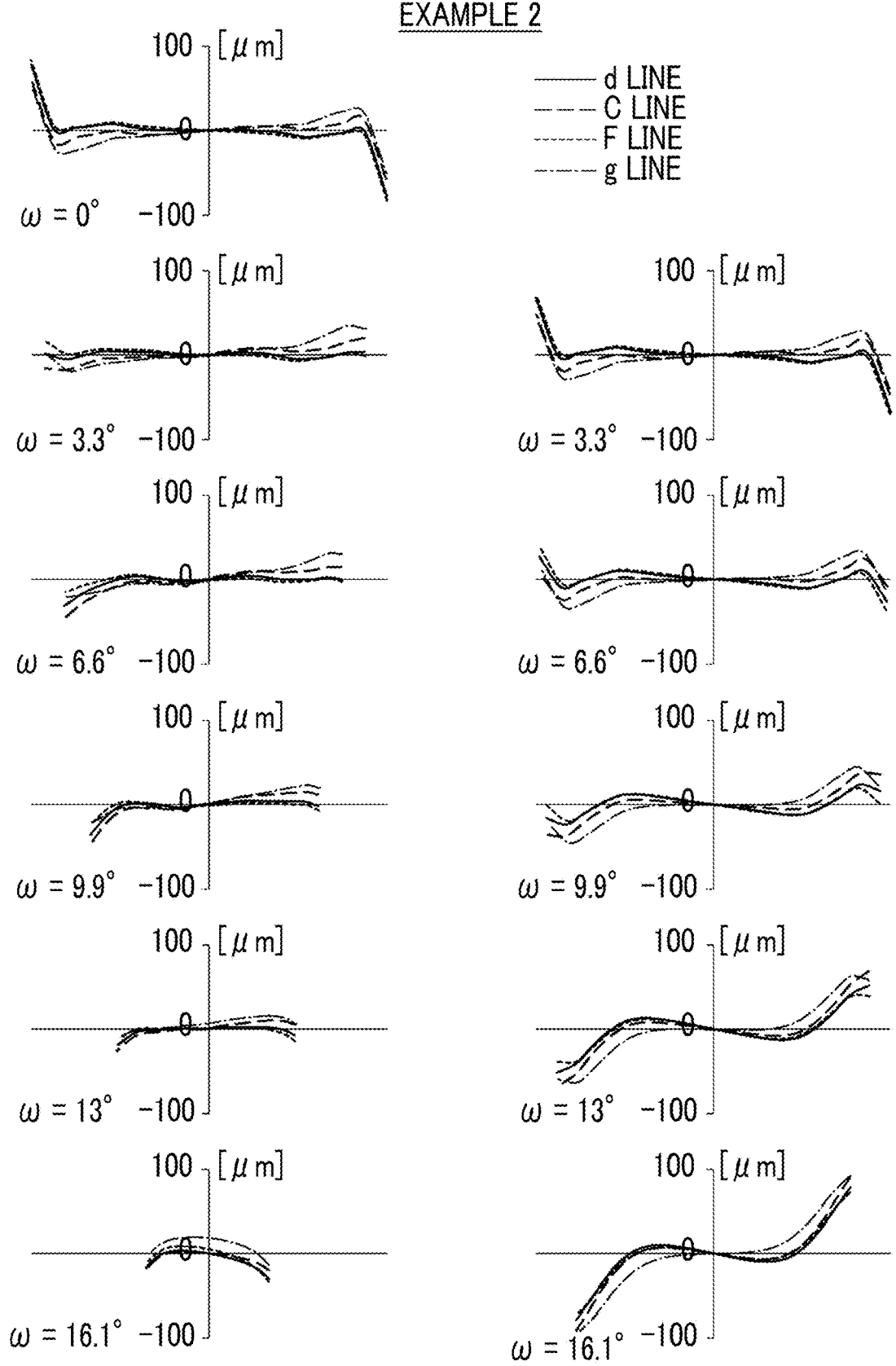
FIG. 6 shows lateral aberration diagrams of the imaging lens according to Example 2.

Regarding the imaging lens of Example 2, Table 5 shows basic lens data, Table 6 shows specification, Table 7 shows variable surface distances, Table 8 shows aspheric surface coefficients, and FIGS. 5 and 6 show aberration diagrams. In FIG. 5, the upper part shows aberration diagrams in a state where the object at infinity is in focus, and the lower part shows aberration diagrams in a state where the object at the distance of 0.75 m (meter) from the object to the image plane Sim is in focus. FIG. 6 shows lateral aberration diagram in a state where the object at infinity is in focus.

TABLE 5

Example 2

| Sn | R | D | Nd | vd | θgF |
|---|---|---|---|---|---|
| 1 | −147.83201 | 2.400 | 1.56607 | 42.61 | 0.57194 |
| 2 | 86.55844 | 13.196 | | | |
| 3 | −1112.59959 | 10.000 | 1.49700 | 81.61 | 0.53887 |
| 4 | −74.96995 | 1.010 | | | |
| 5 | 56.10284 | 7.350 | 1.92286 | 20.88 | 0.63900 |
| 6 | 168.76278 | 0.200 | | | |
| 7 | 39.99940 | 10.364 | 1.49700 | 81.61 | 0.53887 |
| 8 | 153.92109 | 0.200 | | | |
| 9 | 33.63361 | 9.003 | 1.58350 | 61.79 | 0.54178 |
| 10 | 143.73093 | 1.500 | 1.89286 | 20.36 | 0.63944 |
| 11 | 32.94000 | 2.350 | | | |
| 12 | 58.54173 | 1.500 | 1.98613 | 16.48 | 0.66558 |
| 13 | 26.84925 | 7.000 | | | |
| 14(St) | ∞ | DD[14] | | | |
| *15 | −16.34007 | 2.374 | 1.68948 | 31.02 | 0.59874 |
| *16 | −20.92321 | 0.200 | | | |
| 17 | 46.16889 | 5.601 | 2.00100 | 29.13 | 0.59952 |
| 18 | −34.75772 | 1.110 | 1.82933 | 23.53 | 0.61772 |

TABLE 5-continued

Example 2

| Sn | R | D | Nd | vd | θgF |
|---|---|---|---|---|---|
| 19 | 36.00359 | 1.259 | | | |
| 20 | 65.48463 | 7.692 | 2.00100 | 29.13 | 0.59952 |
| 21 | −21.60337 | 1.210 | 1.72399 | 28.80 | 0.60142 |
| 22 | −221.70851 | DD[22] | | | |
| 23 | ∞ | 2.850 | 1.51680 | 64.20 | 0.53430 |
| 24 | ∞ | 1.000 | | | |

TABLE 6

Example 2

| | |
|---|---|
| f | 48.912 |
| FNo. | 1.03 |
| 2ωmax | 32.2 |

TABLE 7

Example 2

| | Infinity | 0.75 m |
|---|---|---|
| DD[14] | 11.000 | 6.974 |
| DD[22] | 15.398 | 19.418 |

TABLE 8

Example 2

| Sn | 15 | 16 |
|---|---|---|
| KA | 1.0000000E+00 | 1.0000000E+00 |
| A3 | 0.0000000E+00 | 0.0000000E+00 |
| A4 | 1.1642920E−05 | 1.4474213E−05 |
| A5 | 2.1306014E−05 | 2.0258437E−05 |
| A6 | −3.3814546E−06 | −4.0400080E−05 |
| A7 | −1.9812243E−07 | 4.7913832E−08 |
| A8 | 1.0663262E−07 | 9.6017868E−08 |
| A9 | −1.5803952E−09 | −8.4598138E−09 |
| A10 | −1.8092896E−09 | −9.9449719E−10 |
| A11 | 9.0694353E−11 | 1.5710711E−10 |
| A12 | 1.8185970E−11 | 4.0001956E−12 |
| A13 | −1.4218748E−12 | −1.4517868E−12 |
| A14 | −9.8519189E−14 | 1.3061204E−14 |
| A15 | 1.1294372E−14 | 7.4850181E−15 |
| A16 | 1.8703189E−16 | −2.0136740E−16 |
| A17 | −4.5775183E−17 | −2.0557864E−17 |
| A18 | 5.1939904E−19 | 7.6973691E−19 |
| A19 | 7.4994186E−20 | 2.3482464E−20 |
| A20 | −2.1146255E−21 | −1.0301864E−21 |

Example 3

Figure 7:
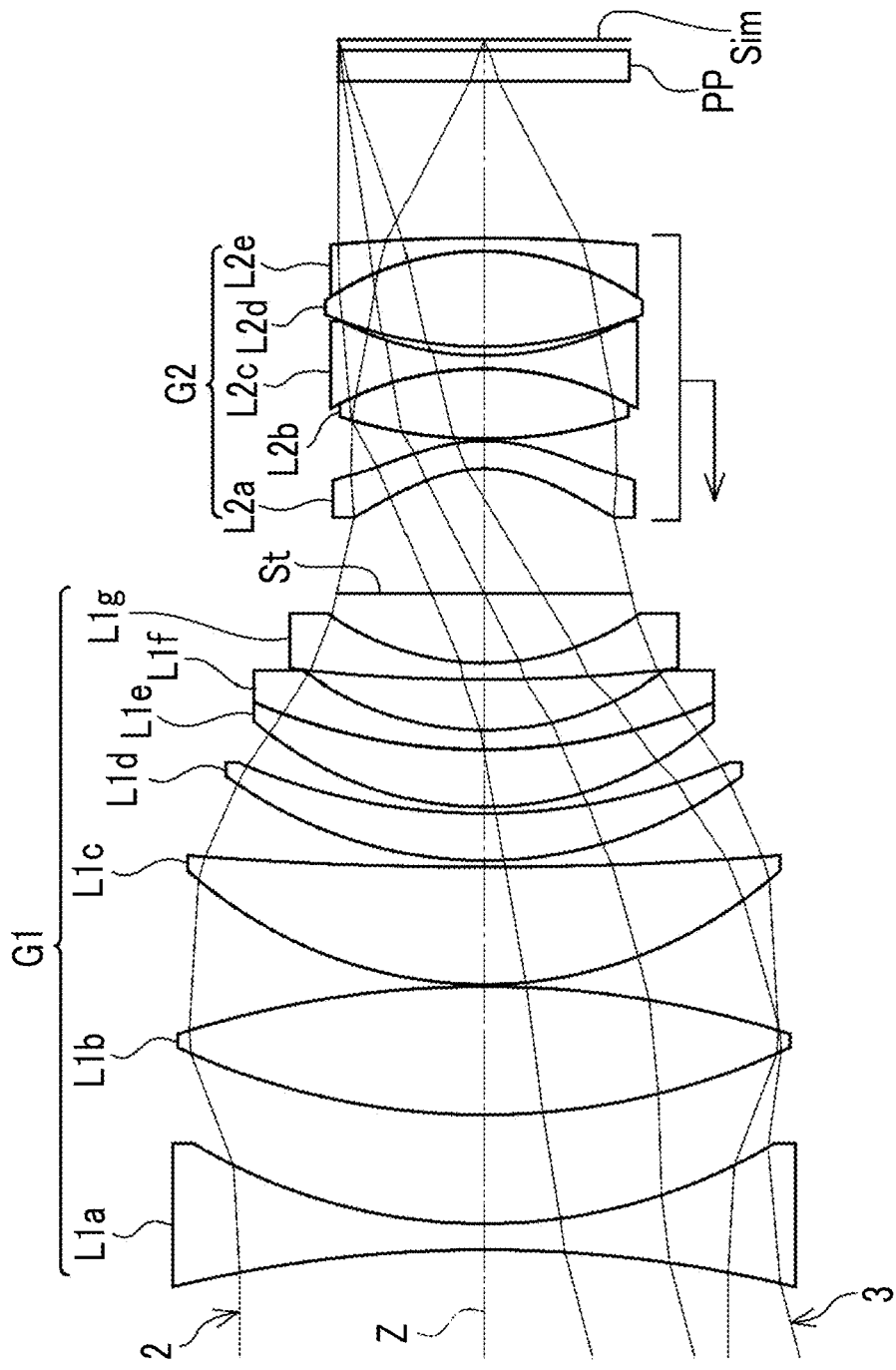
FIG. 7 is a cross-sectional view showing a configuration and rays of an imaging lens of Example 3.

FIG. 7 shows a cross-sectional configuration of the imaging lens of Example 3. The imaging lens of Example 3 consists of, in order from the object side, the first lens group G1 that has a positive refractive power, the aperture stop St, and the second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 8:
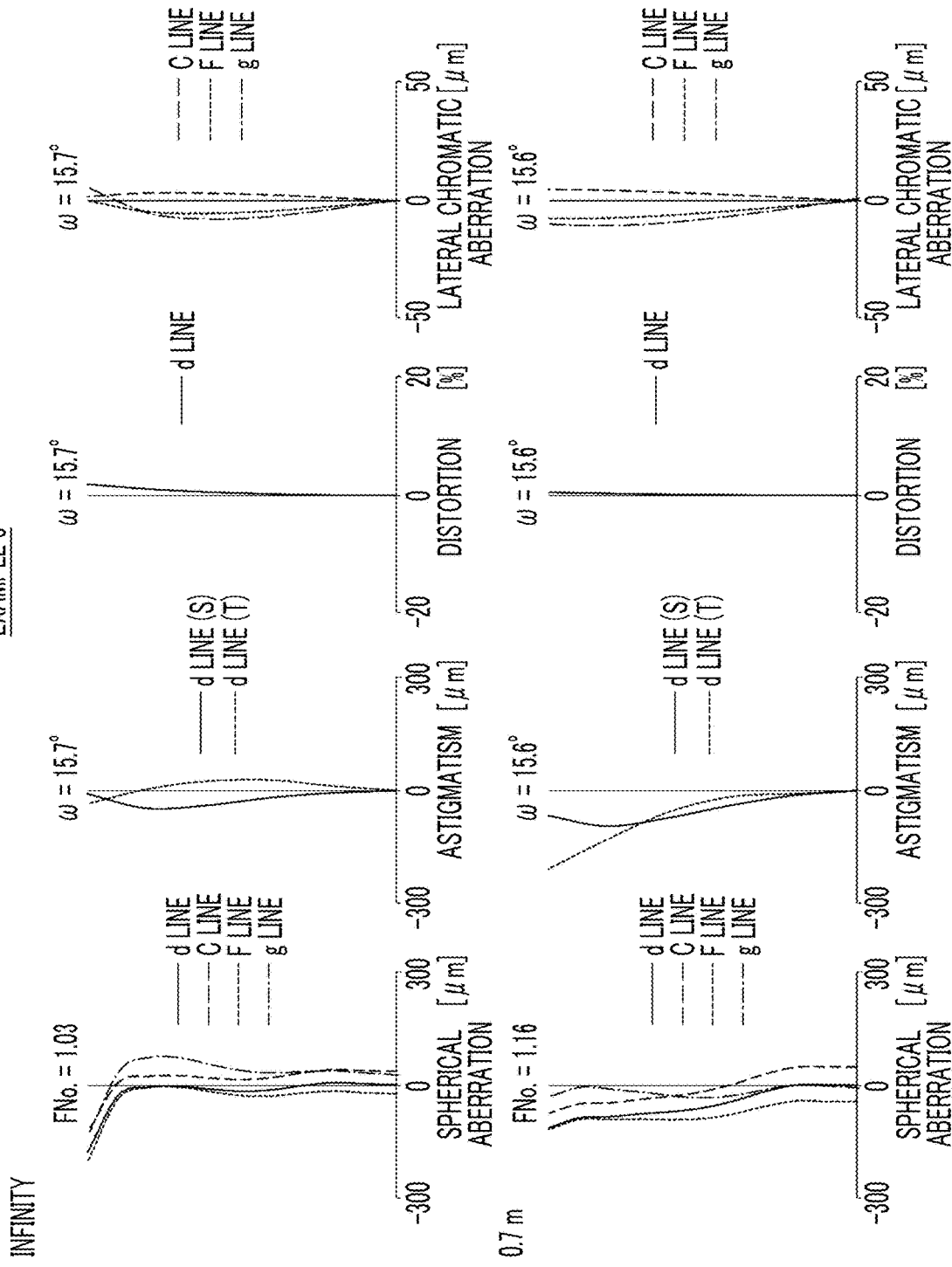
FIG. 8 shows spherical aberration diagrams, astigmatism diagrams, distortion diagrams, lateral chromatic aberration diagrams of the imaging lens of Example 3.
Figure 9:
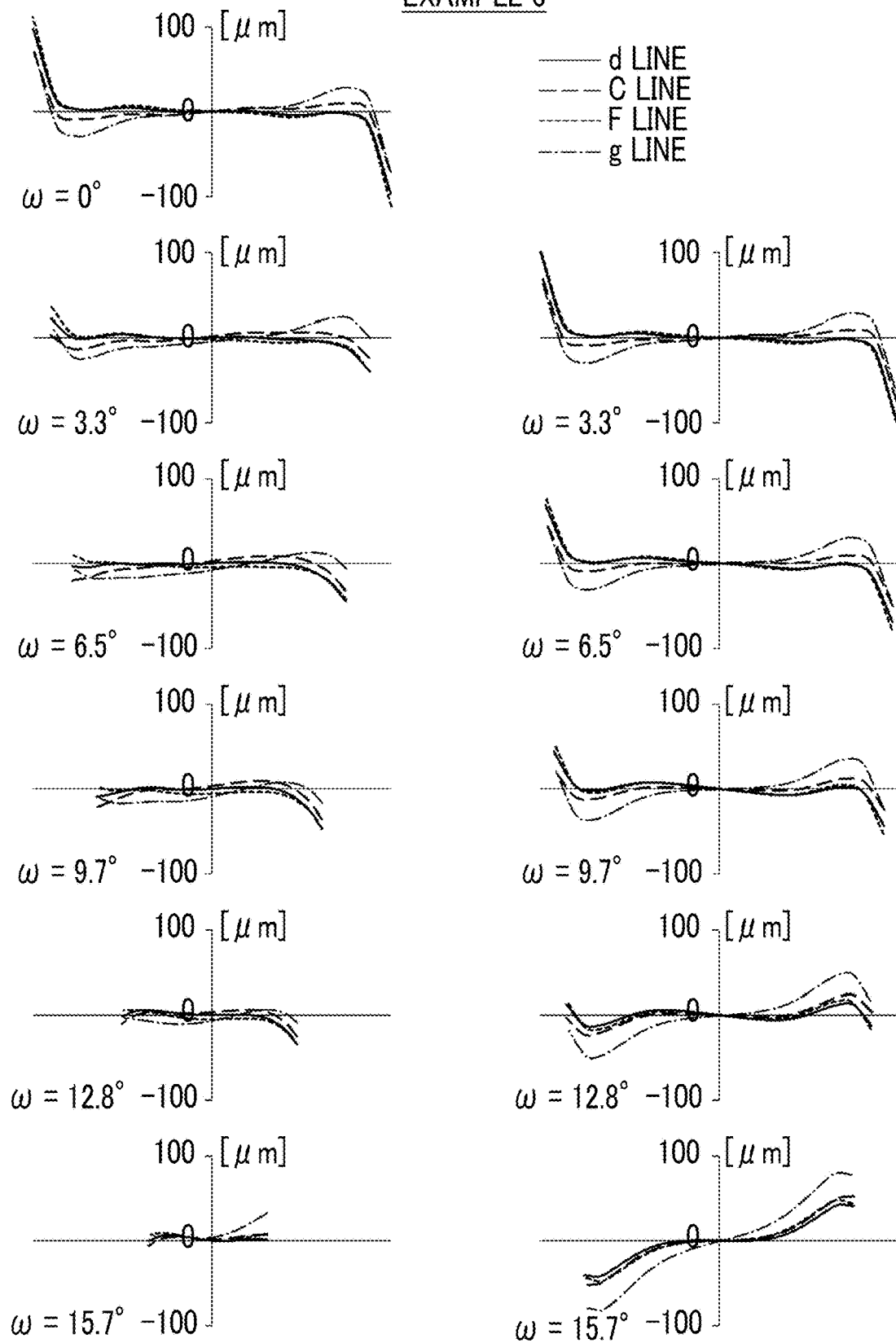
FIG. 9 shows lateral aberration diagrams of the imaging lens according to Example 3.

Regarding the imaging lens of Example 3, Table 9 shows basic lens data, Table 10 shows specification, Table 11 shows variable surface distances, Table 12 shows aspheric surface coefficients, and FIGS. 8 and 9 show aberration diagrams. In FIG. 8, the upper part shows aberration diagrams in a state where the object at infinity is in focus, and the lower part shows aberration diagrams in a state where the object at the distance of 0.7 m (meter) from the object to the image plane Sim is in focus. FIG. 9 shows lateral aberration diagram in a state where the object at infinity is in focus.

TABLE 9

Example 3

| Sn | R | D | Nd | vd | θgF |
|---|---|---|---|---|---|
| 1 | −138.62827 | 2.400 | 1.54072 | 47.23 | 0.56780 |
| 2 | 58.55723 | 10.030 | | | |
| 3 | 75.89616 | 11.800 | 1.59282 | 68.62 | 0.54414 |
| 4 | −105.01257 | 0.200 | | | |
| 5 | 45.45982 | 10.800 | 1.59282 | 68.62 | 0.54414 |
| 6 | 399.21443 | 0.600 | | | |
| 7 | 44.95362 | 4.320 | 1.95906 | 17.47 | 0.65993 |
| 8 | 63.84817 | 0.600 | | | |
| 9 | 36.12697 | 5.270 | 1.78800 | 47.52 | 0.55545 |
| 10 | 60.17700 | 1.800 | 1.89286 | 20.36 | 0.63944 |
| 11 | 31.65635 | 4.565 | | | |
| 12 | 177.12407 | 1.520 | 1.80809 | 22.76 | 0.63073 |
| 13 | 27.86122 | 6.406 | | | |
| 14(St) | ∞ | DD[14] | | | |
| *15 | −14.64464 | 2.550 | 1.68863 | 31.20 | 0.60109 |
| *16 | −18.73058 | 0.200 | | | |
| 17 | 49.66071 | 6.450 | 1.88300 | 39.22 | 0.57295 |
| 18 | −32.52200 | 1.210 | 1.69895 | 30.05 | 0.60174 |
| 19 | 32.52200 | 0.820 | | | |
| 20 | 42.22428 | 8.800 | 1.88300 | 39.22 | 0.57295 |
| 21 | −28.75400 | 1.210 | 1.62005 | 36.35 | 0.58602 |
| 22 | −178.14293 | DD[22] | | | |
| 23 | ∞ | 2.850 | 1.51680 | 64.20 | 0.53430 |
| 24 | ∞ | 1.000 | | | |

TABLE 10

Example 3

| f | 49.549 |
|---|---|
| FNo. | 1.03 |
| 2ωmax | 31.4 |

TABLE 11

Example 3

| | Infinity | 0.7 m |
|---|---|---|
| DD[14] | 11.466 | 7.025 |
| DD[22] | 14.401 | 18.842 |

TABLE 12

Example 3

| Sn | 15 | 16 |
|---|---|---|
| KA | 1.0000000E+00 | 1.0000000E+00 |
| A3 | 0.0000000E+00 | 0.0000000E+00 |
| A4 | 5.0823068E−05 | 3.9661172E−05 |
| A5 | 5.6696216E−06 | 7.3155985E−06 |
| A6 | −1.1665918E−06 | −1.9241870E−06 |
| A7 | 2.3011235E−07 | 2.0632606E−07 |
| A8 | −8.5462646E−09 | 2.7709406E−08 |
| A9 | −3.9871990E−09 | −6.9926396E−09 |

TABLE 12-continued

Example 3

| Sn | 15 | 16 |
|---|---|---|
| A10 | 5.8946218E−10 | −2.2702122E−11 |
| A11 | 6.8551648E−12 | 9.8429055E−11 |
| A12 | −7.4371184E−12 | −3.5432557E−12 |
| A13 | 3.9451971E−13 | −7.7218349E−13 |
| A14 | 3.7621265E−14 | 4.3918443E−14 |
| A15 | −4.2785117E−15 | 3.5209637E−15 |
| A16 | −2.5668735E−17 | −2.5005394E−16 |
| A17 | 1.8252095E−17 | −8.7077803E−18 |
| A18 | −4.3536351E−19 | 7.1579377E−19 |
| A19 | −2.9072588E−20 | 9.0040531E−21 |
| A20 | 1.1528202E−21 | −8.3059544E−22 |

Example 4

Figure 10:
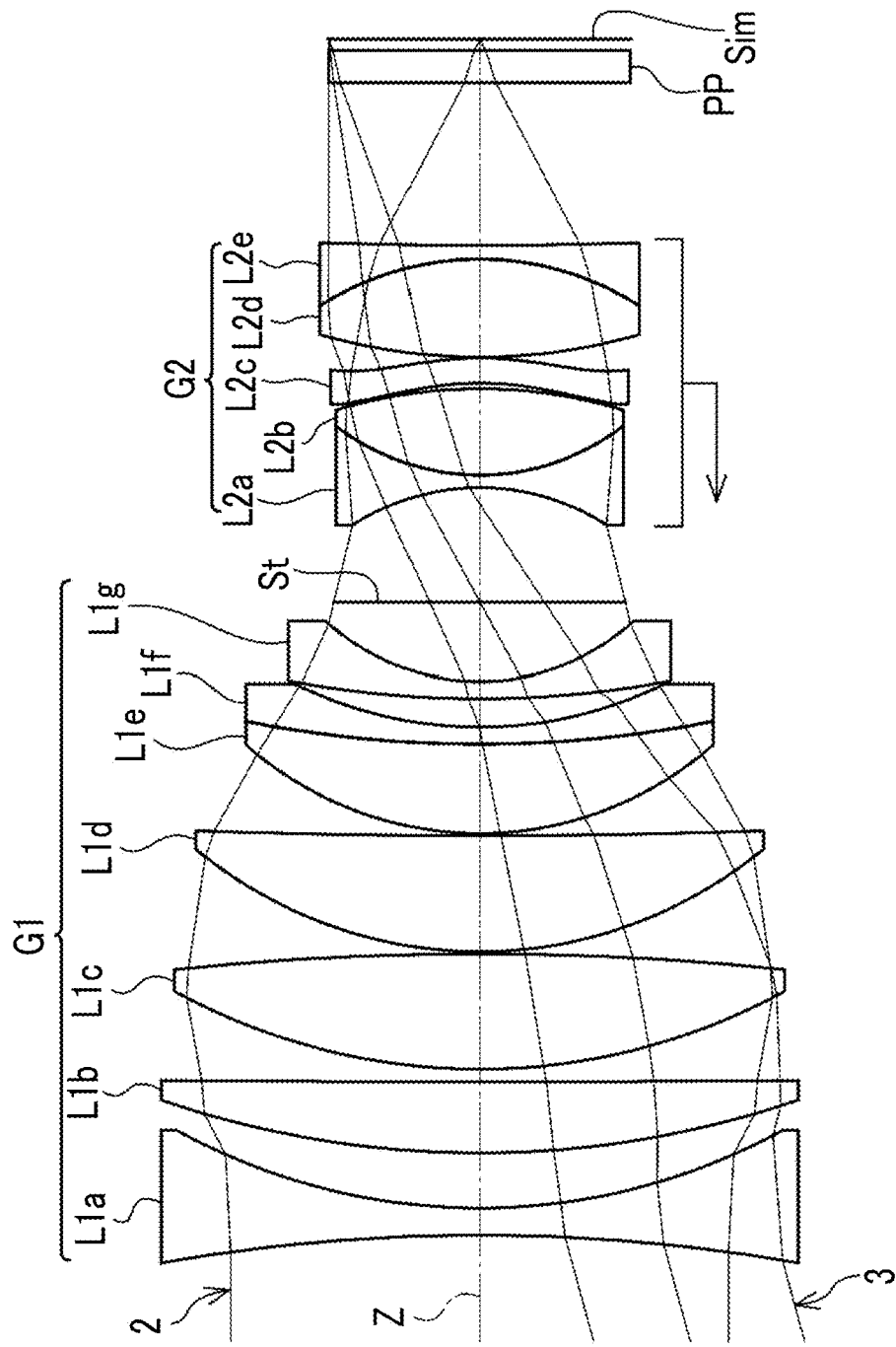
FIG. 10 is a cross-sectional view showing a configuration and rays of an imaging lens of Example 4.

FIG. 10 shows a cross-sectional configuration of the imaging lens of Example 4. The imaging lens of Example 4 consists of, in order from the object side, the first lens group G1 that has a positive refractive power, the aperture stop St, and the second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 11:
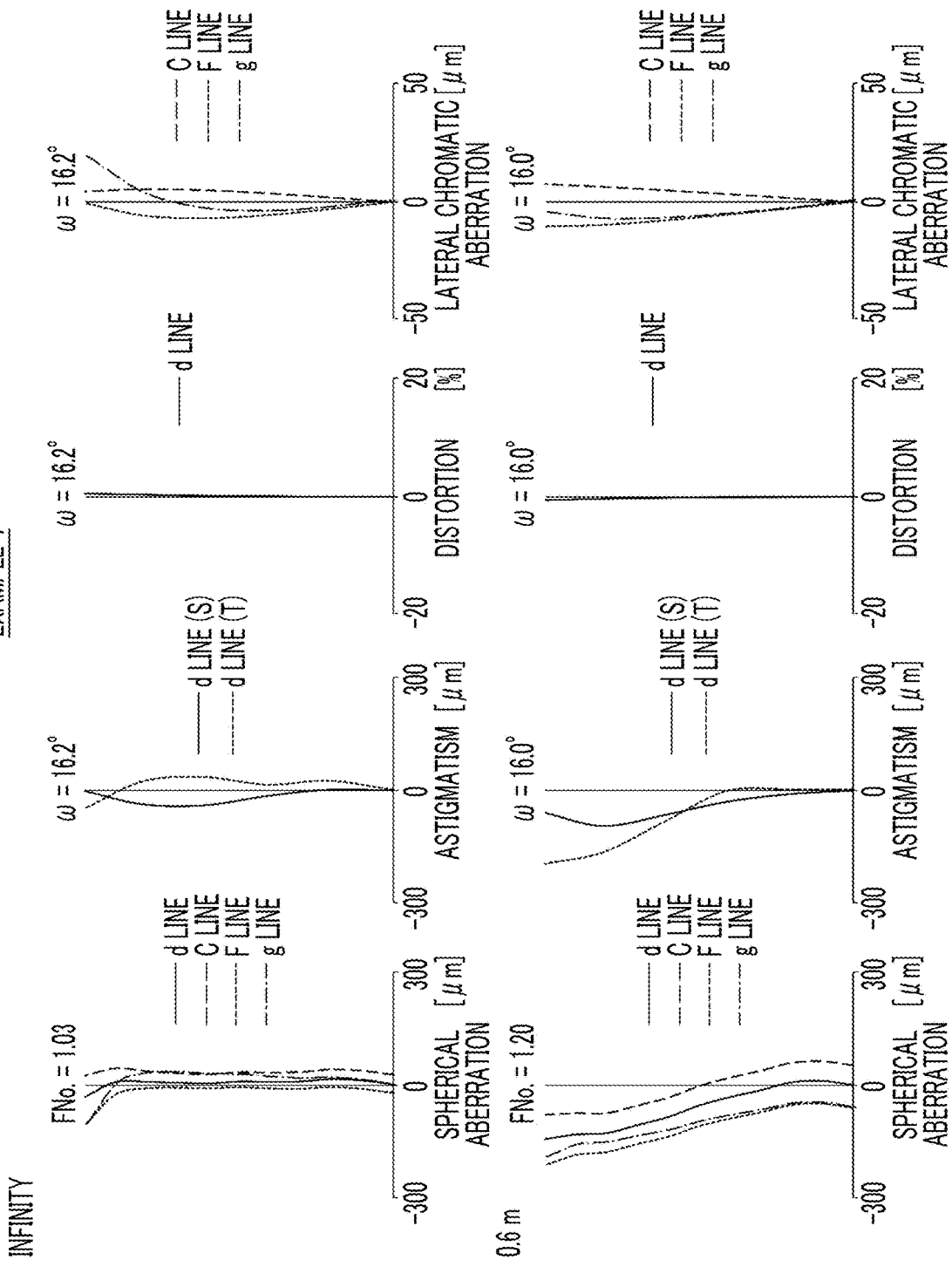
FIG. 11 shows spherical aberration diagrams, astigmatism diagrams, distortion diagrams, lateral chromatic aberration diagrams of the imaging lens of Example 4.
Figure 12:
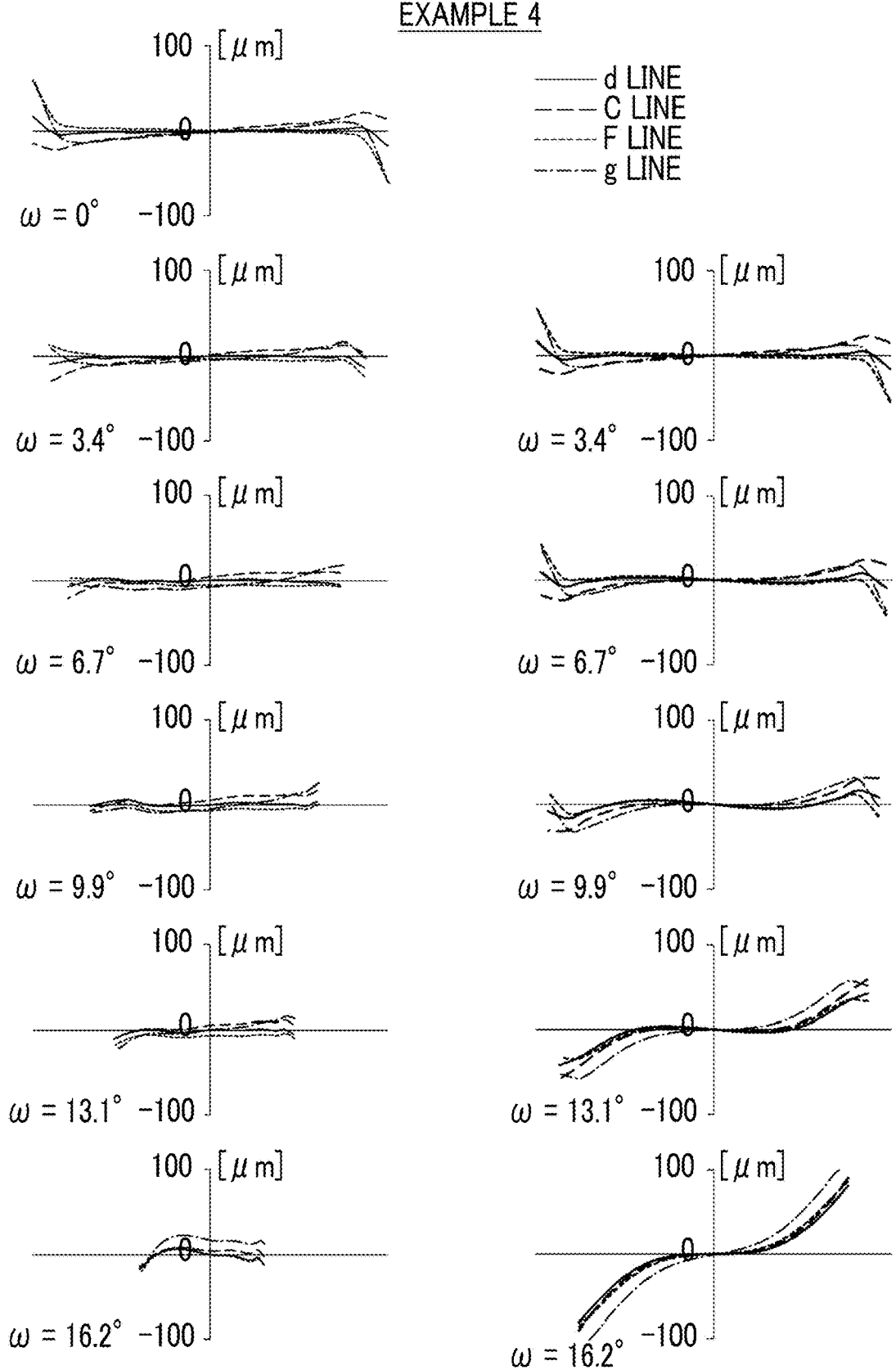
FIG. 12 shows lateral aberration diagrams of the imaging lens according to Example 4.

Regarding the imaging lens of Example 4, Table 13 shows basic lens data, Table 14 shows specification, Table 15 shows variable surface distances, Table 16 shows aspheric surface coefficients, and FIGS. 11 and 12 show aberration diagrams. In FIG. 11, the upper part shows aberration diagrams in a state where the object at infinity is in focus, and the lower part shows aberration diagrams in a state where the object at the distance of 0.6 m (meter) from the object to the image plane Sim is in focus. FIG. 12 shows lateral aberration diagram in a state where the object at infinity is in focus.

TABLE 13

Example 4

| Sn | R | D | Nd | vd | θgF |
|---|---|---|---|---|---|
| 1 | −184.15927 | 2.400 | 1.80000 | 29.84 | 0.60178 |
| 2 | 62.61647 | 4.878 | | | |
| 3 | 98.51388 | 6.313 | 1.98613 | 16.48 | 0.66558 |
| 4 | 4034.13252 | 1.100 | | | |
| 5 | 63.34975 | 10.200 | 1.59282 | 68.62 | 0.54414 |
| 6 | −296.07052 | 0.200 | | | |
| 7 | 44.03004 | 10.250 | 1.59282 | 68.62 | 0.54414 |
| 8 | 795.08982 | 0.200 | | | |
| 9 | 34.85519 | 7.910 | 1.87070 | 40.73 | 0.56825 |
| 10 | 121.35104 | 1.500 | 1.89286 | 20.36 | 0.63944 |
| 11 | 41.54155 | 2.500 | | | |
| 12 | 103.47070 | 1.500 | 1.85896 | 22.73 | 0.62844 |
| 13 | 22.43821 | 7.000 | | | |
| 14(St) | ∞ | DD[14] | | | |
| 15 | −23.29314 | 1.110 | 1.59270 | 35.31 | 0.59336 |
| 16 | 23.13973 | 7.642 | 1.88300 | 39.22 | 0.57295 |
| 17 | −49.13842 | 0.500 | | | |
| *18 | −31.45625 | 2.200 | 1.68948 | 31.02 | 0.59874 |
| *19 | −35.44240 | 0.100 | | | |
| 20 | 57.70265 | 8.669 | 1.88300 | 39.22 | 0.57295 |
| 21 | −29.44571 | 1.210 | 1.59270 | 35.31 | 0.59336 |
| 22 | 455.30805 | DD[22] | | | |

TABLE 13-continued

Example 4

| Sn | R | D | Nd | vd | θgF |
|---|---|---|---|---|---|
| 23 | ∞ | 2.850 | 1.51680 | 64.20 | 0.53430 |
| 24 | ∞ | 1.000 | | | |

TABLE 14

Example 4

| f | 48.495 |
|---|---|
| FNo. | 1.03 |
| 2ωmax | 32.4 |

TABLE 15

Example 4

| | Infinity | 0.6 m |
|---|---|---|
| DD[14] | 10.100 | 5.021 |
| DD[22] | 14.402 | 19.481 |

TABLE 16

Example 4

| Sn | 18 | 19 |
|---|---|---|
| KA | 1.0000000E+00 | 1.0000000E+00 |
| A3 | 0.0000000E+00 | 0.0000000E+00 |
| A4 | −4.1880254E−05 | −1.8080969E−05 |
| A5 | 2.2277957E−05 | 1.7658879E−05 |
| A6 | −1.0486644E−06 | −1.2728716E−06 |
| A7 | −6.0774700E−07 | −2.8821944E−07 |
| A8 | 6.5534778E−08 | 3.8775713E−08 |
| A9 | 9.8049532E−09 | 3.2995970E−09 |
| A10 | −1.3866580E−09 | −5.0968526E−10 |
| A11 | −9.2054942E−11 | −2.6981943E−11 |
| A12 | 1.6184890E−11 | 3.7414083E−12 |
| A13 | 4.5994752E−13 | 1.6196819E−13 |
| A14 | −1.1024413E−13 | −1.4531348E−14 |
| A15 | −7.7379704E−16 | −6.8886559E−16 |
| A16 | 4.2085620E−16 | 1.7953337E−17 |
| A17 | −2.3252064E−18 | 1.8140969E−18 |
| A18 | −7.7399797E−19 | 5.5970230E−20 |
| A19 | 8.4567070E−21 | −2.1514981E−21 |
| A20 | 4.0991440E−22 | −1.5749796E−22 |

Example 5

Figure 13:
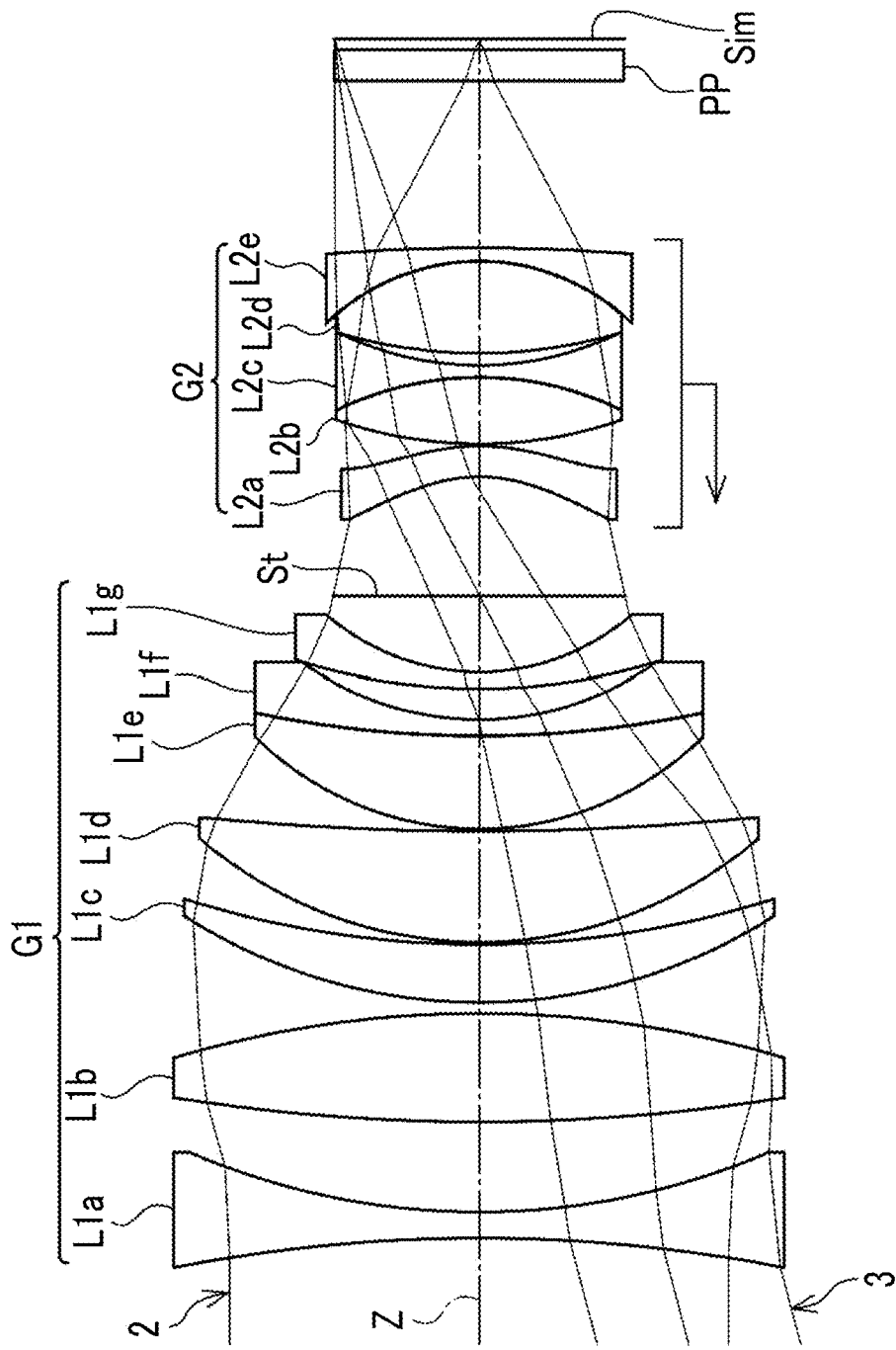
FIG. 13 is a cross-sectional view showing a configuration and rays of an imaging lens of Example 5.

FIG. 13 shows a cross-sectional configuration of the imaging lens of Example 5. The imaging lens of Example 5 consists of, in order from the object side, the first lens group G1 that has a positive refractive power, the aperture stop St, and the second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 14:
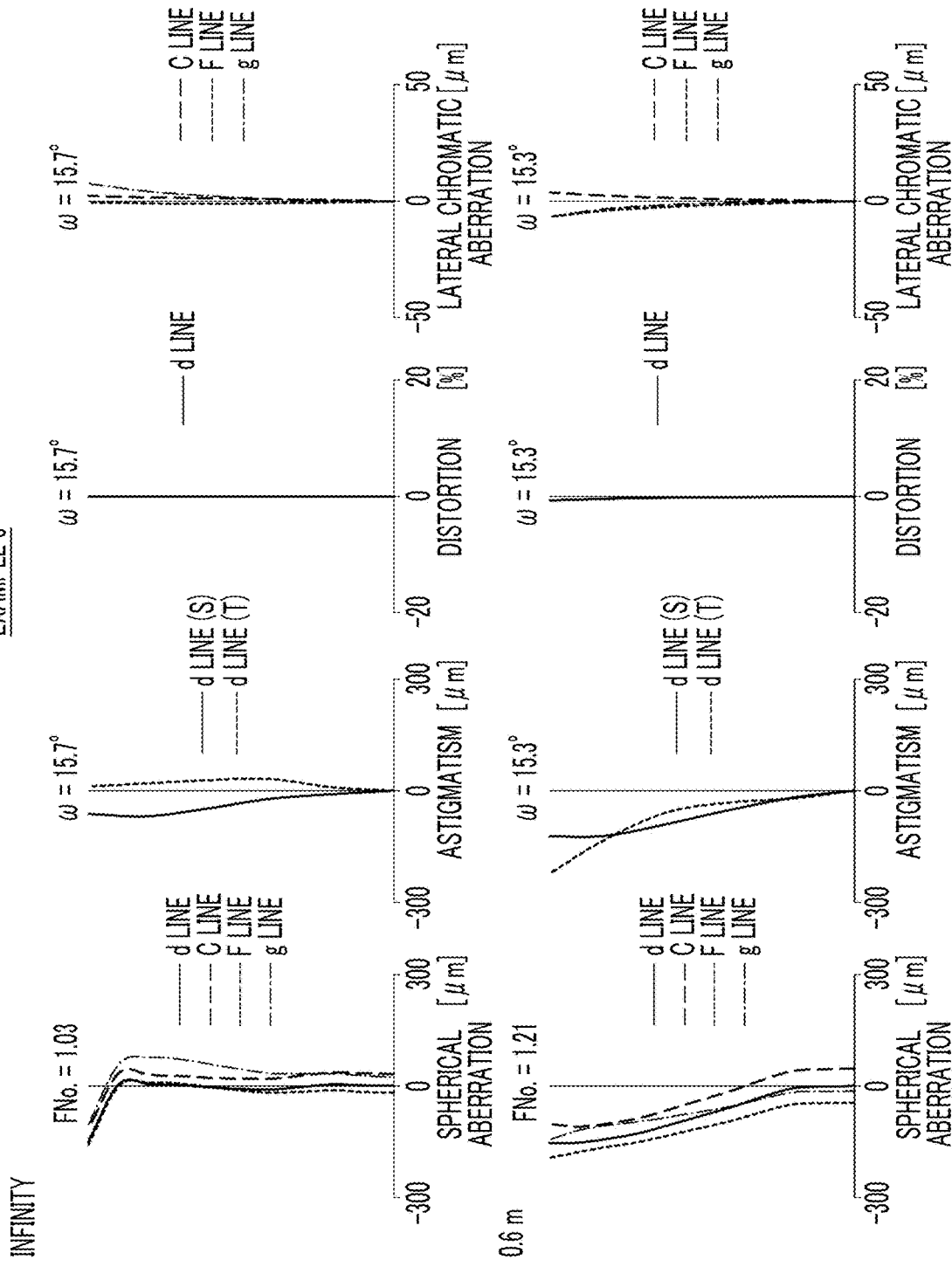
FIG. 14 shows spherical aberration diagrams, astigmatism diagrams, distortion diagrams, lateral chromatic aberration diagrams of the imaging lens of Example 5.
Figure 15:
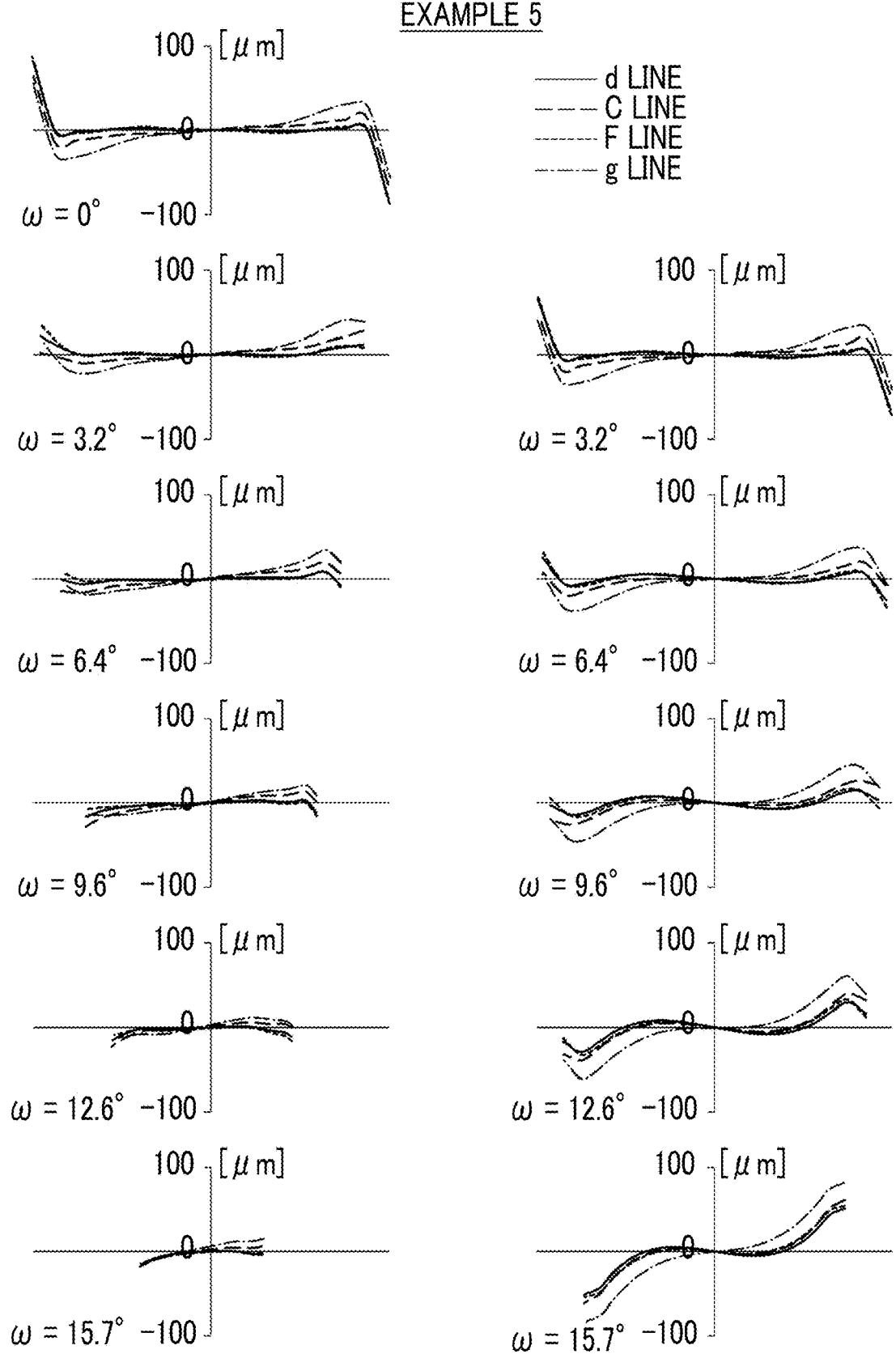
FIG. 15 shows lateral aberration diagrams of the imaging lens according to Example 5.

Regarding the imaging lens of Example 5, Table 17 shows basic lens data, Table 18 shows specification, Table 19 shows variable surface distances, Table 20 shows aspheric surface coefficients, and FIGS. 14 and 15 show aberration diagrams. In FIG. 14, the upper part shows aberration diagrams in a state where the object at infinity is in focus, and the lower part shows aberration diagrams in a state where the object at the distance of 0.6 m (meter) from the object to the image plane Sim is in focus. FIG. 15 shows lateral aberration diagram in a state where the object at infinity is in focus.

TABLE 17

Example 5

| Sn | R | D | Nd | vd | θgF |
|---|---|---|---|---|---|
| 1 | −165.93122 | 2.400 | 1.56037 | 43.68 | 0.57006 |
| 2 | 76.27518 | 8.339 | | | |
| 3 | 203.54358 | 10.000 | 1.59522 | 67.73 | 0.54426 |
| 4 | −111.87010 | 1.010 | | | |
| 5 | 56.74170 | 5.365 | 1.89286 | 20.36 | 0.63944 |
| 6 | 102.45084 | 0.200 | | | |
| 7 | 44.31471 | 10.250 | 1.59522 | 67.73 | 0.54426 |
| 8 | 292.61942 | 0.200 | | | |
| 9 | 32.85510 | 8.595 | 1.69253 | 56.87 | 0.54266 |
| 10 | 115.66155 | 1.500 | 1.78472 | 25.68 | 0.61052 |
| 11 | 31.63618 | 2.819 | | | |
| 12 | 63.52660 | 1.500 | 1.89286 | 20.36 | 0.63944 |
| 13 | 23.88347 | 7.000 | | | |
| 14(St) | ∞ | DD[14] | | | |
| *15 | −16.34570 | 2.837 | 1.68948 | 31.02 | 0.59874 |
| *16 | −22.88973 | 0.200 | | | |
| 17 | 45.14005 | 6.141 | 1.90043 | 37.37 | 0.57720 |
| 18 | −33.79047 | 1.110 | 1.70834 | 29.58 | 0.59931 |
| 19 | 33.20670 | 1.120 | | | |
| 20 | 51.98052 | 8.500 | 1.90043 | 37.37 | 0.57720 |
| 21 | −22.44701 | 1.210 | 1.60763 | 37.24 | 0.58209 |
| 22 | −201.05993 | DD[22] | | | |
| 23 | ∞ | 2.850 | 1.54763 | 54.98 | 0.55247 |
| 24 | ∞ | 1.000 | | | |

TABLE 18

Example 5

| f | 50.617 |
|---|---|
| FNo. | 1.03 |
| 2ωmax | 31.4 |

TABLE 19

Example 5

| | Infinity | 0.6 m |
|---|---|---|
| DD[14] | 11.000 | 5.612 |
| DD[22] | 15.436 | 20.824 |

TABLE 20

Example 5

| Sn | 15 | 16 |
|---|---|---|
| KA | 1.0000000E+00 | 1.0000000E+00 |
| A3 | 0.0000000E+00 | 0.0000000E+00 |
| A4 | 3.1181867E−05 | 2.6530803E−05 |
| A5 | 1.4794096E−05 | 1.5226995E−05 |
| A6 | −2.8122797E−06 | −3.5186055E−06 |
| A7 | 8.9003214E−08 | 2.0389209E−07 |
| A8 | 6.9213577E−08 | 7.3115649E−08 |
| A9 | −8.7233682E−09 | −1.1688257E−08 |
| A10 | −8.1799110E−10 | −5.0238456E−10 |
| A11 | 1.9725575E−10 | 1.9915512E−10 |

TABLE 20-continued

| | Example 5 | |
|---|---|---|
| Sn | 15 | 16 |
| A12 | 3.0890969E−12 | −2.4972651E−12 |
| A13 | −2.3953381E−12 | −1.7930323E−12 |
| A14 | 4.0298515E−14 | 6.6348784E−14 |
| A15 | 1.6625829E−14 | 9.1585232E−15 |
| A16 | −5.7273231E−16 | −4.6481540E−16 |
| A17 | −6.1842548E−17 | −2.5090883E−17 |
| A18 | 2.7969524E−18 | 1.4869080E−18 |
| A19 | 9.5479576E−20 | 2.8685321E−20 |
| A20 | −4.9925629E−21 | −1.8543937E−21 |

Example 6

Figure 16:
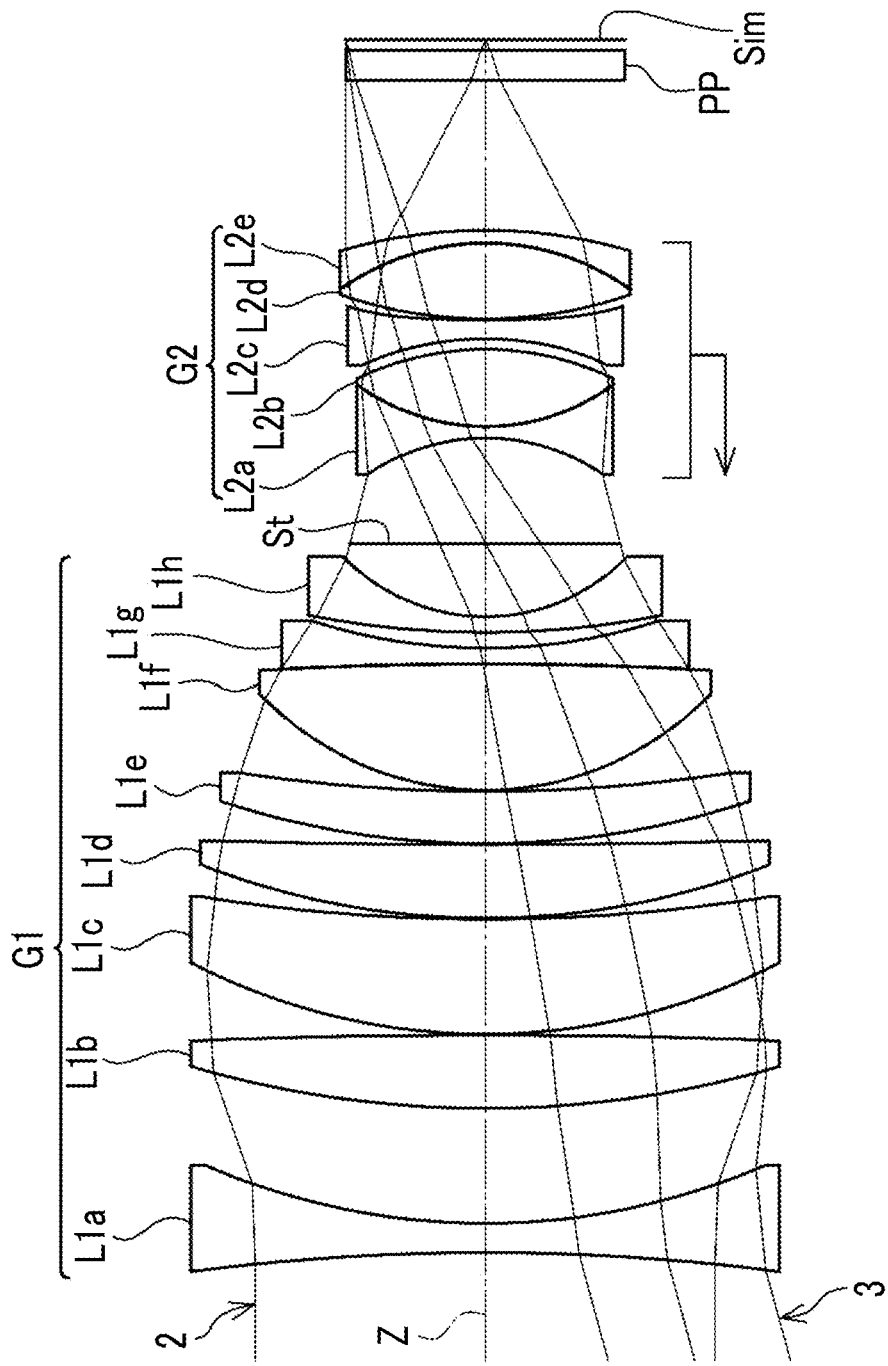
FIG. 16 is a cross-sectional view showing a configuration and rays of an imaging lens of Example 6.

FIG. 16 shows a cross-sectional configuration of the imaging lens of Example 6. The imaging lens of Example 6 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of eight lenses L1a to L1h in order from the object side. The second lens group G2 consists of five lenses L2a to L2e in order from the object side.

Figure 17:
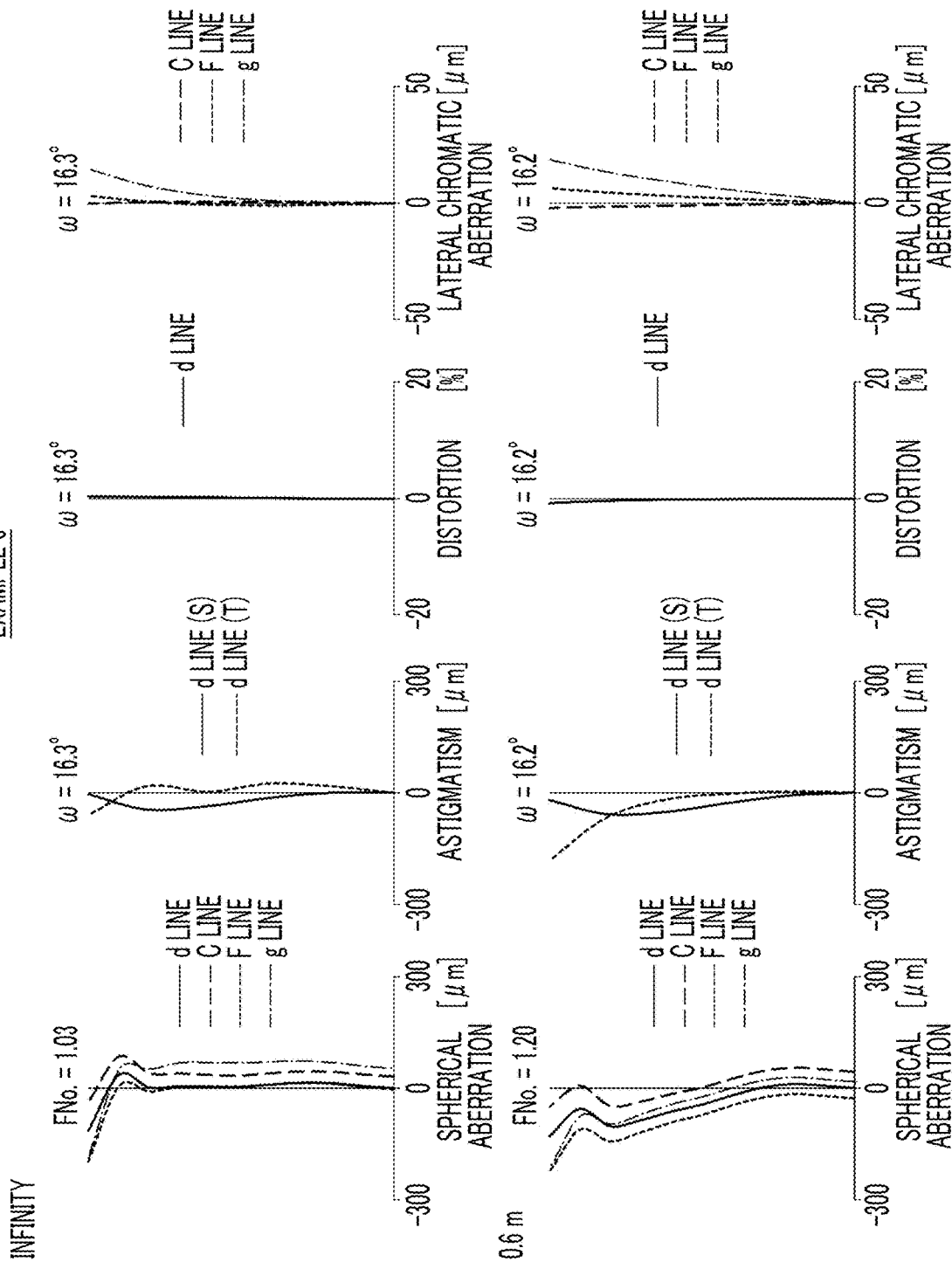
FIG. 17 shows spherical aberration diagrams, astigmatism diagrams, distortion diagrams, lateral chromatic aberration diagrams of the imaging lens of Example 6.
Figure 18:
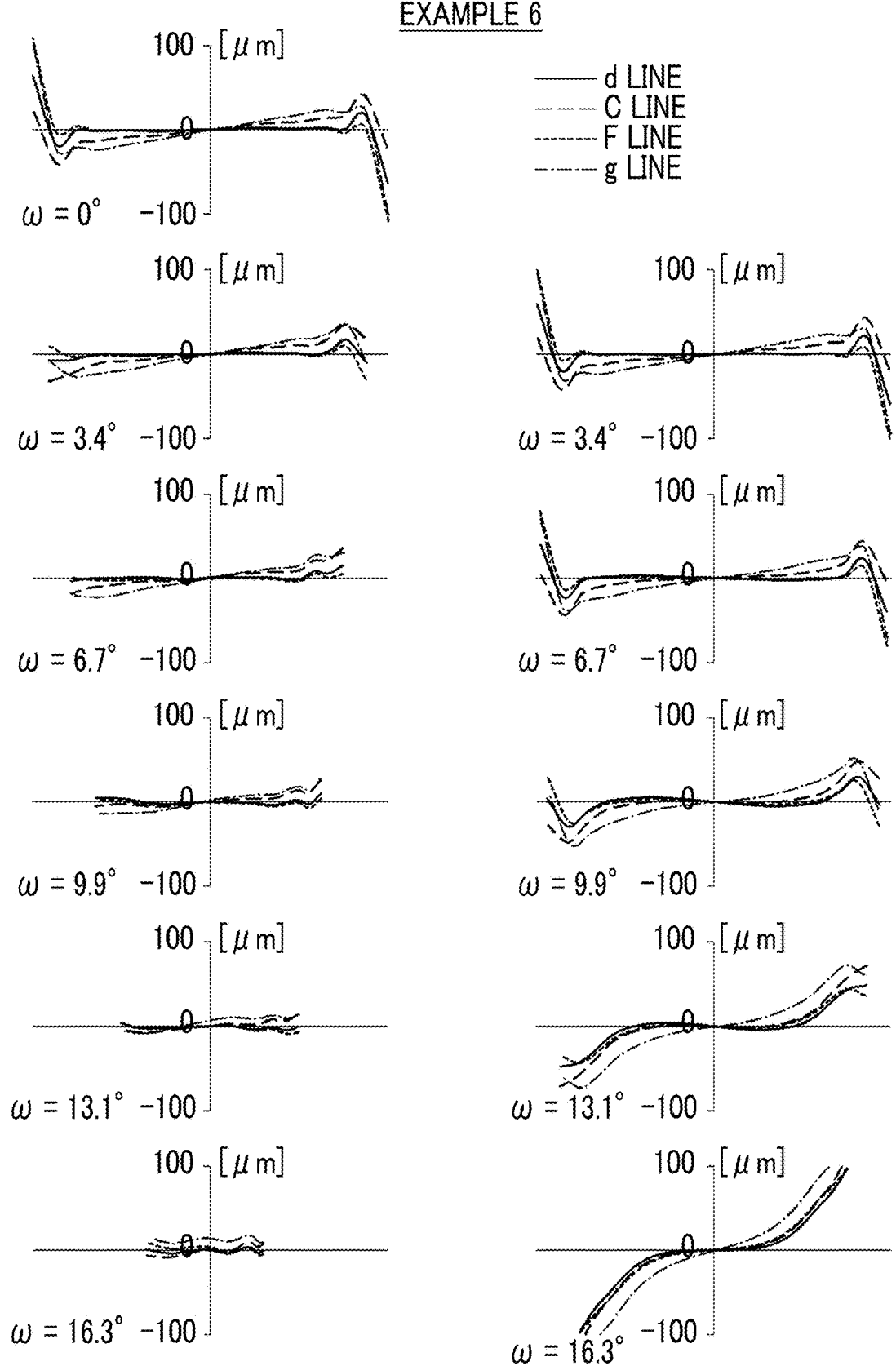
FIG. 18 shows lateral aberration diagrams of the imaging lens according to Example 6.

Regarding the imaging lens of Example 6, Table 21 shows basic lens data, Table 22 shows specification, Table 23 shows variable surface distances, Table 24 shows aspheric surface coefficients, and FIGS. 17 and 18 show aberration diagrams. In FIG. 17, the upper part shows aberration diagrams in a state where the object at infinity is in focus, and the lower part shows aberration diagrams in a state where the object at the distance of 0.6 m (meter) from the object to the image plane Sim is in focus. FIG. 18 shows lateral aberration diagram in a state where the object at infinity is in focus.

TABLE 21

| | Example 6 | | | | |
|---|---|---|---|---|---|
| Sn | R | D | Nd | vd | θgF |
| 1 | −247.95976 | 2.800 | 1.77791 | 26.10 | 0.61461 |
| 2 | 75.89689 | 11.010 | | | |
| 3 | 114.39503 | 7.000 | 1.92286 | 18.90 | 0.64960 |
| 4 | −837.42367 | 0.100 | | | |
| 5 | 69.26549 | 11.000 | 1.58525 | 61.72 | 0.54210 |
| 6 | 196.03197 | 0.100 | | | |
| 7 | 84.81564 | 7.038 | 1.53775 | 74.70 | 0.53936 |
| 8 | 1034.21503 | 0.100 | | | |
| 9 | 91.91092 | 5.000 | 1.53775 | 74.70 | 0.53936 |
| 10 | 177.41757 | 0.100 | | | |
| 11 | 33.30279 | 12.000 | 1.88300 | 39.22 | 0.57295 |
| 12 | −424.49645 | 1.510 | 1.72186 | 28.91 | 0.60113 |
| 13 | 61.07419 | 1.500 | | | |
| 14 | 98.63832 | 1.500 | 1.91717 | 19.14 | 0.63501 |
| 15 | 21.08130 | 7.000 | | | |
| 16(St) | ∞ | DD[16] | | | |
| 17 | −22.42941 | 1.100 | 1.58780 | 39.22 | 0.57813 |
| 18 | 23.14403 | 7.400 | 1.88300 | 39.22 | 0.57295 |
| 19 | −31.61388 | 1.000 | | | |
| *20 | −33.94641 | 1.800 | 1.61724 | 36.28 | 0.58403 |
| *21 | 173.48601 | 0.100 | | | |
| 22 | 47.71113 | 7.271 | 1.81834 | 46.17 | 0.55821 |
| 23 | −26.72012 | 1.210 | 1.69584 | 30.30 | 0.60324 |
| 24 | −56.34422 | DD[24] | | | |

TABLE 21-continued

| | Example 6 | | | | |
|---|---|---|---|---|---|
| Sn | R | D | Nd | vd | θgF |
| 25 | ∞ | 2.850 | 1.51680 | 64.20 | 0.53430 |
| 26 | ∞ | 1.000 | | | |

TABLE 22

| Example 6 | |
|---|---|
| f | 48.498 |
| FNo. | 1.03 |
| 2ωmax | 32.6 |

TABLE 23

| Example 6 | | |
|---|---|---|
| | Infinity | 0.6 m |
| DD[16] | 10.100 | 4.816 |
| DD[24] | 14.400 | 19.684 |

TABLE 24

| | Example 6 | |
|---|---|---|
| Sn | 20 | 21 |
| KA | 1.0000000E+00 | 1.0000000E+00 |
| A3 | 0.0000000E+00 | 0.0000000E+00 |
| A4 | −2.3773046E−05 | 3.0929722E−06 |
| A5 | 5.6674484E−06 | 4.8487684E−06 |
| A6 | 5.6970844E−08 | −5.0456910E−07 |
| A7 | −1.9176909E−07 | 1.5258010E−08 |
| A8 | 1.9626233E−08 | 6.7914018E−09 |
| A9 | 2.9049337E−09 | −1.5524880E−09 |
| A10 | −6.6057808E−10 | −1.1339723E−11 |
| A11 | −1.9889473E−11 | 2.4115890E−11 |
| A12 | 1.0577029E−11 | −4.6114184E−13 |
| A13 | 7.5098137E−15 | −1.8660180E−13 |
| A14 | −9.7929627E−14 | 3.8327989E−15 |
| A15 | 7.5328476E−16 | 7.9224149E−16 |
| A16 | 5.3398130E−16 | −7.7601860E−18 |
| A17 | −4.2992770E−18 | −1.7504256E−18 |
| A18 | −1.5949215E−18 | −2.1972718E−20 |
| A19 | 7.7287369E−21 | 1.5807498E−21 |
| A20 | 2.0144963E−21 | 7.7734912E−23 |

Example 7

Figure 19:
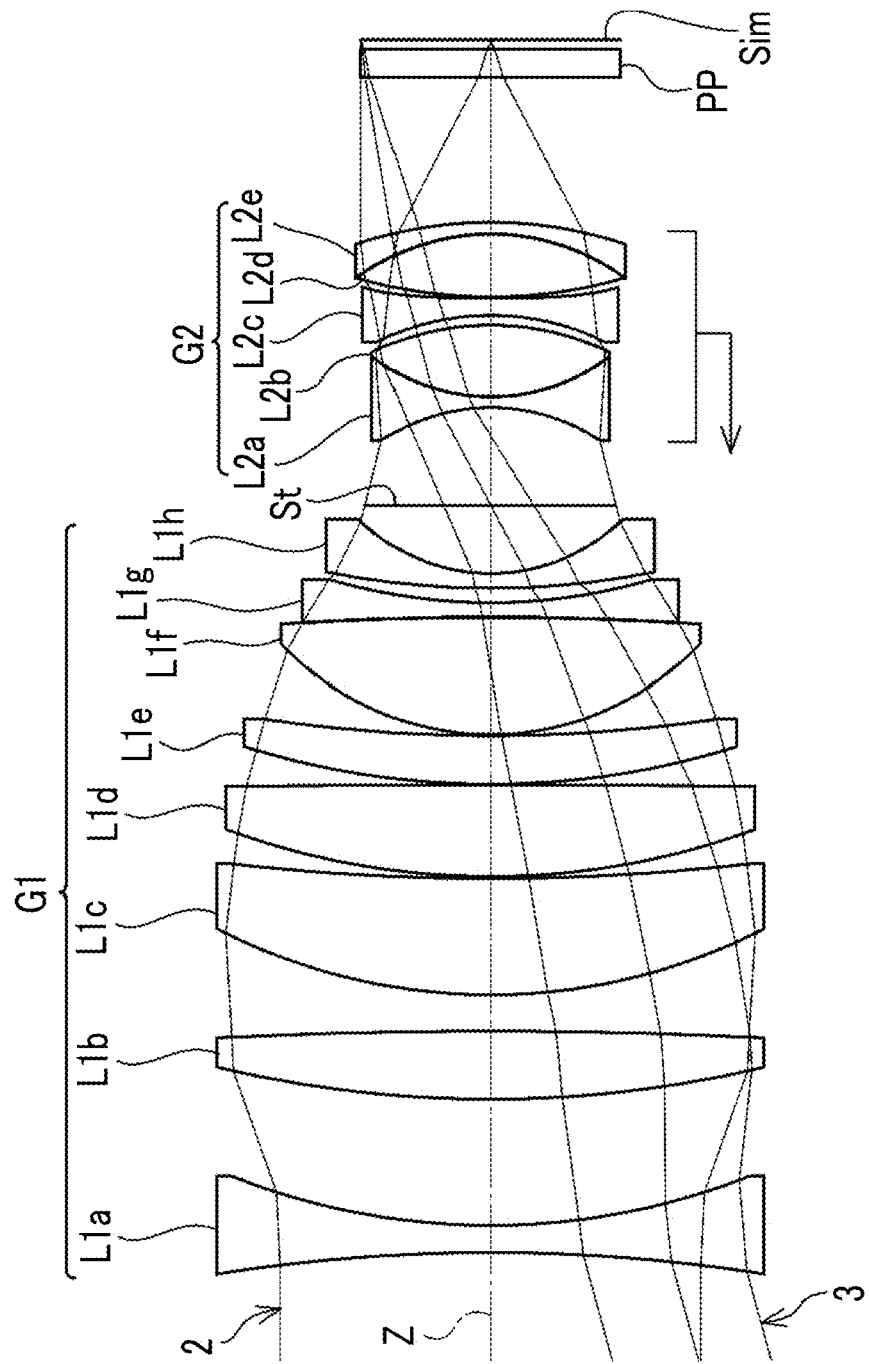
FIG. 19 is a cross-sectional view showing a configuration and rays of an imaging lens of Example 7.

FIG. 19 shows a cross-sectional configuration of the imaging lens of Example 7. The imaging lens of Example 7 consists of, in order from the object side, the first lens group G1 that has a positive refractive power, the aperture stop St, and the second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of eight lenses L1a to L1h in order from the object side. The second lens group G2 consists of five lenses L2a to L2e in order from the object side.

Figure 20:
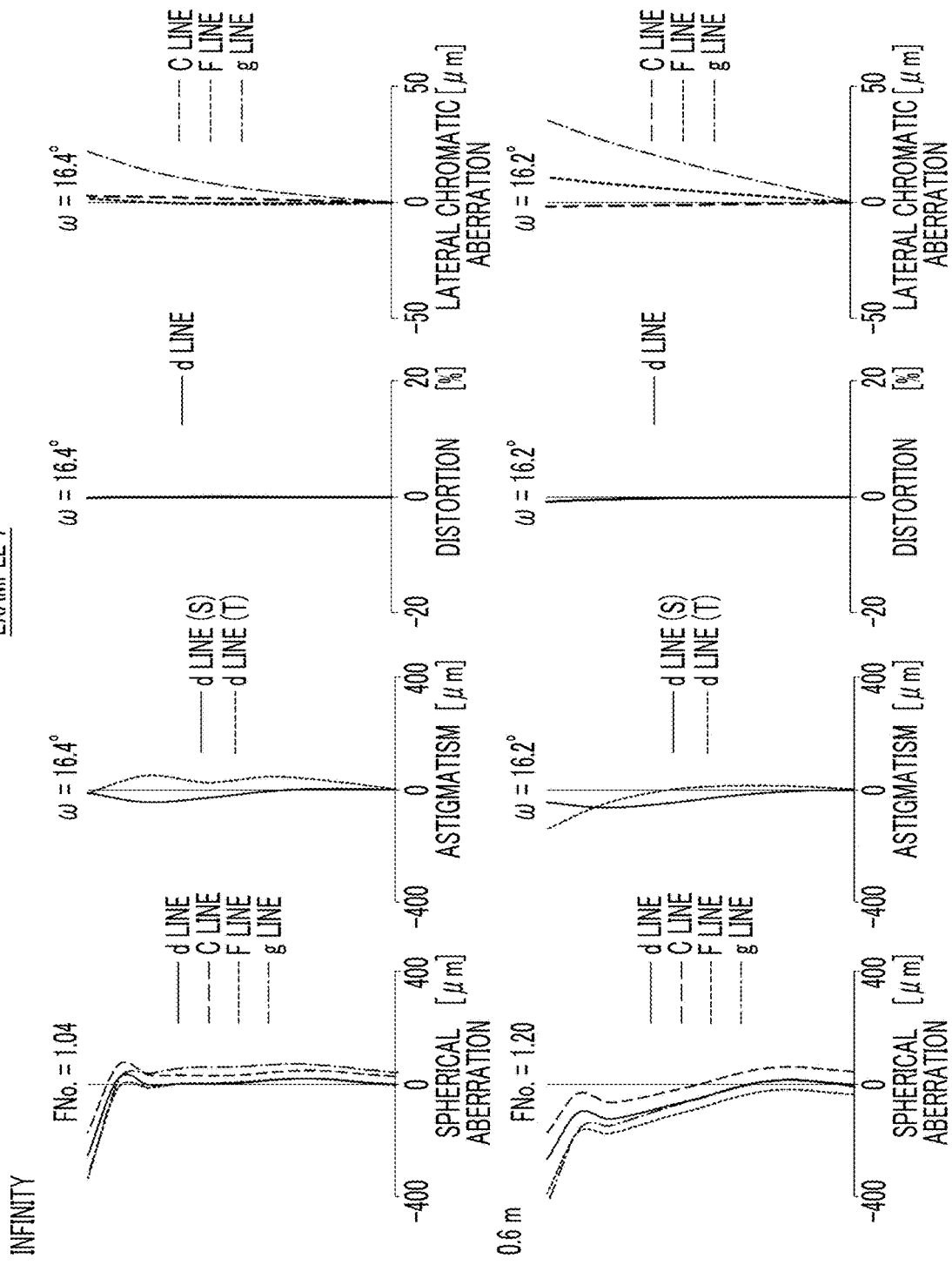
FIG. 20 shows spherical aberration diagrams, astigmatism diagrams, distortion diagrams, lateral chromatic aberration diagrams of the imaging lens of Example 7.
Figure 21:
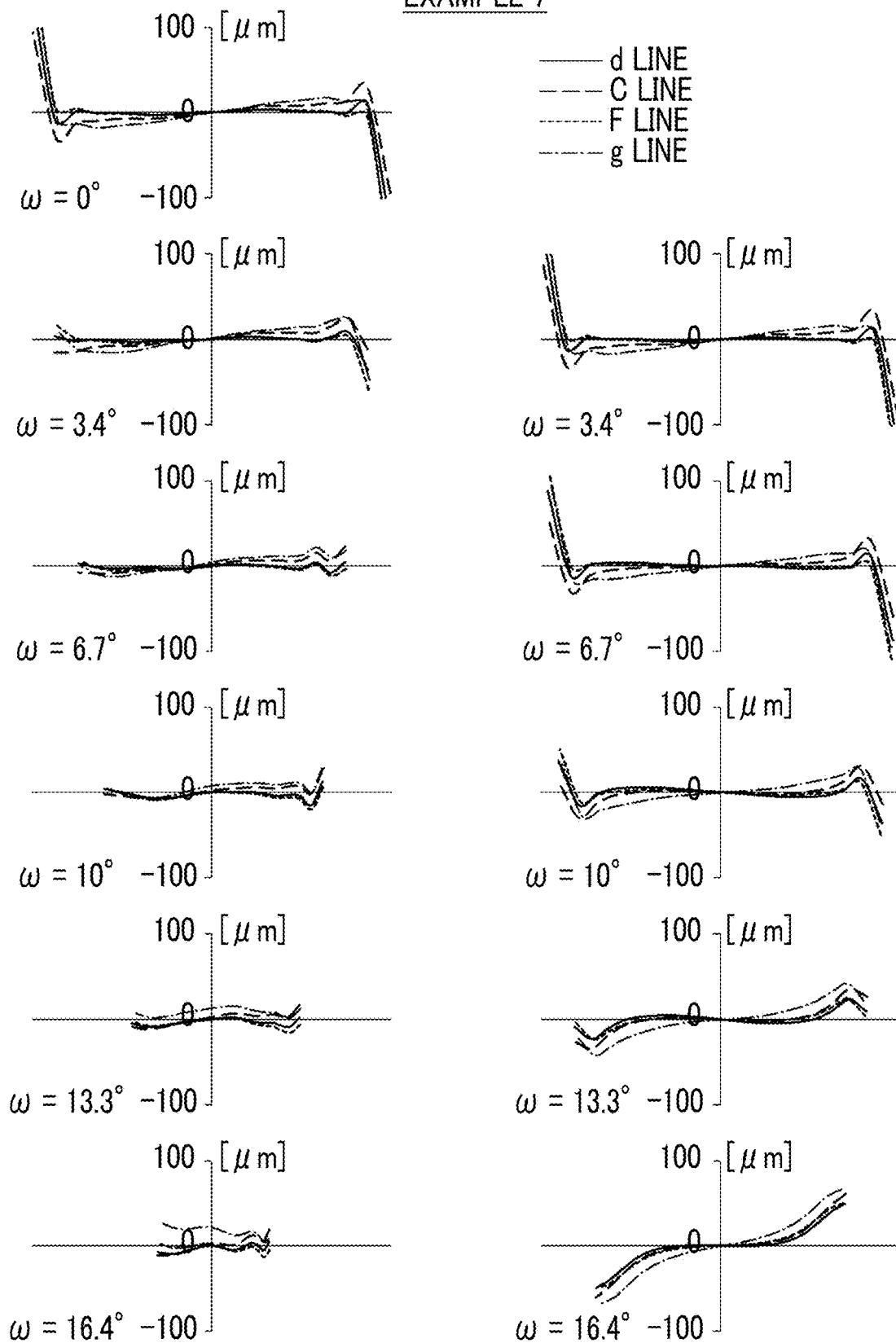
FIG. 21 shows lateral aberration diagrams of the imaging lens according to Example 7.

Regarding the imaging lens of Example 7, Table 25 shows basic lens data, Table 26 shows specification, Table 27 shows variable surface distances, Table 28 shows aspheric surface coefficients, and FIGS. 20 and 21 show aberration diagrams. In FIG. 20, the upper part shows aberration diagrams in a state where the object at infinity is in focus, and the lower part shows aberration diagrams in a state where the object at the distance of 0.6 m (meter) from the object to the image plane Sim is in focus. FIG. 21 shows lateral aberration diagram in a state where the object at infinity is in focus.

TABLE 25

Example 7

| Sn | R | D | Nd | vd | θgF |
|---|---|---|---|---|---|
| 1 | −204.30501 | 2.800 | 1.81294 | 24.35 | 0.61887 |
| 2 | 81.96794 | 13.010 | | | |
| 3 | 137.60012 | 7.000 | 2.10420 | 17.02 | 0.66311 |
| 4 | −656.31103 | 3.750 | | | |
| 5 | 69.54614 | 12.000 | 1.57265 | 62.21 | 0.54137 |
| 6 | 267.60481 | 0.193 | | | |
| 7 | 88.85695 | 9.422 | 1.43875 | 94.66 | 0.53402 |
| 8 | −2937.87944 | 0.100 | | | |
| 9 | 96.07701 | 5.000 | 1.43875 | 94.66 | 0.53402 |
| 10 | 181.83582 | 0.100 | | | |
| 11 | 33.17157 | 12.000 | 1.88300 | 39.22 | 0.57295 |
| 12 | −374.98026 | 1.510 | 1.76530 | 26.82 | 0.60713 |
| 13 | 66.58003 | 1.500 | | | |
| 14 | 97.44593 | 1.500 | 1.96720 | 17.42 | 0.64384 |
| 15 | 21.58463 | 7.000 | | | |
| 16(St) | ∞ | DD[16] | | | |
| 17 | −22.85203 | 1.100 | 1.56026 | 43.70 | 0.57003 |
| 18 | 22.46642 | 7.400 | 1.88300 | 39.22 | 0.57295 |
| 19 | −31.83440 | 1.000 | | | |
| *20 | −30.58326 | 1.800 | 1.66113 | 32.78 | 0.59162 |
| *21 | 340.35421 | 0.100 | | | |
| 22 | 55.88143 | 6.486 | 1.81271 | 42.14 | 0.56732 |
| 23 | −26.29030 | 1.210 | 1.70642 | 29.68 | 0.60465 |
| 24 | −49.33676 | DD[24] | | | |
| 25 | ∞ | 2.850 | 1.51680 | 64.20 | 0.53430 |
| 26 | ∞ | 1.000 | | | |

TABLE 26

Example 7

| | |
|---|---|
| f | 48.220 |
| FNo. | 1.04 |
| 2ωmax | 32.8 |

TABLE 27

Example 7

| | Infinity | 0.6 m |
|---|---|---|
| DD[16] | 10.100 | 4.858 |
| DD[24] | 14.973 | 20.215 |

TABLE 28

Example 7

| Sn | 20 | 21 |
|---|---|---|
| KA | 1.0000000E+00 | 1.0000000E+00 |
| A3 | 0.0000000E+00 | 0.0000000E+00 |
| A4 | −2.1813953E−05 | 5.6632078E−06 |
| A5 | 5.5899615E−06 | 4.4402595E−06 |
| A6 | 8.3363623E−08 | −4.7071845E−07 |
| A7 | −1.9184059E−07 | 1.5982530E−08 |
| A8 | 1.9586298E−08 | 6.7572477E−09 |
| A9 | 2.8981856E−09 | −1.5590421E−09 |

TABLE 28-continued

Example 7

| Sn | 20 | 21 |
|---|---|---|
| A10 | −6.6105638E−10 | −1.1726148E−11 |
| A11 | −1.9888631E−11 | 2.4116692E−11 |
| A12 | 1.0581175E−11 | −4.5950671E−13 |
| A13 | 8.0018964E−15 | −1.8648724E−13 |
| A14 | −9.7926487E−14 | 3.8358049E−15 |
| A15 | 7.5055780E−16 | 7.9215688E−16 |
| A16 | 5.3398130E−16 | −7.7662214E−18 |
| A17 | −4.2992770E−18 | −1.7496474E−18 |
| A18 | −1.5949215E−18 | −2.1852378E−20 |
| A19 | 7.7287369E−21 | 1.5557319E−21 |
| A20 | 2.0144963E−21 | 7.8155637E−23 |

Example 8

Figure 22:
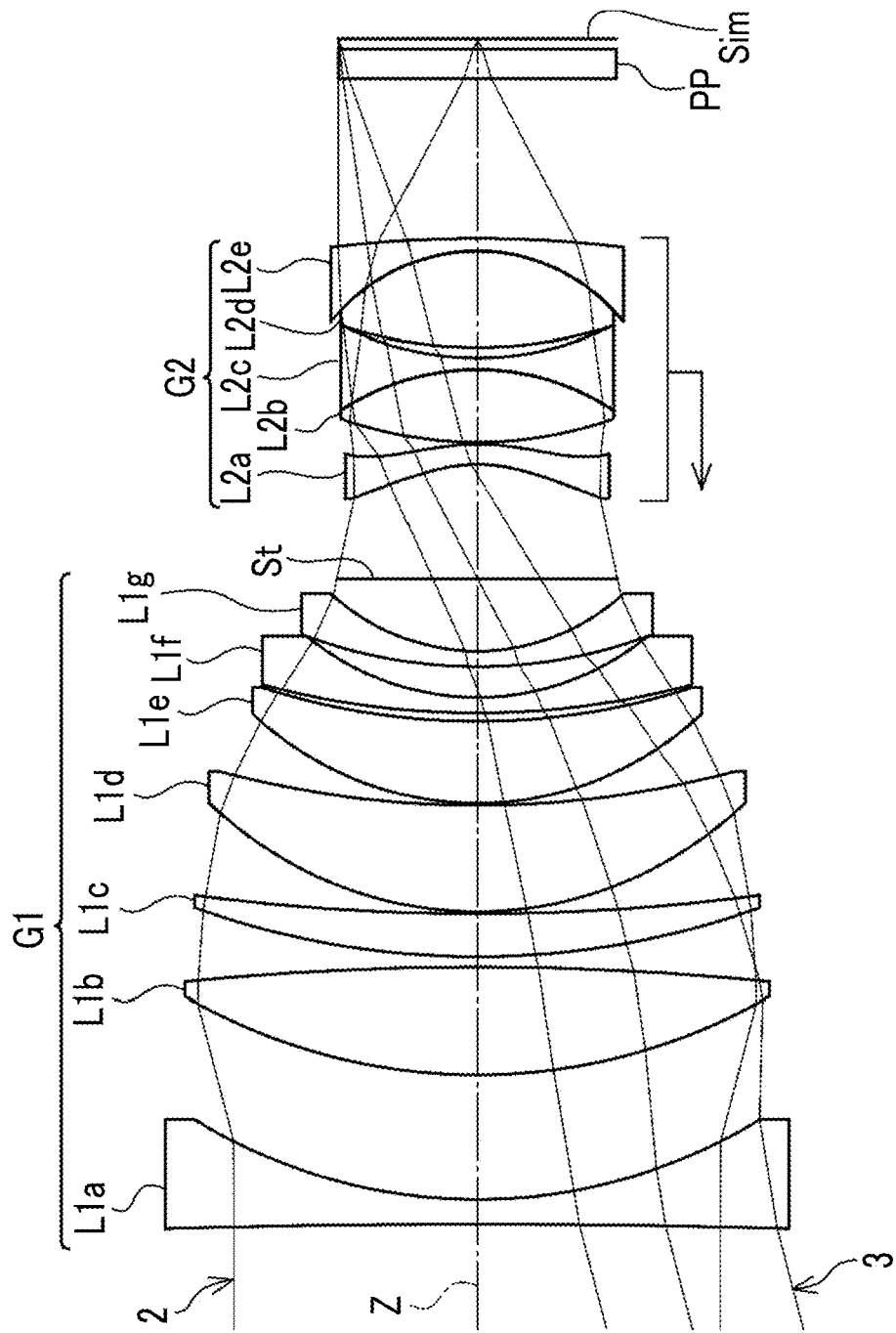
FIG. 22 is a cross-sectional view showing a configuration and rays of an imaging lens of Example 8.

FIG. 22 shows a cross-sectional configuration of the imaging lens of Example 8. The imaging lens of Example 8 consists of, in order from the object side, the first lens group G1 that has a positive refractive power, the aperture stop St, and the second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 23:
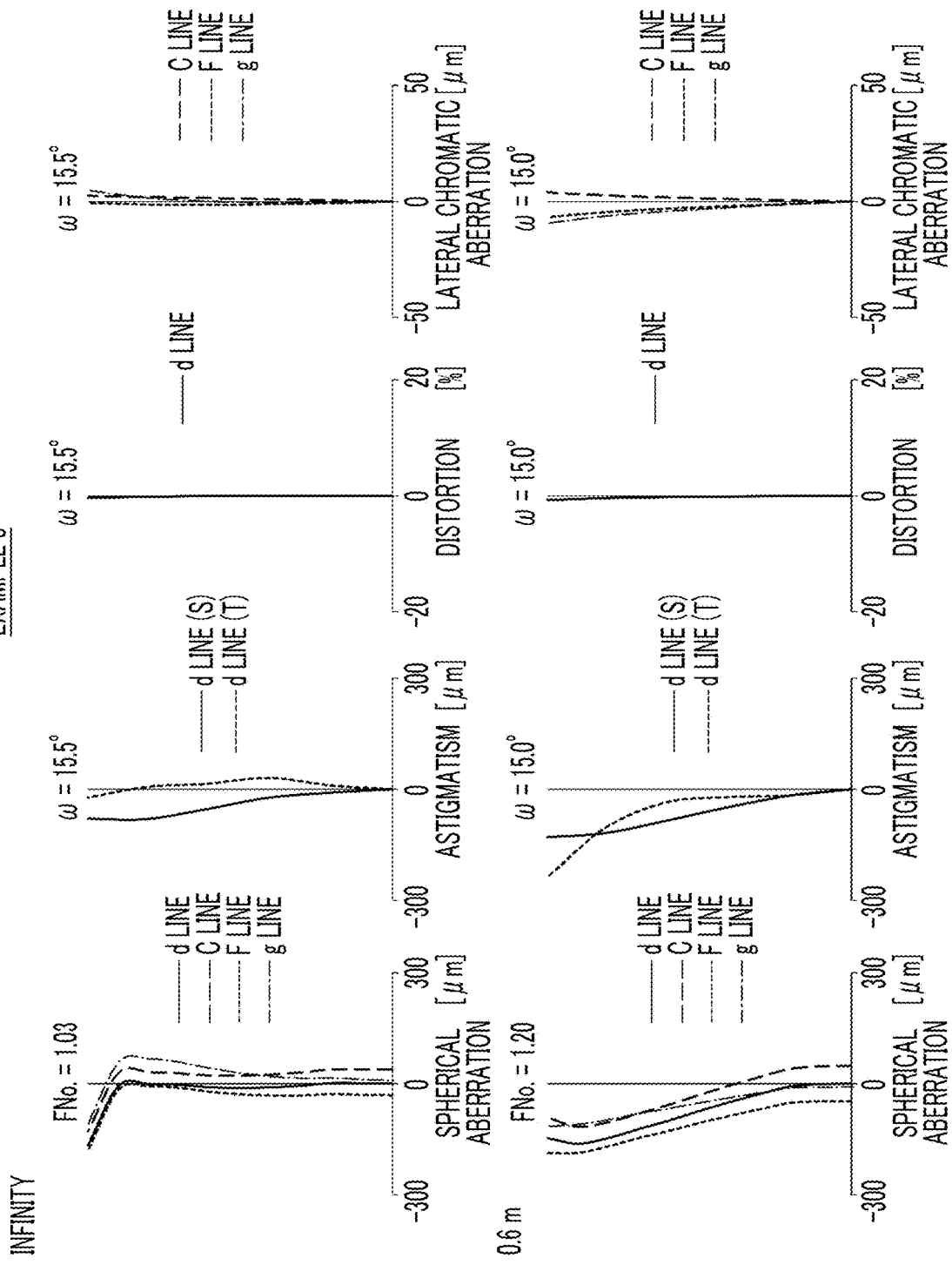
FIG. 23 shows spherical aberration diagrams, astigmatism diagrams, distortion diagrams, lateral chromatic aberration diagrams of the imaging lens of Example 8.
Figure 24:
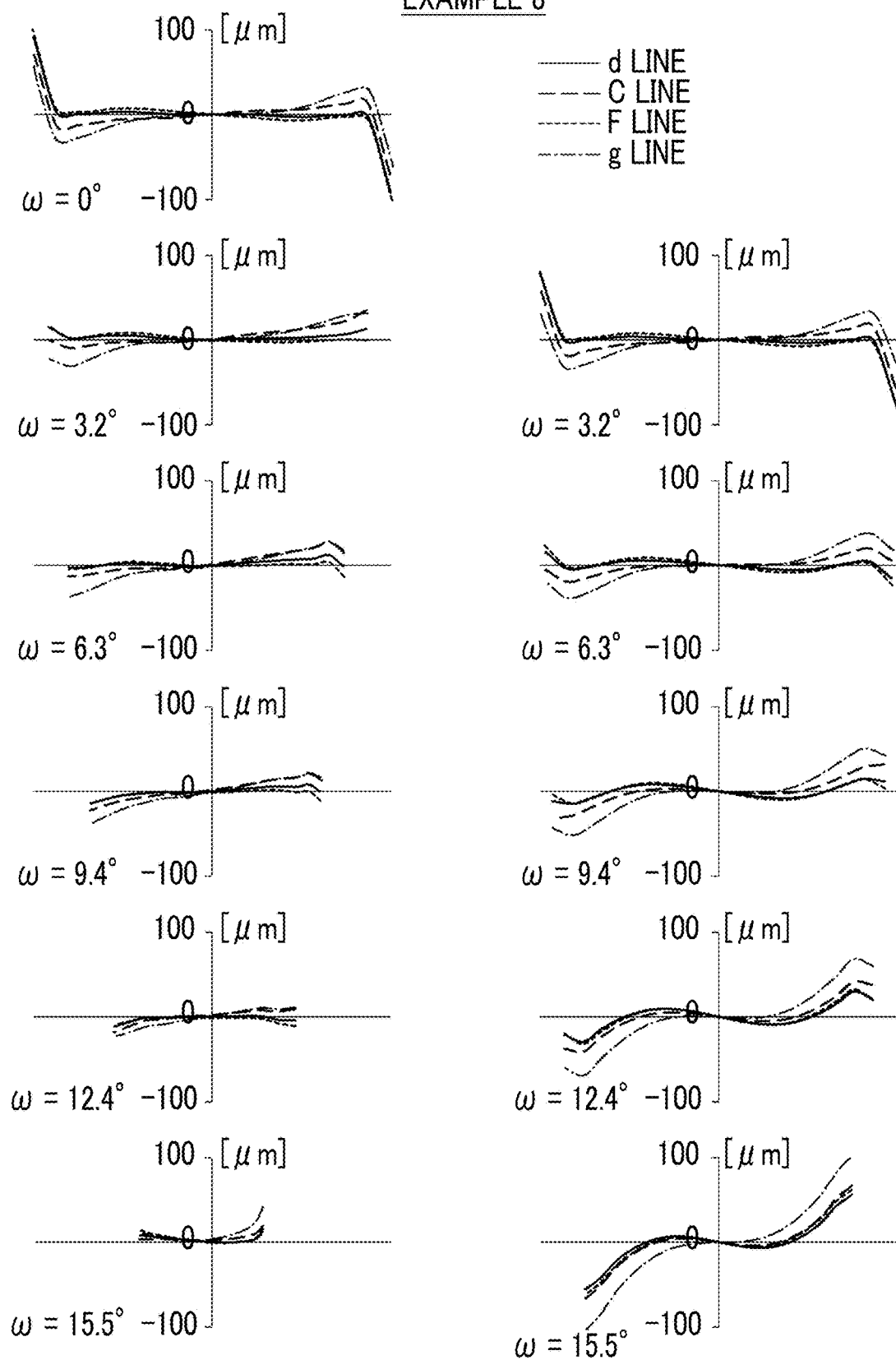
FIG. 24 shows lateral aberration diagrams of the imaging lens according to Example 8.

Regarding the imaging lens of Example 8, Table 29 shows basic lens data, Table 30 shows specification, Table 31 shows variable surface distances, Table 32 shows aspheric surface coefficients, and FIGS. 23 and 24 show aberration diagrams. In FIG. 23, the upper part shows aberration diagrams in a state where the object at infinity is in focus, and the lower part shows aberration diagrams in a state where the object at the distance of 0.6 m (meter) from the object to the image plane Sim is in focus. FIG. 24 shows lateral aberration diagram in a state where the object at infinity is in focus.

TABLE 29

Example 8

| Sn | R | D | Nd | vd | θgF |
|---|---|---|---|---|---|
| 1 | −1250.00000 | 2.400 | 1.50911 | 53.29 | 0.55329 |
| 2 | 58.56667 | 12.004 | | | |
| 3 | 63.53662 | 10.300 | 1.55032 | 75.50 | 0.54001 |
| 4 | −324.18577 | 1.010 | | | |
| 5 | 91.24308 | 4.145 | 1.55032 | 75.50 | 0.54001 |
| 6 | 237.79601 | 0.200 | | | |
| 7 | 41.36102 | 10.250 | 1.59282 | 68.62 | 0.54414 |
| 8 | 108.29456 | 0.200 | | | |
| 9 | 35.06677 | 7.900 | 2.00069 | 25.46 | 0.61364 |
| 10 | 76.31696 | 0.806 | | | |
| 11 | 90.22442 | 1.500 | 1.78880 | 28.43 | 0.60092 |
| 12 | 28.87926 | 2.968 | | | |
| 13 | 53.65263 | 1.500 | 1.89286 | 20.36 | 0.63944 |
| 14 | 23.13445 | 7.000 | | | |
| 15(St) | ∞ | DD[15] | | | |
| *16 | −16.70584 | 1.943 | 1.68948 | 31.02 | 0.59874 |
| *17 | −24.50468 | 0.200 | | | |
| 18 | 44.48608 | 6.995 | 1.88300 | 39.22 | 0.57295 |
| 19 | −26.79392 | 1.110 | 1.71036 | 29.48 | 0.59958 |
| 20 | 33.02652 | 1.005 | | | |
| 21 | 48.60027 | 9.237 | 1.85150 | 40.78 | 0.56958 |
| 22 | −19.88726 | 1.210 | 1.56738 | 42.37 | 0.57237 |

TABLE 29-continued

Example 8

| Sn | R | D | Nd | vd | θgF |
|---|---|---|---|---|---|
| 23 | −131.23867 | DD[23] | | | |
| 24 | ∞ | 2.850 | 1.51680 | 64.20 | 0.53430 |
| 25 | ∞ | 1.000 | | | |

TABLE 30

Example 8

| | |
|---|---|
| f | 51.521 |
| FNo. | 1.03 |
| 2ωmax | 31.0 |

TABLE 31

Example 8

| | Infinity | 0.6 m |
|---|---|---|
| DD[15] | 11.000 | 5.534 |
| DD[23] | 15.401 | 20.867 |

TABLE 32

Example 8

| Sn | 16 | 17 |
|---|---|---|
| KA | 1.0000000E+00 | 1.0000000E+00 |
| A3 | 0.0000000E+00 | 0.0000000E+00 |
| A4 | 7.0570380E−05 | 6.6014243E−05 |
| A5 | 1.9198543E−05 | 1.9606733E−05 |
| A6 | −3.3289534E−06 | −4.2582967E−06 |
| A7 | −9.0333134E−08 | 1.4153915E−07 |
| A8 | 9.0099971E−08 | 9.0936965E−08 |
| A9 | −4.1396511E−09 | −1.1106603E−08 |
| A10 | −1.4390577E−09 | −8.1411034E−10 |
| A11 | 1.2641084E−10 | 1.9638299E−10 |
| A12 | 1.3445189E−11 | 1.0722851E−11 |
| A13 | −1.7282916E−12 | −1.7929595E−12 |
| A14 | −6.2059351E−14 | 3.9257132E−14 |
| A15 | 1.2881202E−14 | 9.2275563E−15 |
| A16 | 2.3758855E−17 | −3.3269509E−16 |
| A17 | −5.0325955E−17 | −2.5409216E−17 |
| A18 | 9.0421501E−19 | 1.1130994E−18 |
| A19 | 8.0548323E−20 | 2.9170042E−20 |
| A20 | −2.4717980E−21 | −1.3898997E−21 |

Example 9

Figure 25:
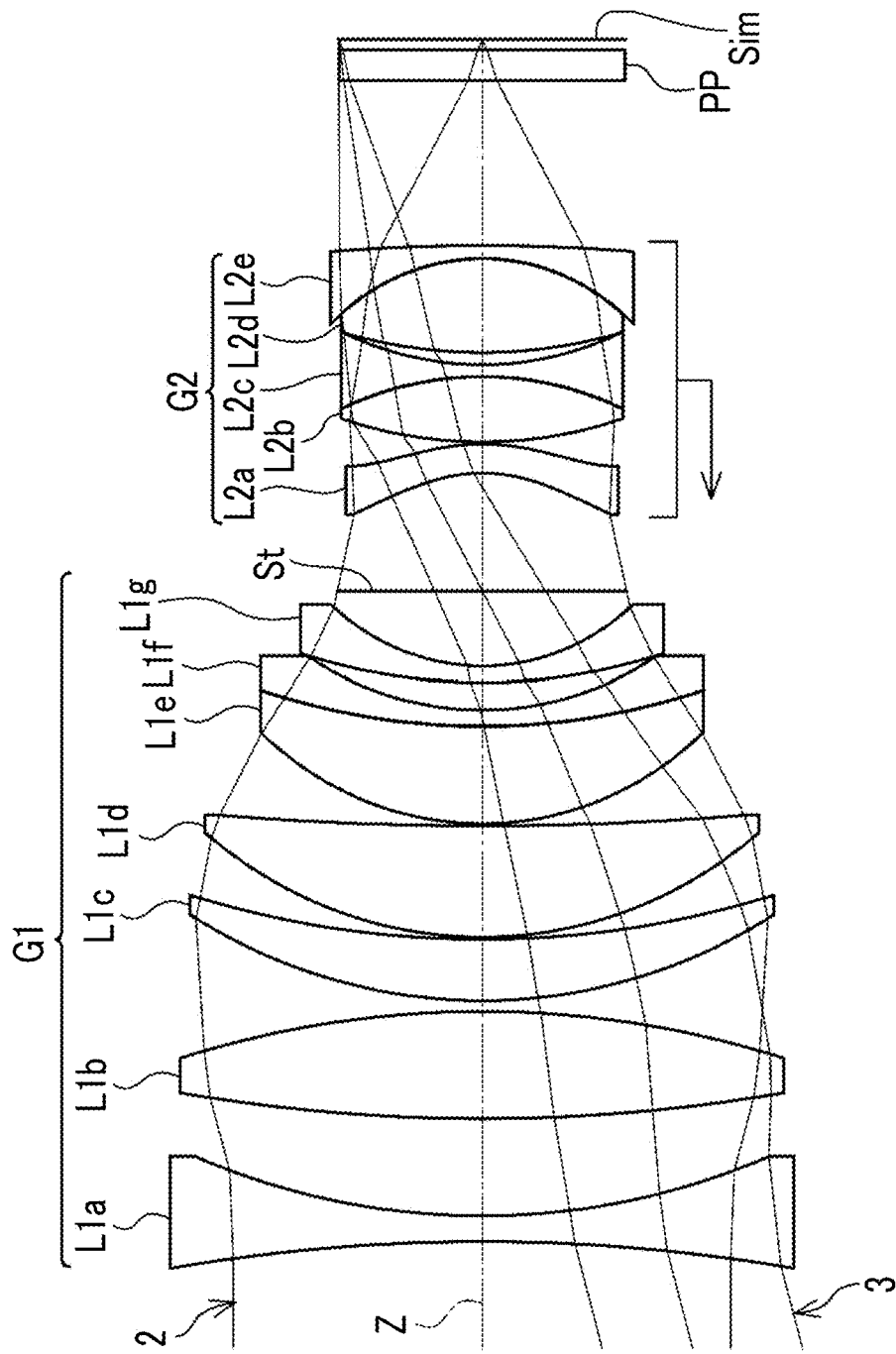
FIG. 25 is a cross-sectional view showing a configuration and rays of an imaging lens of Example 9.

FIG. 25 shows a cross-sectional configuration of the imaging lens of Example 9. The imaging lens of Example 9 consists of, in order from the object side, the first lens group G1 that has a positive refractive power, the aperture stop St, and the second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of seven lenses L1a to L1g in order from the object side. The second lens group G2 consists of five lenses L2a to L2e in order from the object side.

Figure 26:
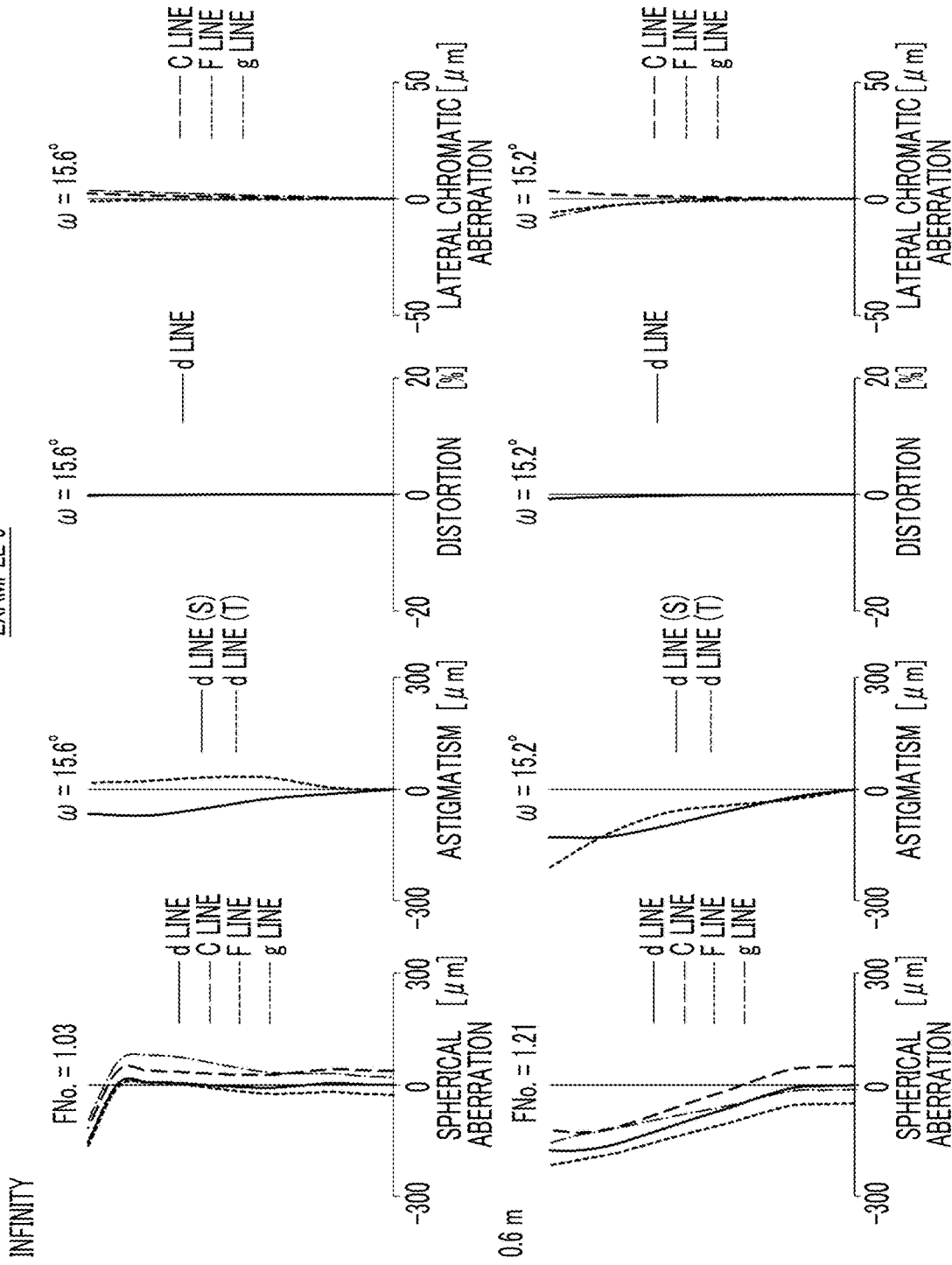
FIG. 26 shows spherical aberration diagrams, astigmatism diagrams, distortion diagrams, lateral chromatic aberration diagrams of the imaging lens of Example 9.
Figure 27:
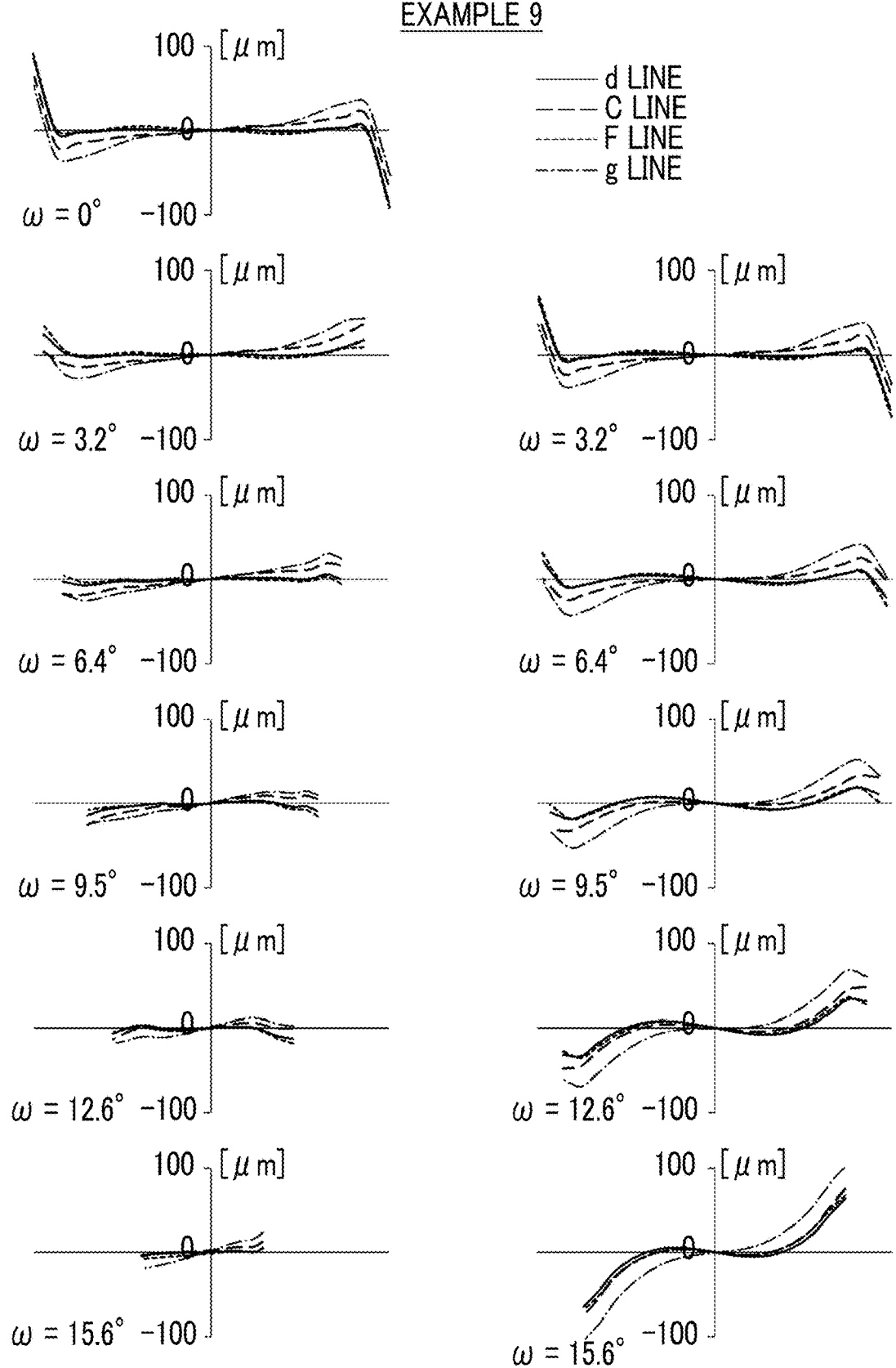
FIG. 27 shows lateral aberration diagrams of the imaging lens according to Example 9.

Regarding the imaging lens of Example 9, Table 33 shows basic lens data, Table 34 shows specification, Table 35 shows variable surface distances, Table 36 shows aspheric surface coefficients, and FIGS. 26 and 27 show aberration diagrams. In FIG. 26, the upper part shows aberration diagrams in a state where the object at infinity is in focus, and the lower part shows aberration diagrams in a state where the object at the distance of 0.6 m (meter) from the object to the image plane Sim is in focus. FIG. 27 shows lateral aberration diagram in a state where the object at infinity is in focus.

TABLE 33

Example 9

| Sn | R | D | Nd | vd | θgF |
|---|---|---|---|---|---|
| 1 | −193.76114 | 2.400 | 1.54760 | 46.08 | 0.56589 |
| 2 | 75.97796 | 9.081 | | | |
| 3 | 189.01581 | 10.000 | 1.49700 | 81.61 | 0.53887 |
| 4 | −105.13621 | 1.010 | | | |
| 5 | 56.49917 | 5.721 | 1.92119 | 23.96 | 0.62025 |
| 6 | 104.36406 | 0.200 | | | |
| 7 | 43.70727 | 10.385 | 1.49700 | 81.61 | 0.53887 |
| 8 | 340.80096 | 0.200 | | | |
| 9 | 32.58246 | 9.094 | 1.75819 | 43.78 | 0.56631 |
| 10 | 73.72282 | 1.500 | 1.78472 | 25.68 | 0.61052 |
| 11 | 32.68245 | 2.542 | | | |
| 12 | 61.75401 | 1.500 | 1.89286 | 20.36 | 0.63944 |
| 13 | 22.41400 | 7.000 | | | |
| 14(St) | ∞ | DD[14] | | | |
| *15 | −16.41866 | 2.693 | 1.68948 | 31.02 | 0.59874 |
| *16 | −22.85517 | 0.200 | | | |
| 17 | 45.64284 | 6.105 | 1.88300 | 39.22 | 0.57295 |
| 18 | −33.87303 | 1.110 | 1.68877 | 30.80 | 0.59625 |
| 19 | 33.14697 | 1.132 | | | |
| 20 | 52.16226 | 8.770 | 1.88300 | 39.22 | 0.57295 |
| 21 | −21.44050 | 1.210 | 1.59203 | 38.80 | 0.57897 |
| 22 | −202.15701 | DD[22] | | | |
| 23 | ∞ | 2.850 | 1.51680 | 64.20 | 0.53430 |
| 24 | ∞ | 1.000 | | | |

TABLE 34

Example 9

| | |
|---|---|
| f | 51.018 |
| FNo. | 1.03 |
| 2ωmax | 31.2 |

TABLE 35

Example 9

| | Infinity | 0.6 m |
|---|---|---|
| DD[14] | 11.000 | 5.539 |
| DD[22] | 15.401 | 20.862 |

TABLE 36

Example 9

| Sn | 15 | 16 |
|---|---|---|
| KA | 1.0000000E+00 | 1.0000000E+00 |
| A3 | 0.0000000E+00 | 0.0000000E+00 |
| A4 | 2.5050662E−05 | 2.1927553E−05 |
| A5 | 1.6399123E−05 | 1.6962214E−05 |
| A6 | −2.7037336E−06 | −3.5614573E−06 |
| A7 | 2.2716407E−08 | 1.6637583E−07 |
| A8 | 7.0481328E−08 | 7.6462842E−08 |
| A9 | −7.0934969E−09 | −1.1129036E−08 |
| A10 | −9.1743883E−10 | −5.7804163E−10 |

TABLE 36-continued

Example 9

| Sn | 15 | 16 |
|---|---|---|
| A11 | 1.7293397E−10 | 1.9360903E−10 |
| A12 | 5.1834973E−12 | −1.4806257E−12 |
| A13 | −2.1727289E−12 | −1.7572338E−12 |
| A14 | 1.7187231E−14 | 5.7682678E−14 |
| A15 | 1.5404695E−14 | 9.0145899E−15 |
| A16 | −4.2947569E−16 | −4.1936383E−16 |
| A17 | −5.8157492E−17 | −2.4764768E−17 |
| A18 | 2.3258567E−18 | 1.3542989E−18 |
| A19 | 9.0773374E−20 | 2.8368189E−20 |
| A20 | −4.3526649E−21 | −1.6904315E−21 |

Example 10

Figure 28:
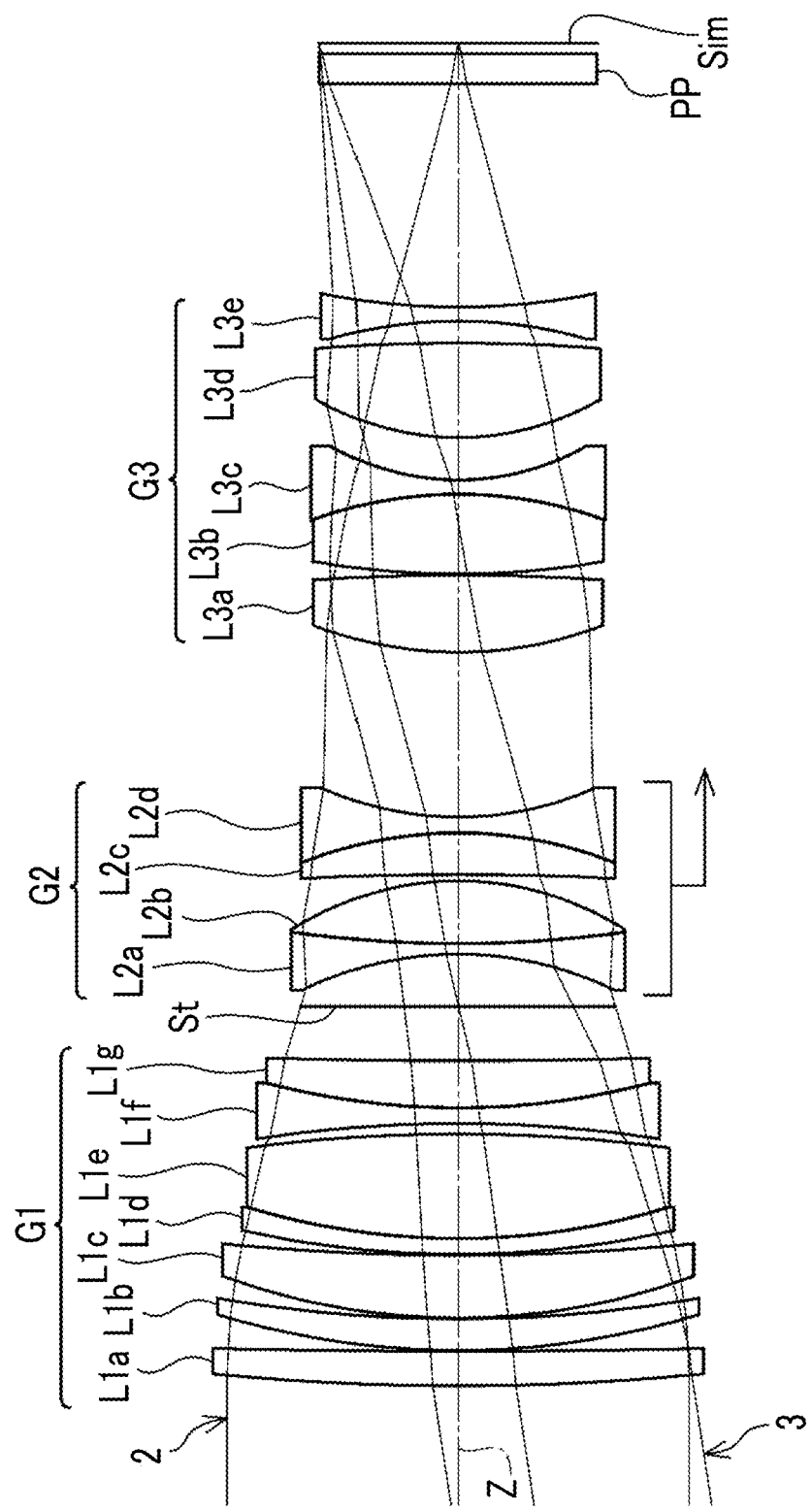
FIG. 28 is a cross-sectional view showing a configuration and rays of an imaging lens of Example 10.

FIG. 28 shows a cross-sectional configuration of the imaging lens of Example 10. The imaging lens of Example 10 consists of, in order from the object side, a first lens group G1 having a positive refractive power, an aperture stop St, a second lens group G2 having a negative refractive power, and a third lens group G3 having a positive refractive power. During focusing from the object at infinity to the closest object, the first lens group G1 and the third lens group G3 remain stationary with respect to the image plane Sim, and the second lens group G2 moves to the image side along the optical axis Z. The first lens group G1 consists of seven lenses L1a to L1g in order from the object side. The second lens group G2 consists of four lenses L2a to L2d in order from the object side. The third lens group G3 consists of five lenses L3a to L3e in order from the object side.

Figure 29:
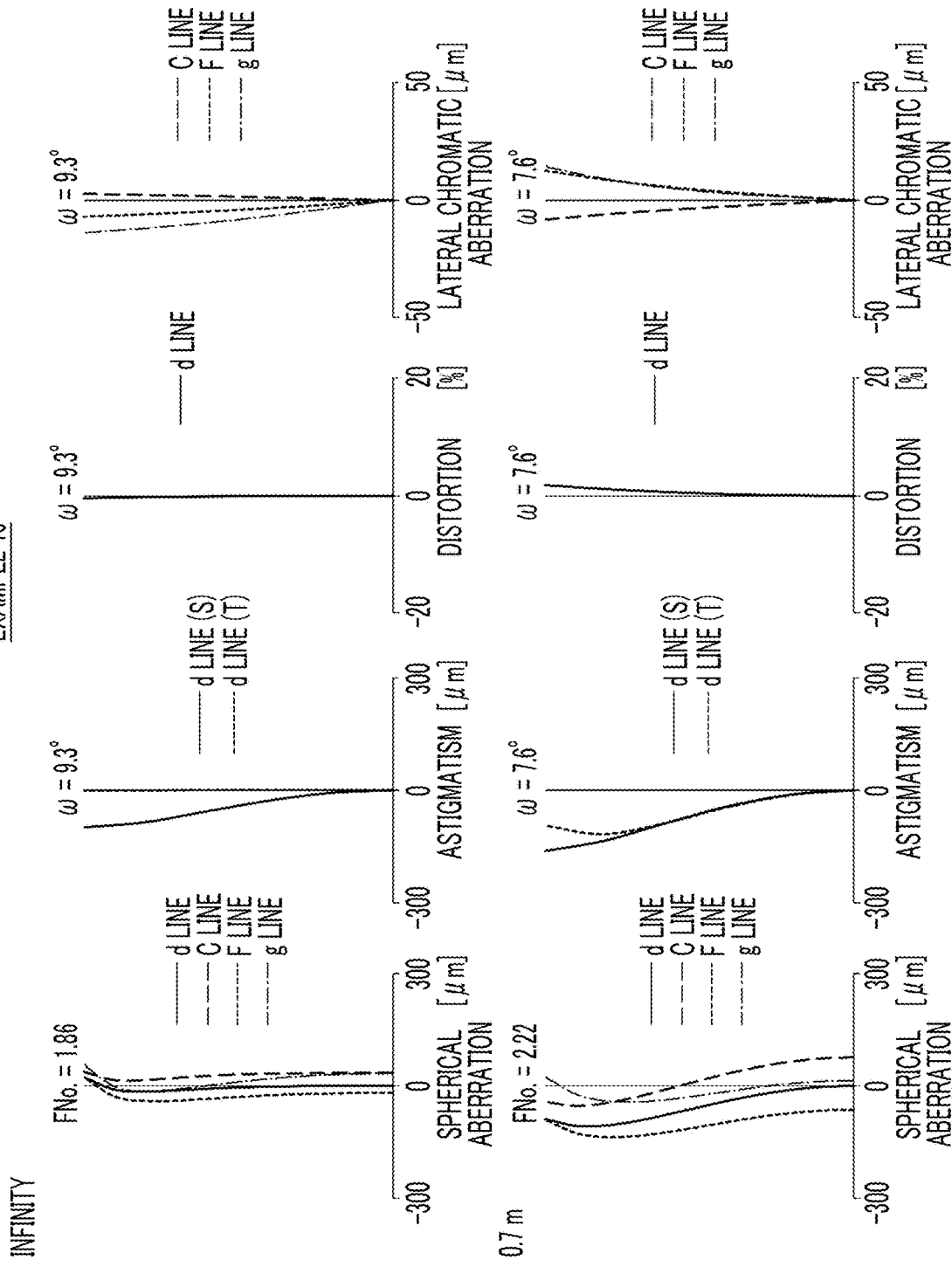
FIG. 29 shows spherical aberration diagrams, astigmatism diagrams, distortion diagrams, lateral chromatic aberration diagrams of the imaging lens of Example 10.
Figure 30:
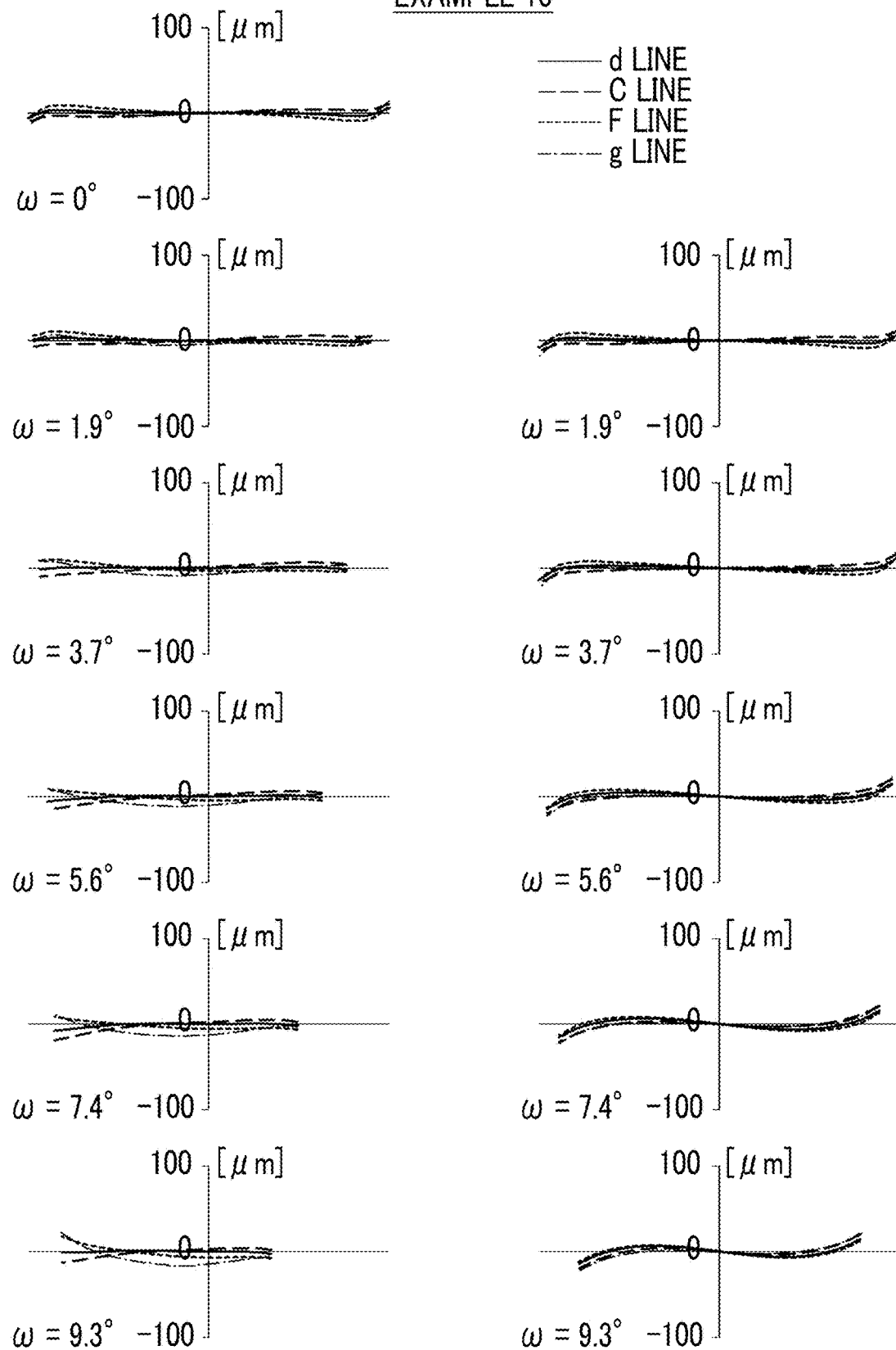
FIG. 30 shows lateral aberration diagrams of the imaging lens according to Example 10.

Regarding the imaging lens of Example 10, Table 37 shows basic lens data, Table 38 shows specification, Table 39 shows variable surface distances, and FIGS. 29 and 30 shows aberration diagrams. In FIG. 29, the upper part shows aberration diagrams in a state where the object at infinity is in focus, and the lower part shows aberration diagrams in a state where the object at the distance of 0.7 m (meter) from the object to the image plane Sim is in focus. FIG. 30 shows lateral aberration diagram in a state where the object at infinity is in focus.

TABLE 37

Example 10

| Sn | R | D | Nd | vd | θgF |
|---|---|---|---|---|---|
| 1 | 272.44778 | 3.300 | 2.05090 | 26.94 | 0.60519 |
| 2 | 1081.40696 | 0.100 | | | |
| 3 | 89.65014 | 3.000 | 1.59282 | 68.62 | 0.54414 |
| 4 | 152.15669 | 0.100 | | | |
| 5 | 74.09242 | 6.000 | 1.59282 | 68.62 | 0.54414 |
| 6 | 263.34977 | 0.100 | | | |
| 7 | 107.02621 | 1.500 | 1.85896 | 22.73 | 0.62844 |
| 8 | 78.42749 | 10.010 | 1.76212 | 31.60 | 0.59550 |
| 9 | −175.82899 | 1.000 | | | |
| 10 | −144.21433 | 1.500 | 1.85896 | 22.73 | 0.62844 |
| 11 | 80.87758 | 4.510 | 1.56883 | 56.36 | 0.54890 |
| 12 | 716.45491 | 5.217 | | | |
| 13(St) | ∞ | DD[13] | | | |
| 14 | −38.44224 | 1.000 | 1.87904 | 40.10 | 0.56811 |
| 15 | 130.29249 | 6.010 | 1.59410 | 60.47 | 0.55516 |
| 16 | −33.25476 | 0.600 | | | |
| 17 | −351.00941 | 4.000 | 2.00272 | 19.32 | 0.64514 |
| 18 | −45.80501 | 1.500 | 1.64173 | 39.35 | 0.57903 |
| 19 | 36.04598 | DD[19] | | | |
| 20 | 43.30755 | 7.389 | 1.59522 | 67.73 | 0.54426 |
| 21 | −236.34955 | 0.100 | | | |
| 22 | 90.49741 | 7.652 | 1.83481 | 42.72 | 0.56486 |

TABLE 37-continued

Example 10

| Sn | R | D | Nd | vd | θgF |
|---|---|---|---|---|---|
| 23 | −46.09199 | 1.360 | 1.67270 | 32.10 | 0.59891 |
| 24 | 27.92315 | 4.075 | | | |
| 25 | 30.74850 | 9.035 | 1.65463 | 48.36 | 0.56208 |
| 26 | −201.70415 | 2.100 | | | |
| 27 | −51.13607 | 1.350 | 1.48749 | 70.44 | 0.53062 |
| 28 | 76.12890 | 21.401 | | | |
| 29 | ∞ | 2.850 | 1.51680 | 64.20 | 0.53430 |
| 30 | ∞ | 1.000 | | | |

TABLE 38

Example 10

| | |
|---|---|
| f | 87.302 |
| FNo. | 1.86 |
| 2ωmax | 18.6 |

TABLE 39

Example 10

| | Infinity | 0.7 m |
|---|---|---|
| DD[13] | 5.000 | 16.962 |
| DD[19] | 15.702 | 3.740 |

Example 11

Figure 31:
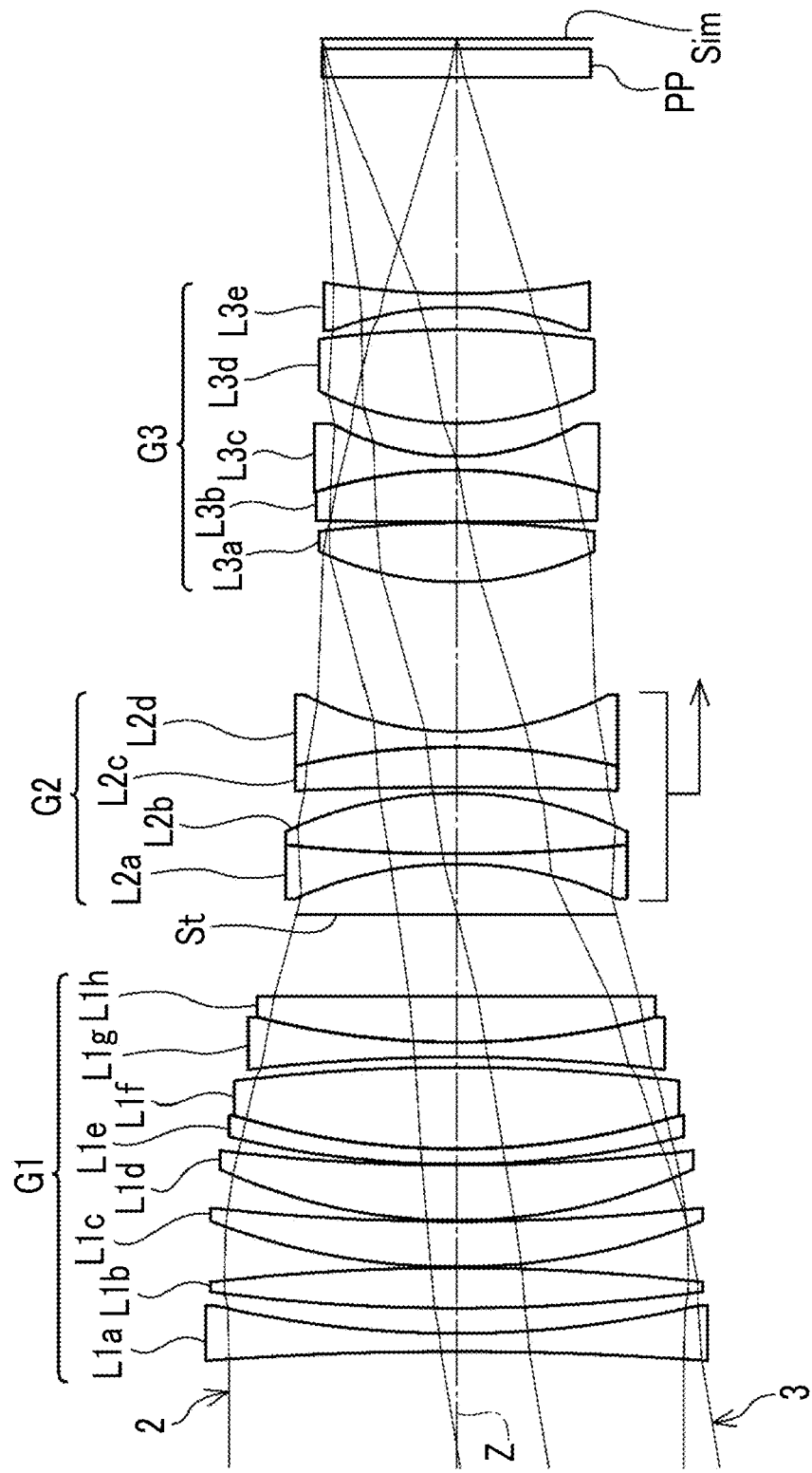
FIG. 31 is a cross-sectional view showing a configuration and rays of an imaging lens of Example 11.

FIG. 31 shows a cross-sectional configuration of the imaging lens of Example 11. The imaging lens of Example 11 consists of, in order from the object side, a first lens group G1 having a positive refractive power, an aperture stop St, a second lens group G2 having a negative refractive power, and a third lens group G3 having a positive refractive power. During focusing from the object at infinity to the closest object, the first lens group G1 and the third lens group G3 remain stationary with respect to the image plane Sim, and the second lens group G2 moves to the image side along the optical axis Z. The first lens group G1 consists of eight lenses L1a to L1h in order from the object side. The second lens group G2 consists of four lenses L2a to L2d in order from the object side. The third lens group G3 consists of five lenses L3a to L3e in order from the object side.

Figure 32:
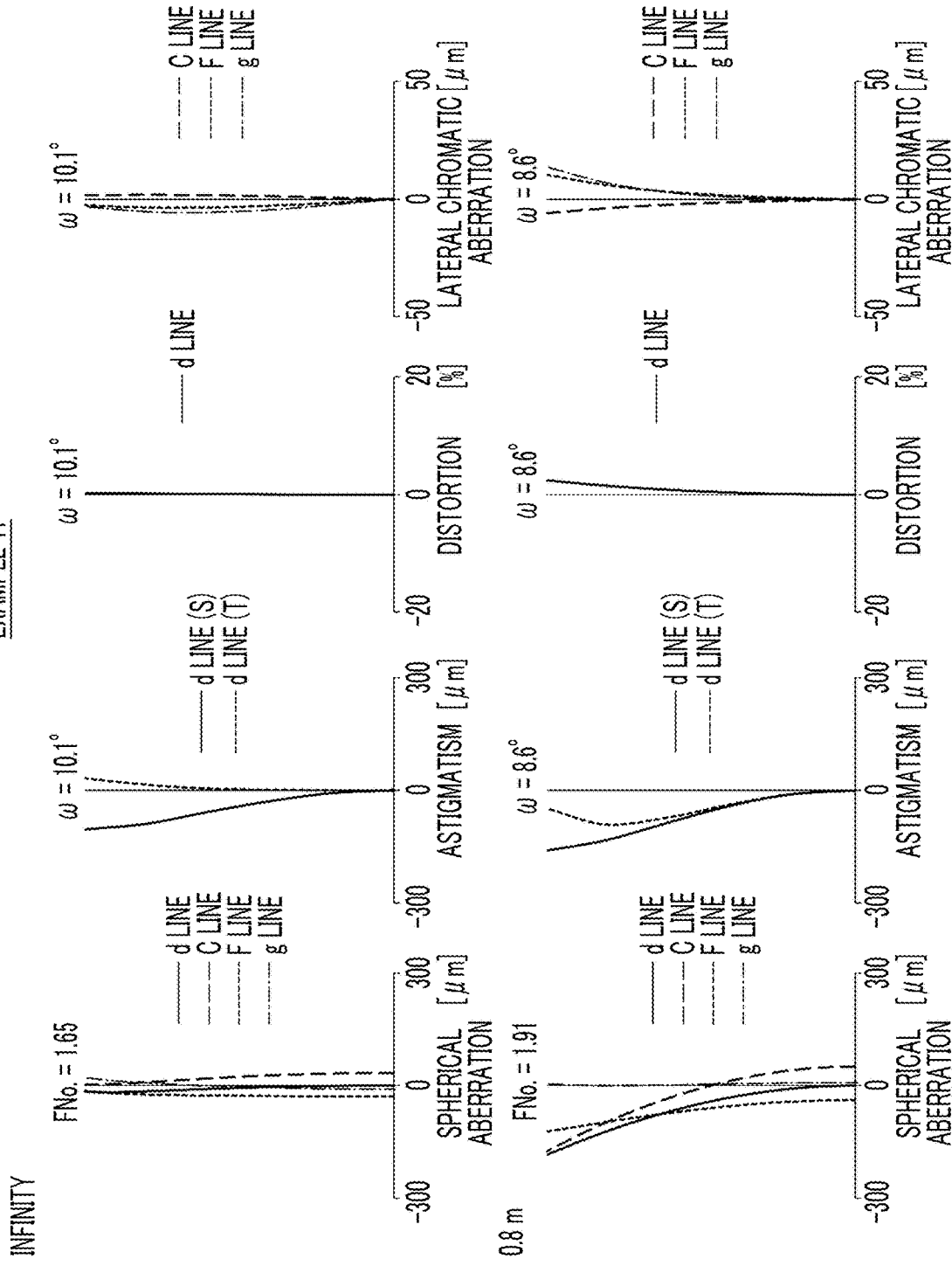
FIG. 32 shows spherical aberration diagrams, astigmatism diagrams, distortion diagrams, lateral chromatic aberration diagrams of the imaging lens of Example 11.
Figure 33:
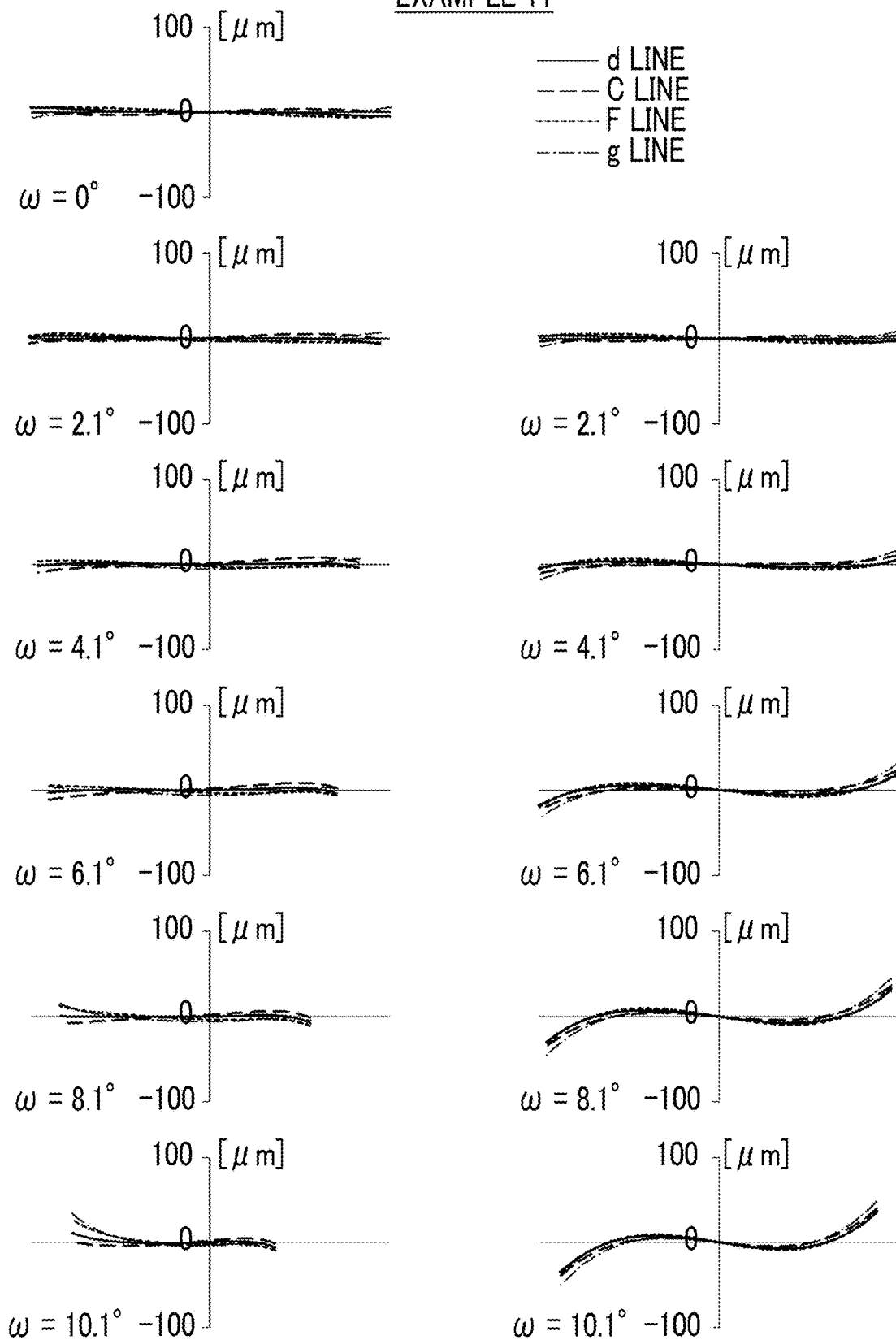
FIG. 33 shows lateral aberration diagrams of the imaging lens according to Example 11.

Regarding the imaging lens of Example 11, Table 40 shows basic lens data, Table 41 shows specification, Table 42 shows variable surface distances, and FIGS. 32 and 33 shows aberration diagrams. In FIG. 32, the upper part shows aberration diagrams in a state where the object at infinity is in focus, and the lower part shows aberration diagrams in a state where the object at the distance of 0.8 m (meter) from the object to the image plane Sim is in focus. FIG. 33 shows lateral aberration diagram in a state where the object at infinity is in focus.

TABLE 40

Example 11

| Sn | R | D | Nd | vd | θgF |
|---|---|---|---|---|---|
| 1 | −386.94657 | 1.800 | 1.69680 | 55.53 | 0.54341 |
| 2 | 119.46581 | 2.500 | | | |

TABLE 40-continued

Example 11

| Sn | R | D | Nd | vd | θgF |
|---|---|---|---|---|---|
| 3 | 207.26394 | 4.000 | 1.95375 | 32.32 | 0.59015 |
| 4 | −238.96341 | 0.100 | | | |
| 5 | 76.64894 | 4.500 | 1.59522 | 67.73 | 0.54426 |
| 6 | 248.42469 | 0.100 | | | |
| 7 | 63.92071 | 5.500 | 1.43875 | 94.66 | 0.53402 |
| 8 | 216.59149 | 0.100 | | | |
| 9 | 107.16236 | 1.500 | 1.85025 | 30.05 | 0.59797 |
| 10 | 85.24799 | 7.998 | 1.65412 | 39.68 | 0.57378 |
| 11 | −205.11243 | 1.000 | | | |
| 12 | −197.70982 | 1.500 | 1.92119 | 23.96 | 0.62025 |
| 13 | 90.62875 | 4.510 | 1.45860 | 90.19 | 0.53516 |
| 14 | −30275.61759 | 8.130 | | | |
| 15(St) | ∞ | DD[15] | | | |
| 16 | −43.49420 | 1.000 | 1.89190 | 37.13 | 0.57813 |
| 17 | 185.12129 | 6.010 | 1.77250 | 49.60 | 0.55212 |
| 18 | −44.59399 | 0.600 | | | |
| 19 | −428.71303 | 4.000 | 2.10420 | 17.02 | 0.66311 |
| 20 | −76.05920 | 1.500 | 1.58144 | 40.75 | 0.57757 |
| 21 | 37.00980 | DD[21] | | | |
| 22 | 36.00466 | 5.851 | 1.59522 | 67.73 | 0.54426 |
| 23 | −124.44012 | 0.100 | | | |
| 24 | 829.97224 | 5.140 | 1.90043 | 37.37 | 0.57720 |
| 25 | −51.93826 | 1.360 | 1.67270 | 32.10 | 0.59891 |
| 26 | 28.10820 | 3.300 | | | |
| 27 | 34.48127 | 9.174 | 1.77250 | 49.60 | 0.55212 |
| 28 | −110.39811 | 2.231 | | | |
| 29 | −38.11168 | 1.350 | 1.48749 | 70.44 | 0.53062 |
| 30 | 89.57871 | 21.429 | | | |
| 31 | ∞ | 2.850 | 1.51680 | 64.20 | 0.53430 |
| 32 | ∞ | 1.000 | | | |

TABLE 41

Example 11

| | |
|---|---|
| f | 79.213 |
| FNo. | 1.65 |
| 2ωmax | 20.2 |

TABLE 42

Example 11

| | Infinity | 0.8 m |
|---|---|---|
| DD[15] | 5.043 | 18.069 |
| DD[21] | 14.864 | 1.838 |

Example 12

Figure 34:
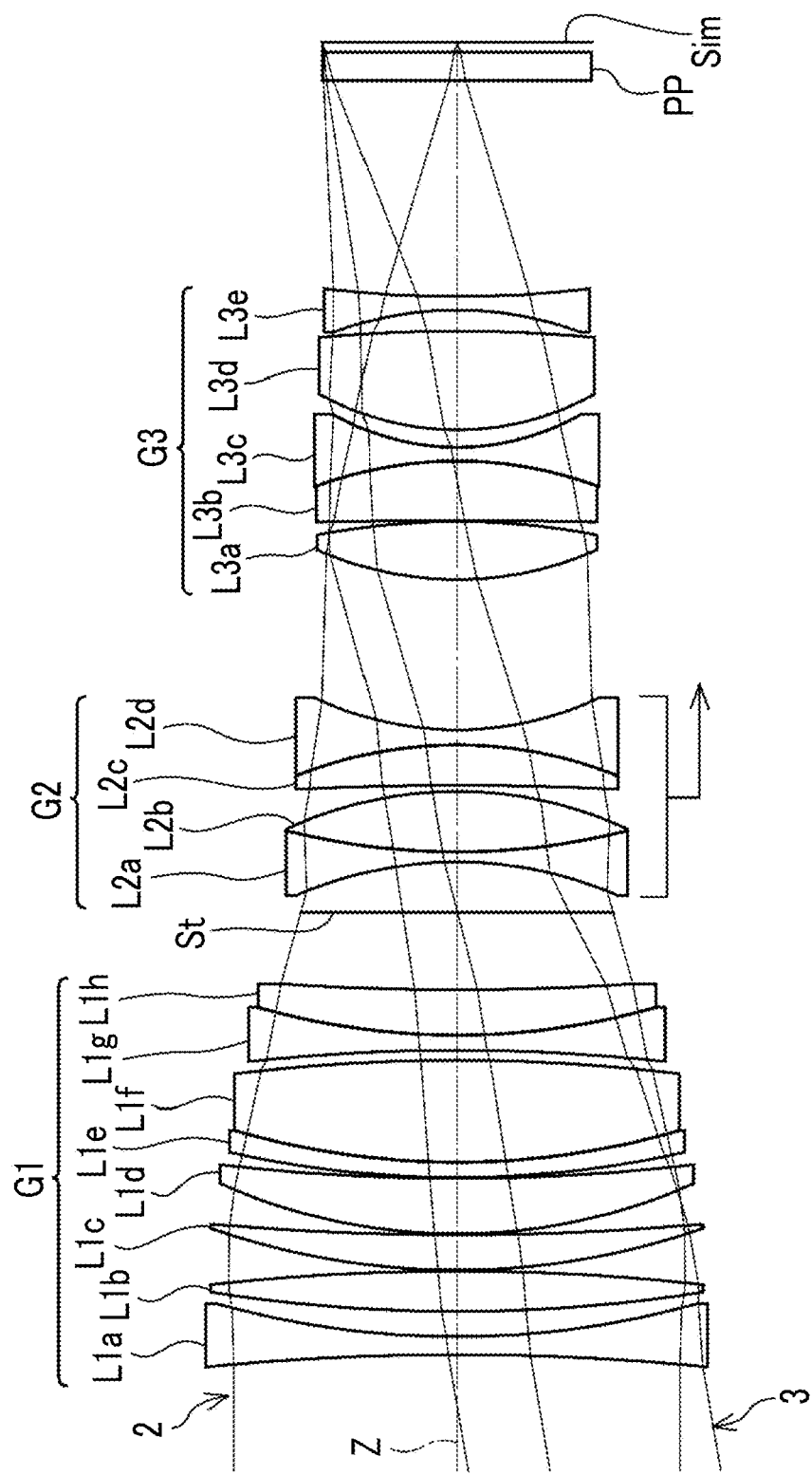
FIG. 34 is a cross-sectional view showing a configuration and rays of an imaging lens of Example 12.

FIG. 34 shows a cross-sectional configuration of the imaging lens of Example 12. The imaging lens of Example 12 consists of, in order from the object side, a first lens group G1 having a positive refractive power, an aperture stop St, a second lens group G2 having a negative refractive power, and a third lens group G3 having a positive refractive power. During focusing from the object at infinity to the closest object, the first lens group G1 and the third lens group G3 remain stationary with respect to the image plane Sim, and the second lens group G2 moves to the image side along the optical axis Z. The first lens group G1 consists of eight lenses L1a to L1h in order from the object side. The second lens group G2 consists of four lenses L2a to L2d in order from the object side. The third lens group G3 consists of five lenses L3a to L3e in order from the object side.

Figure 35:
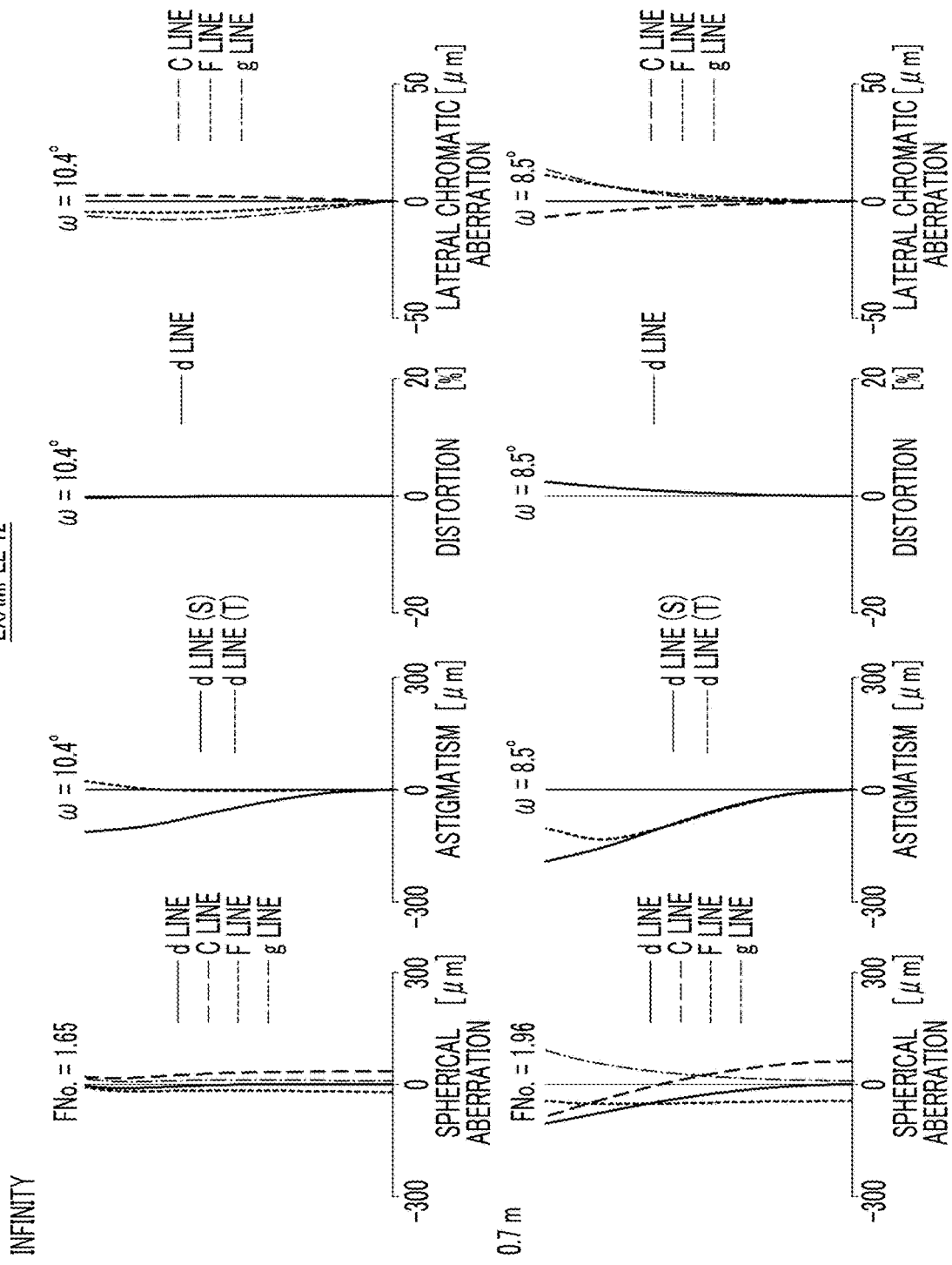
FIG. 35 shows spherical aberration diagrams, astigmatism diagrams, distortion diagrams, lateral chromatic aberration diagrams of the imaging lens of Example 12.
Figure 36:
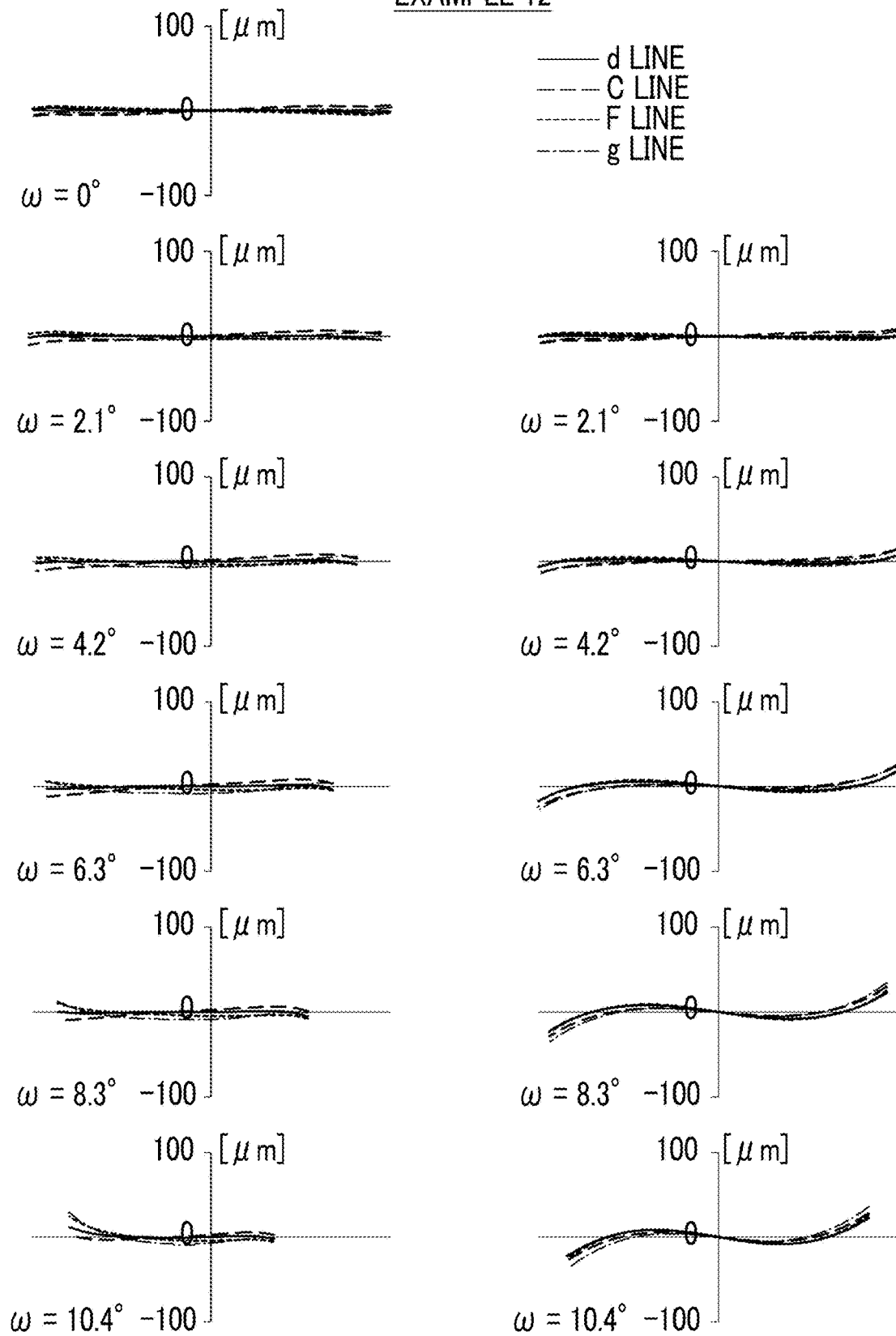
FIG. 36 shows lateral aberration diagrams of the imaging lens according to Example 12.

Regarding the imaging lens of Example 12, Table 43 shows basic lens data, Table 44 shows specification, Table 45 shows variable surface distances, and FIGS. 35 and 36 shows aberration diagrams. In FIG. 35, the upper part shows aberration diagrams in a state where the object at infinity is in focus, and the lower part shows aberration diagrams in a state where the object at the distance of 0.7 m (meter) from the object to the image plane Sim is in focus. FIG. 36 shows lateral aberration diagram in a state where the object at infinity is in focus.

TABLE 43

Example 12

| Sn | R | D | Nd | vd | θgF |
|---|---|---|---|---|---|
| 1 | −291.68052 | 1.800 | 1.64769 | 33.79 | 0.59393 |
| 2 | 99.99894 | 2.500 | | | |
| 3 | 177.53930 | 4.000 | 1.92119 | 23.96 | 0.62025 |
| 4 | −250.63993 | 0.100 | | | |
| 5 | 83.49241 | 3.500 | 1.59522 | 67.73 | 0.54426 |
| 6 | 315.24688 | 0.100 | | | |
| 7 | 65.26695 | 5.500 | 1.55032 | 75.50 | 0.54001 |
| 8 | 230.27246 | 0.100 | | | |
| 9 | 117.55484 | 1.500 | 2.00069 | 25.46 | 0.61364 |
| 10 | 89.18435 | 10.010 | 1.67300 | 38.26 | 0.57580 |
| 11 | −205.86865 | 1.000 | | | |
| 12 | −214.55358 | 1.500 | 1.85896 | 22.73 | 0.62844 |
| 13 | 81.16463 | 4.510 | 1.62299 | 58.16 | 0.54589 |
| 14 | 301.17897 | 7.667 | | | |
| 15(St) | ∞ | DD[15] | | | |
| 16 | −44.85924 | 1.000 | 1.89190 | 37.13 | 0.57813 |
| 17 | 78.25190 | 6.010 | 1.72916 | 54.68 | 0.54451 |
| 18 | −44.95132 | 0.600 | | | |
| 19 | −344.73789 | 4.000 | 1.94595 | 17.98 | 0.65460 |
| 20 | −48.43416 | 1.500 | 1.58144 | 40.75 | 0.57757 |
| 21 | 36.97488 | DD[21] | | | |
| 22 | 38.40711 | 5.751 | 1.59522 | 67.73 | 0.54426 |
| 23 | −82.40638 | 0.100 | | | |
| 24 | −707.34003 | 5.905 | 1.85150 | 40.78 | 0.56958 |
| 25 | −45.35298 | 1.360 | 1.67270 | 32.10 | 0.59891 |
| 26 | 27.74475 | 1.726 | | | |
| 27 | 31.49767 | 9.688 | 1.80400 | 46.53 | 0.55775 |
| 28 | −172.72812 | 2.100 | | | |
| 29 | −40.02478 | 1.350 | 1.48749 | 70.44 | 0.53062 |
| 30 | 129.32128 | 21.402 | | | |
| 31 | ∞ | 2.850 | 1.51680 | 64.20 | 0.53430 |
| 32 | ∞ | 1.000 | | | |

TABLE 44

Example 12

| | |
|---|---|
| f | 77.634 |
| FNo. | 1.65 |
| 2ωmax | 20.8 |

TABLE 45

Example 12

| | Infinity | 0.7 m |
|---|---|---|
| DD[15] | 5.000 | 19.027 |
| DD[21] | 14.908 | 0.881 |

Example 13

Figure 37:
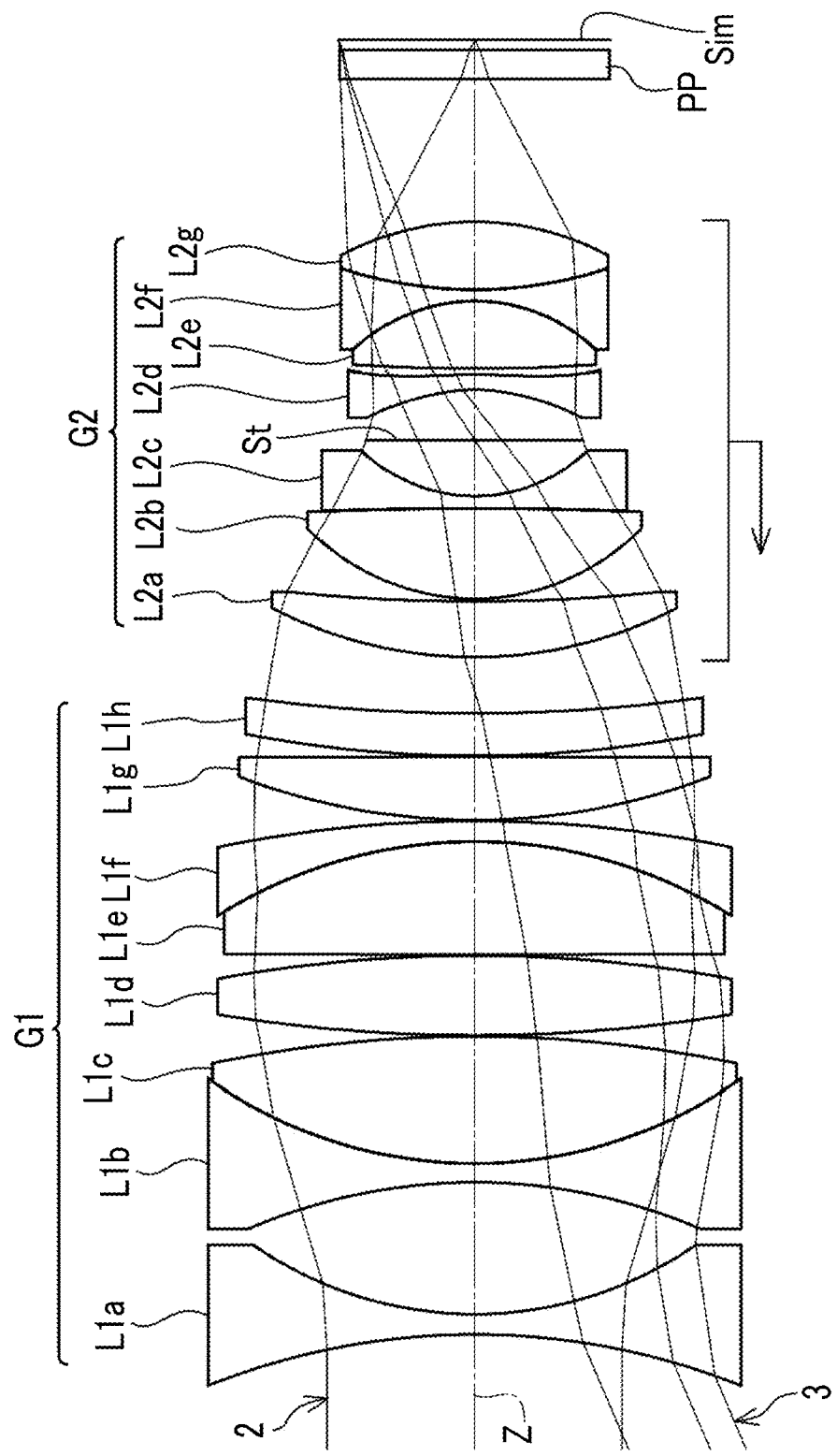
FIG. 37 is a cross-sectional view showing a configuration and rays of an imaging lens of Example 13.

FIG. 37 shows a cross-sectional configuration of the imaging lens of Example 13. The imaging lens of Example 13 consists of, in order from the object side, a first lens group G1 that has a positive refractive power, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of eight lenses L1a to L1h in order from the object side. The second lens group G2 consists of lenses L2a to L2c, an aperture stop St, and lenses L2d to L2g in order from the object side.

Figure 38:
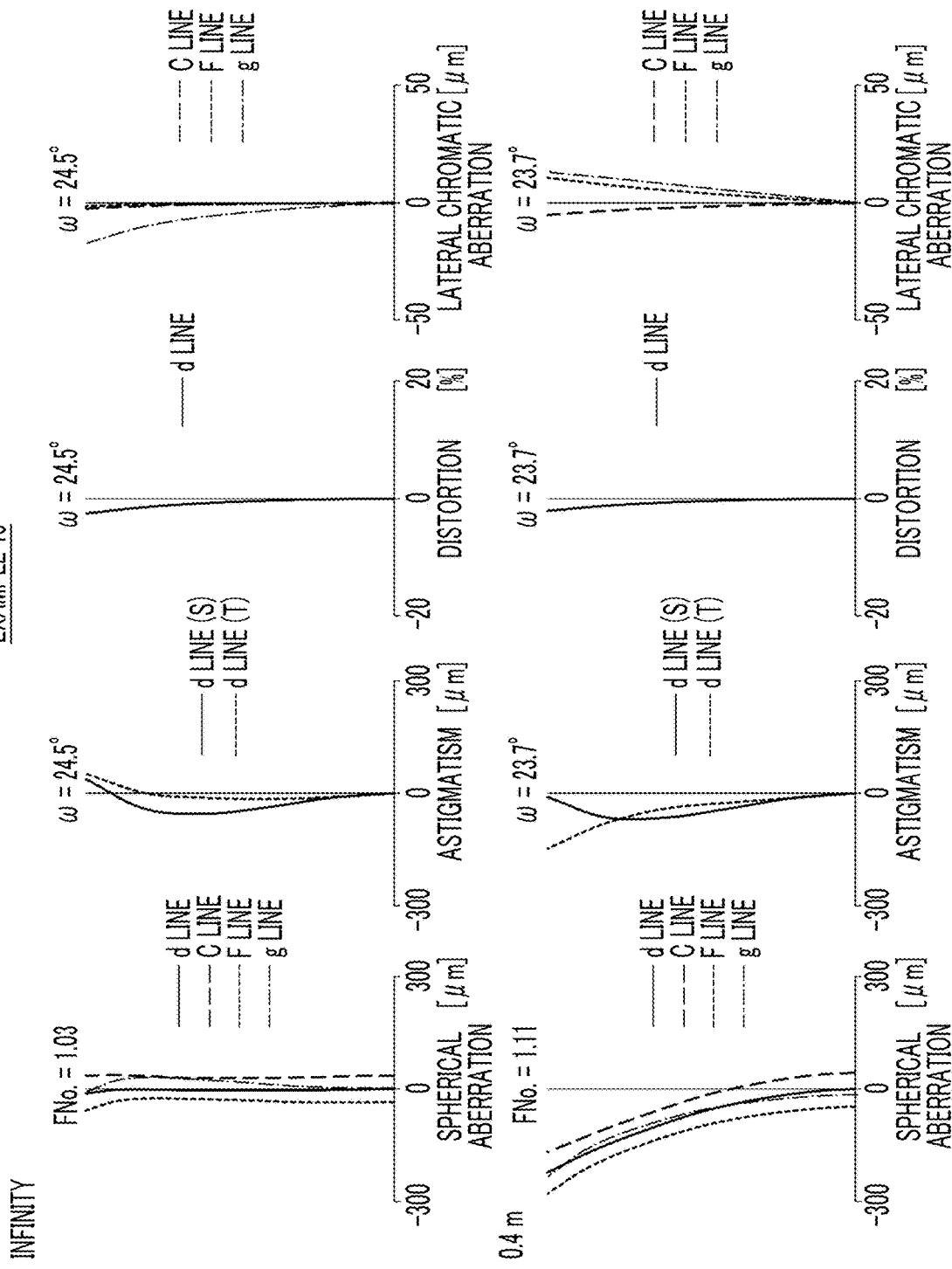
FIG. 38 shows spherical aberration diagrams, astigmatism diagrams, distortion diagrams, lateral chromatic aberration diagrams of the imaging lens of Example 13.
Figure 39:
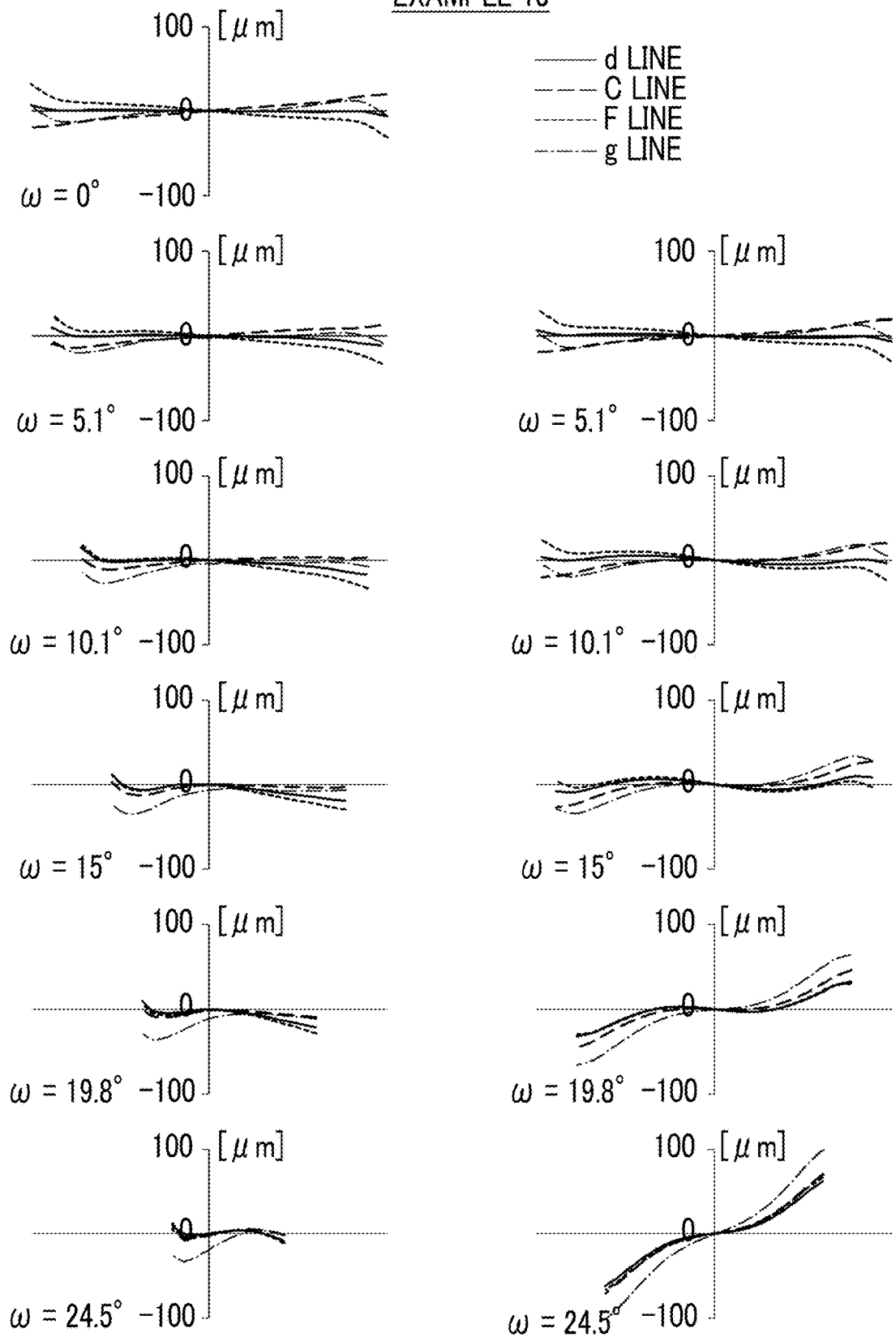
FIG. 39 shows lateral aberration diagrams of the imaging lens according to Example 13.

Regarding the imaging lens of Example 13, Table 46 shows basic lens data, Table 47 shows specification, Table 48 shows variable surface distances, Table 49 shows aspheric surface coefficients, and FIGS. 38 and 39 show aberration diagrams. In FIG. 38, the upper part shows aberration diagrams in a state where the object at infinity is in focus, and the lower part shows aberration diagrams in a state where the object at the distance of 0.4 m (meter) from the object to the image plane Sim is in focus. FIG. 39 shows lateral aberration diagram in a state where the object at infinity is in focus.

TABLE 46

Example 13

| Sn | R | D | Nd | vd | θgF |
|---|---|---|---|---|---|
| 1 | −80.28635 | 2.000 | 1.48749 | 70.24 | 0.53007 |
| 2 | 42.98733 | 13.000 | | | |
| 3 | −63.79046 | 1.860 | 1.62004 | 36.26 | 0.58800 |
| 4 | 51.39741 | 12.441 | 1.88299 | 40.78 | 0.56829 |
| 5 | −144.73231 | 0.100 | | | |
| 6 | 176.27919 | 7.877 | 2.00069 | 25.46 | 0.61364 |
| 7 | −160.05852 | 0.100 | | | |
| 8 | 24017.51177 | 11.145 | 1.49700 | 81.54 | 0.53748 |
| 9 | −53.46758 | 2.020 | 1.95906 | 17.47 | 0.65993 |
| 10 | −141.76150 | 0.100 | | | |
| 11 | 73.80784 | 6.228 | 1.43875 | 94.66 | 0.53402 |
| 12 | −6705.69476 | 0.100 | | | |
| 13 | 135.56611 | 4.200 | 1.49700 | 81.54 | 0.53748 |
| 14 | 188.15073 | DD[14] | | | |
| 15 | 48.95259 | 5.513 | 1.95906 | 17.47 | 0.65993 |
| 16 | 205.45635 | 0.253 | | | |
| 17 | 25.65935 | 8.918 | 1.59282 | 68.62 | 0.54414 |
| 18 | −442.23226 | 1.200 | 1.80809 | 22.76 | 0.63073 |
| 19 | 17.92257 | 5.504 | | | |
| 20(St) | ∞ | 5.000 | | | |
| *21 | −17.88285 | 1.500 | 1.68948 | 31.02 | 0.59874 |
| *22 | −49.72259 | 0.500 | | | |
| 23 | 213.02720 | 6.649 | 1.81600 | 46.62 | 0.55682 |
| 24 | −19.33525 | 1.120 | 1.62004 | 36.26 | 0.58800 |
| 25 | 47.67656 | 6.689 | 1.88299 | 40.78 | 0.56829 |
| 26 | −31.38846 | DD[26] | | | |
| 27 | ∞ | 2.850 | 1.51680 | 64.20 | 0.53430 |
| 28 | ∞ | 1.000 | | | |

TABLE 47

Example 13

| f | 32.024 |
|---|---|
| FNo. | 1.03 |
| 2ωmax | 49.0 |

TABLE 48

Example 13

| | Infinity | 0.4 m |
|---|---|---|
| DD[14] | 5.524 | 1.833 |
| DD[26] | 14.098 | 17.789 |

TABLE 49

Example 13

| Sn | 21 | 22 |
|---|---|---|
| KA | 1.0000000E+00 | 1.0000000E+00 |
| A3 | 0.0000000E+00 | 0.0000000E+00 |
| A4 | 1.7715606E−04 | 1.7642986E−04 |
| A5 | 1.7074166E−05 | 1.6476812E−05 |
| A6 | −5.3189612E−06 | −4.6629565E−06 |
| A7 | −1.7052372E−07 | −2.6282483E−07 |
| A8 | 1.0629596E−07 | 1.1534278E−07 |
| A9 | 3.7804819E−10 | −2.9531996E−10 |
| A10 | −1.7627478E−09 | −1.9368547E−09 |
| A11 | 3.7456752E−11 | 8.2583641E−11 |
| A12 | 2.1780336E−11 | 1.9811305E−11 |
| A13 | −1.0619291E−12 | −1.3990529E−12 |
| A14 | −1.6070128E−13 | −1.1461723E−13 |
| A15 | 1.2952078E−14 | 1.1207794E−14 |
| A16 | 4.9200989E−16 | 2.9951674E−16 |
| A17 | −7.4222889E−17 | −4.5040584E−17 |
| A18 | 6.6519028E−19 | 5.5182976E−20 |
| A19 | 1.6312319E−19 | 7.2914615E−20 |
| A20 | −5.4198359E−21 | −1.3034388E−21 |

Example 14

Figure 40:
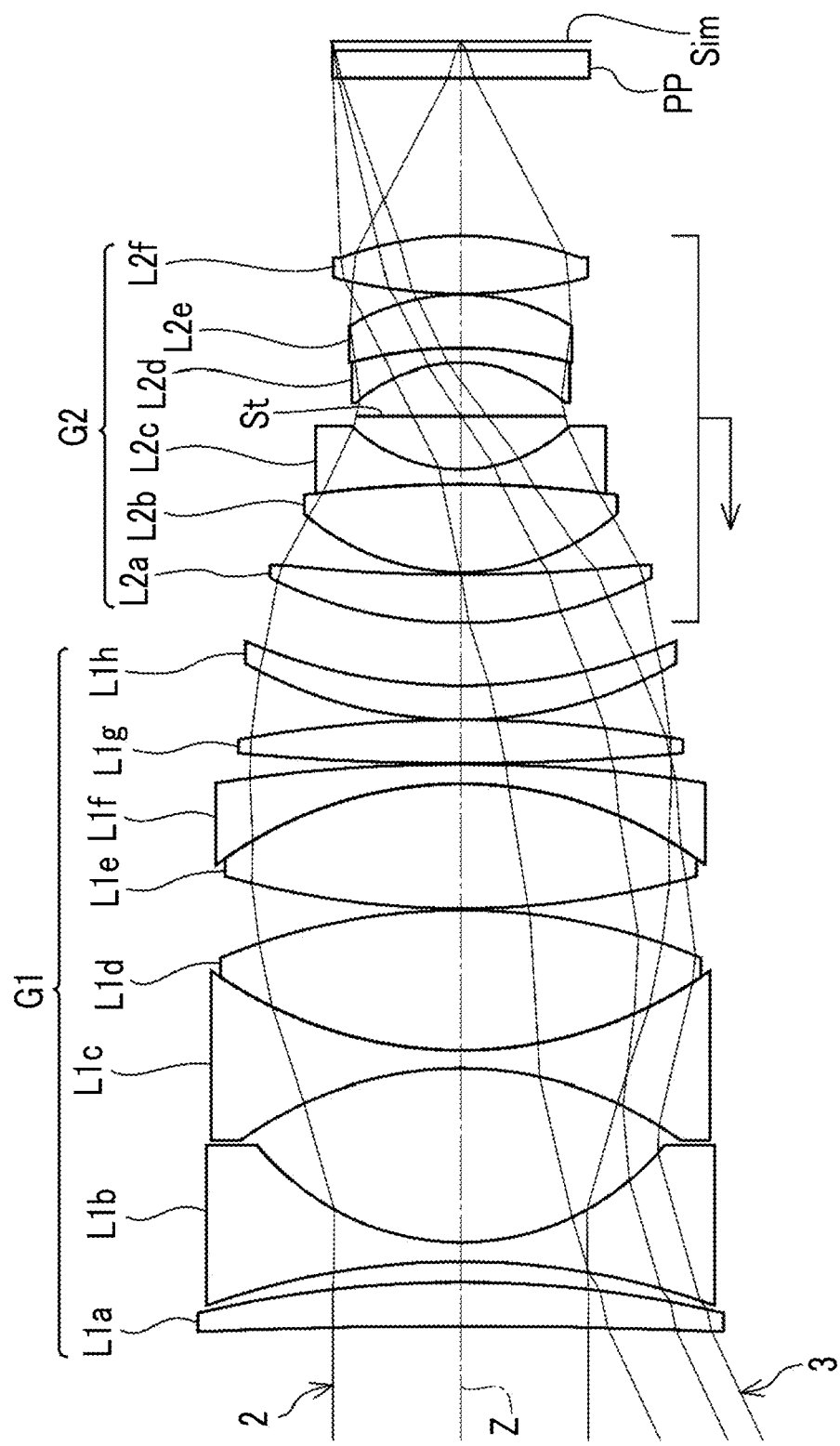
FIG. 40 is a cross-sectional view showing a configuration and rays of an imaging lens of Example 14.
Figure 41:
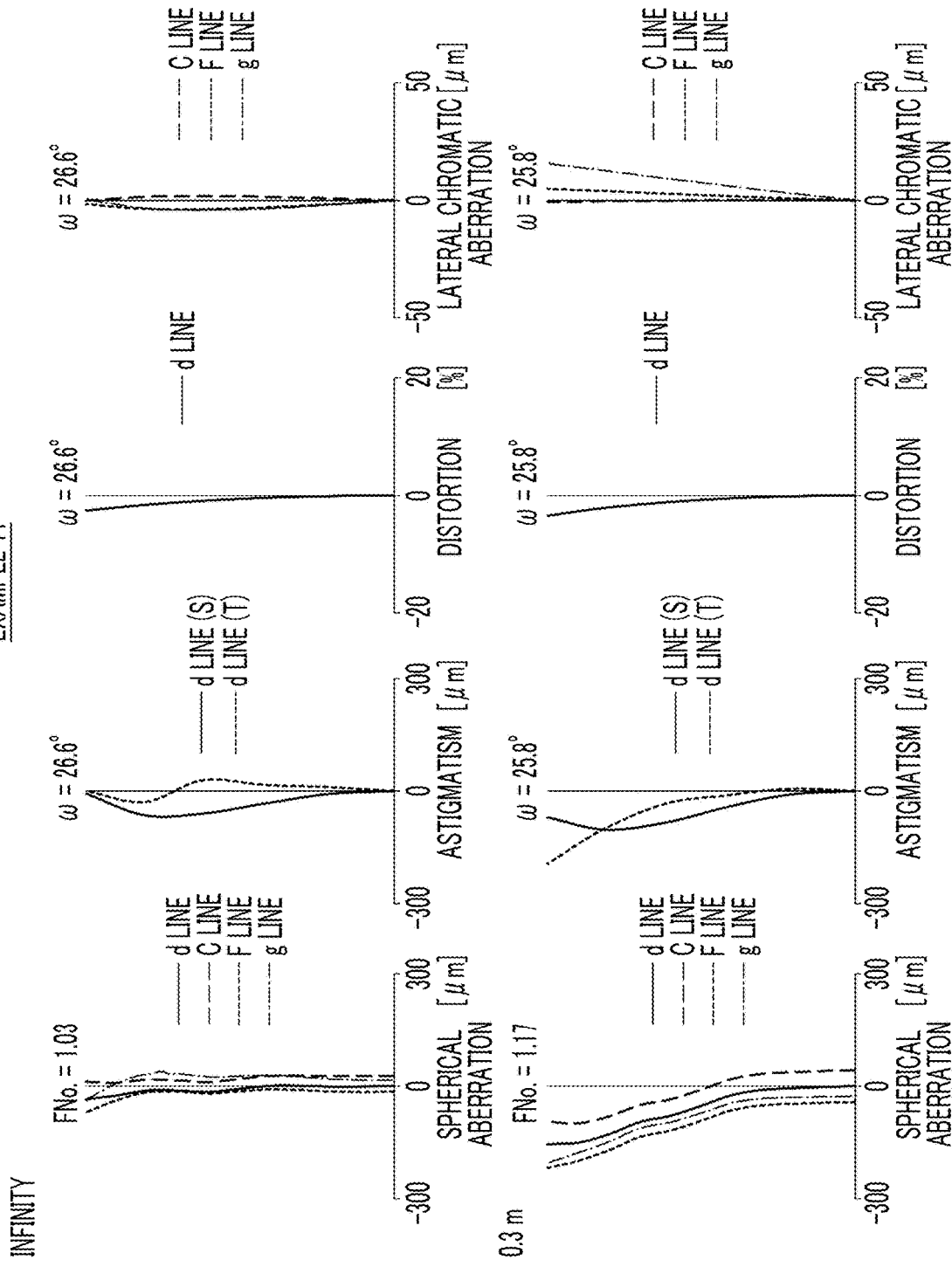
FIG. 41 shows spherical aberration diagrams, astigmatism diagrams, distortion diagrams, lateral chromatic aberration diagrams of the imaging lens of Example 14.
Figure 42:
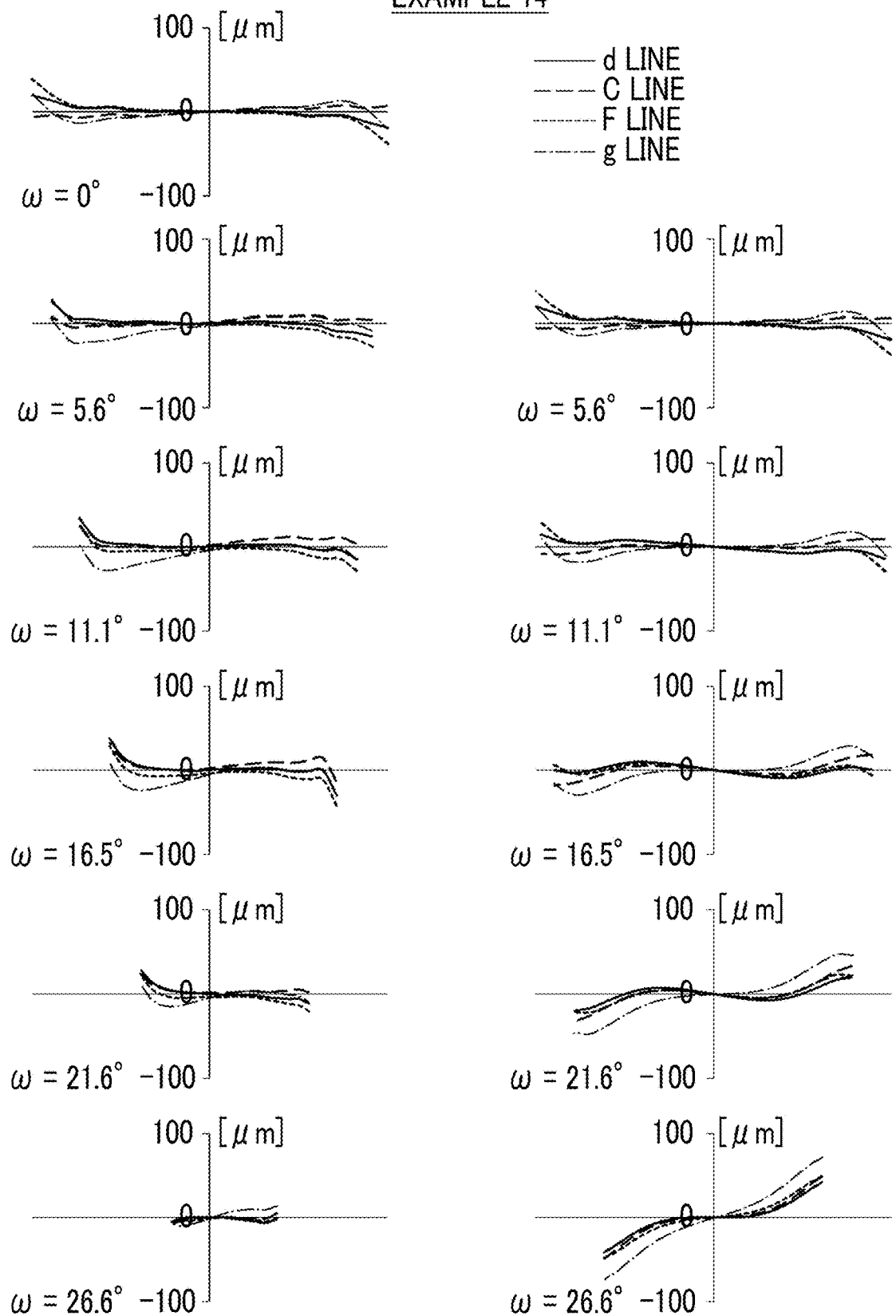
FIG. 42 shows lateral aberration diagrams of the imaging lens according to Example 14.

FIG. 40 shows a cross-sectional configuration of the imaging lens of Example 14. The imaging lens of Example 14 consists of, in order from the object side, a first lens group G1 that has a positive refractive power, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of eight lenses L1a to L1h in order from the object side. The second lens group G2 consists of, in order from the object side, lenses L2a to L2c, an aperture stop St, and lenses L2d to L2f. Regarding the imaging lens of Example 14, Table 50 shows basic lens data, Table 51 shows specification, Table 52 shows variable surface distances, Table 53 shows aspheric surface coefficients, and FIGS. 41 and 42 show aberration diagrams. In FIG. 41, the upper part shows aberration diagrams in a state where the object at infinity is in focus, and the lower part shows aberration diagrams in a state where the object at the distance of 0.3 m (meter) from the object to the image plane Sim is in focus. FIG. 42 shows lateral aberration diagram in a state where the object at infinity is in focus.

TABLE 50

Example 14

| Sn | R | D | Nd | vd | θgF |
|---|---|---|---|---|---|
| 1 | −741.84965 | 4.557 | 2.00001 | 16.35 | 0.64993 |
| 2 | −133.27267 | 2.137 | | | |
| 3 | −88.69549 | 2.000 | 1.51957 | 51.33 | 0.55675 |
| 4 | 30.12135 | 17.951 | | | |
| 5 | −43.59777 | 1.860 | 1.72220 | 28.89 | 0.60118 |
| 6 | 50.07951 | 14.509 | 1.99166 | 26.42 | 0.61104 |
| 7 | −73.94447 | 0.200 | | | |
| 8 | 102.81602 | 12.918 | 1.72183 | 55.41 | 0.54271 |
| 9 | −47.50103 | 2.020 | 1.96573 | 16.71 | 0.64633 |
| 10 | −188.35959 | 0.100 | | | |
| 11 | 282.52887 | 4.513 | 1.43875 | 94.66 | 0.53402 |
| 12 | −146.67361 | 0.010 | | | |
| 13 | 51.37757 | 3.531 | 1.59522 | 67.73 | 0.54426 |
| 14 | 63.46607 | DD[14] | | | |
| 15 | 49.82440 | 5.000 | 2.00001 | 15.00 | 0.65515 |

TABLE 50-continued

Example 14

| Sn | R | D | Nd | vd | θgF |
|---|---|---|---|---|---|
| 16 | 197.53926 | 0.250 | | | |
| 17 | 27.63615 | 9.109 | 1.59522 | 67.73 | 0.54426 |
| 18 | −134.79322 | 1.550 | 1.85370 | 22.31 | 0.62213 |
| 19 | 18.23355 | 5.500 | | | |
| 20(St) | ∞ | 5.487 | | | |
| 21 | −18.30655 | 1.500 | 1.63029 | 39.17 | 0.57925 |
| 22 | −48.92302 | 5.529 | 1.48984 | 65.39 | 0.53509 |
| 23 | −24.64229 | 0.100 | | | |
| *24 | 56.89240 | 6.000 | 1.79341 | 48.66 | 0.55129 |
| *25 | −36.65031 | DD[25] | | | |
| 26 | ∞ | 2.850 | 1.51680 | 64.20 | 0.53430 |
| 27 | ∞ | 1.000 | | | |

TABLE 51

Example 14

| f | 29.079 |
|---|---|
| FNo. | 1.03 |
| 2ωmax | 53.2 |

TABLE 52

Example 14

| | Infinity | 0.3 m |
|---|---|---|
| DD[14] | 6.500 | 1.921 |
| DD[25] | 16.342 | 20.921 |

TABLE 53

Example 14

| Sn | 24 | 25 |
|---|---|---|
| KA | 1.0000000E+00 | 1.0000000E+00 |
| A4 | −1.6809135E−06 | 8.5774318E−06 |
| A6 | −2.1517689E−07 | −2.0857403E−07 |
| A8 | 9.2942401E−09 | 6.7208947E−09 |
| A10 | −2.1073323E−10 | −1.2334691E−10 |
| A12 | 2.8305897E−12 | 1.3706654E−12 |
| A14 | −2.3236997E−14 | −9.4138699E−15 |
| A16 | 1.1475262E−16 | 3.9270429E−17 |
| A18 | −3.1366558E−19 | −9.1668061E−20 |
| A20 | 3.6536989E−22 | 9.2574233E−23 |

Example 15

Figure 43:
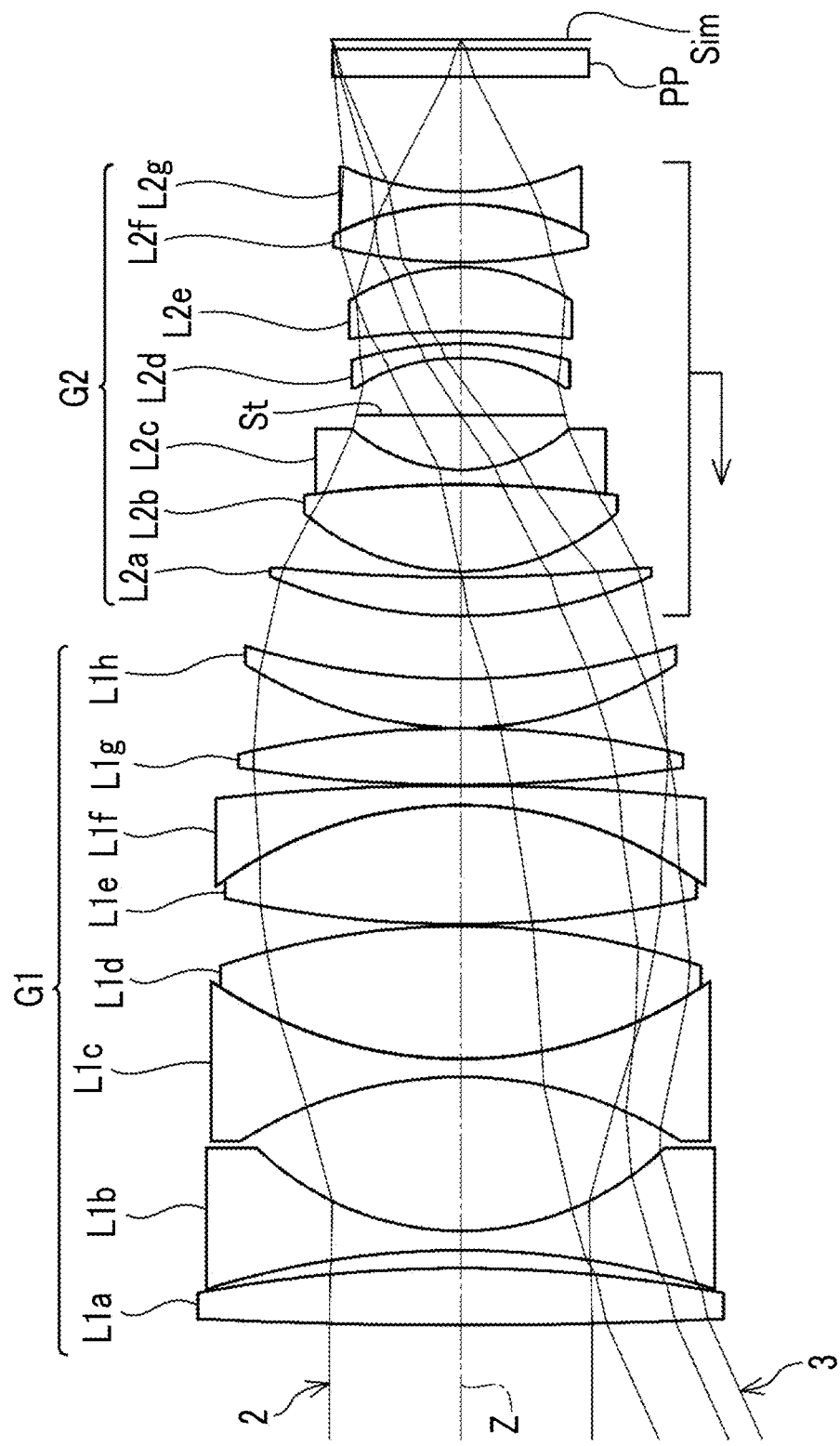
FIG. 43 is a cross-sectional view showing a configuration and rays of an imaging lens of Example 15.

FIG. 43 shows a cross-sectional configuration of the imaging lens of Example 15. The imaging lens of Example 15 consists of, in order from the object side, a first lens group G1 that has a positive refractive power, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of eight lenses L1a to L1h in order from the object side. The second lens group G2 consists of lenses L2a to L2c, an aperture stop St, and lenses L2d to L2g in order from the object side.

Figure 44:
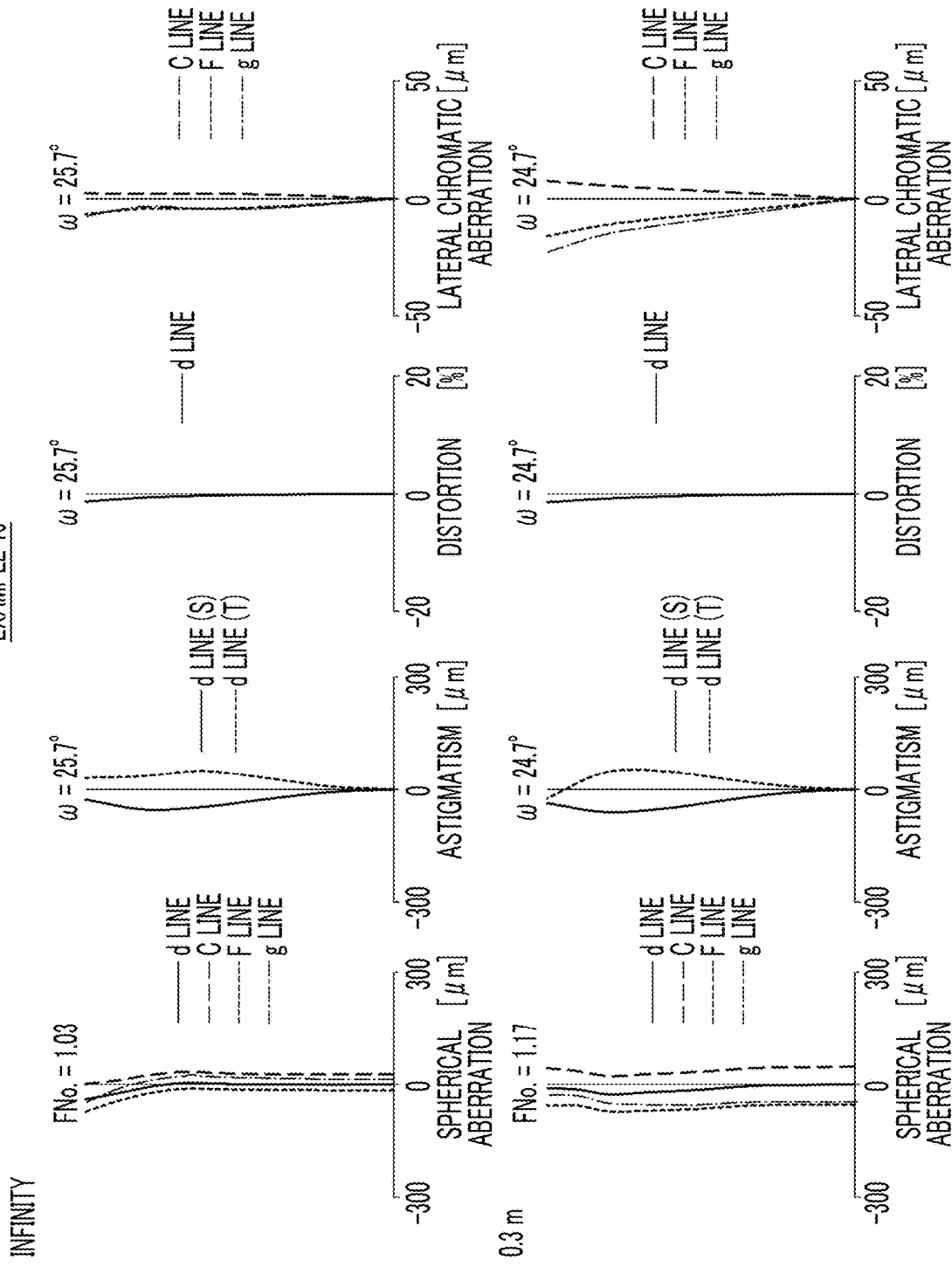
FIG. 44 shows spherical aberration diagrams, astigmatism diagrams, distortion diagrams, lateral chromatic aberration diagrams of the imaging lens of Example 15.
Figure 45:
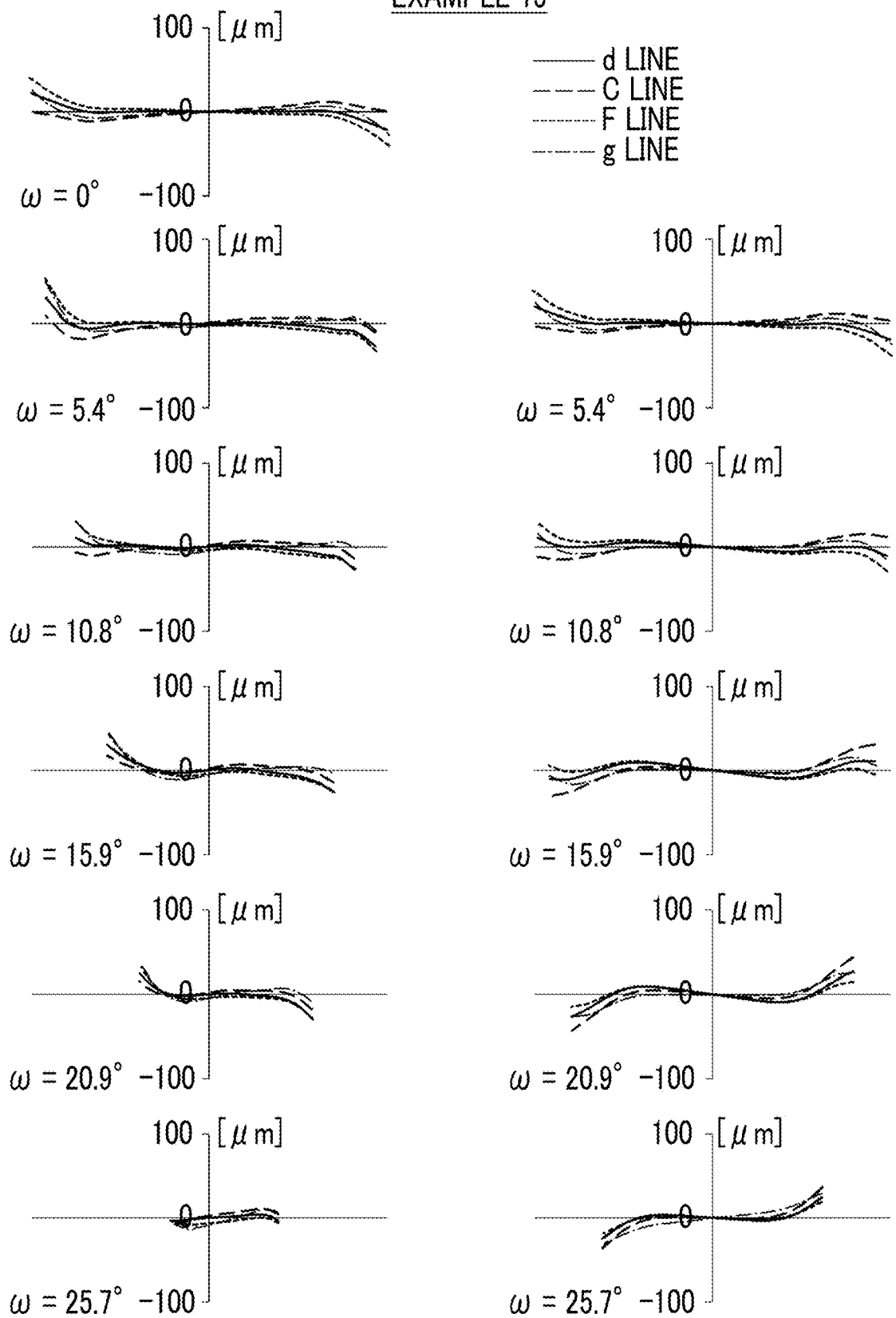
FIG. 45 shows lateral aberration diagrams of the imaging lens according to Example 15.

Regarding the imaging lens of Example 15, Table 54 shows basic lens data, Table 55 shows specification, Table 56 shows variable surface distances, Table 57 shows aspheric surface coefficients, and FIGS. 44 and 45 show aberration diagrams. In FIG. 44, the upper part shows aberration diagrams in a state where the object at infinity is in focus, and the lower part shows aberration diagrams in a state where the object at the distance of 0.3 m (meter) from the object to the image plane Sim is in focus. FIG. 45 shows lateral aberration diagram in a state where the object at infinity is in focus.

TABLE 54

Example 15

| Sn | R | D | Nd | vd | θgF |
|---|---|---|---|---|---|
| 1 | 642.95860 | 5.882 | 2.00001 | 16.89 | 0.64786 |
| 2 | −164.66697 | 1.863 | | | |
| 3 | −99.52183 | 2.000 | 1.61064 | 54.41 | 0.55296 |
| 4 | 33.83357 | 15.951 | | | |
| 5 | −47.68180 | 1.860 | 1.70668 | 31.21 | 0.59581 |
| 6 | 51.06375 | 13.761 | 1.98542 | 25.79 | 0.61339 |
| 7 | −87.22549 | 0.200 | | | |
| 8 | 126.67025 | 12.325 | 1.72259 | 55.37 | 0.54271 |
| 9 | −47.54495 | 2.020 | 1.97455 | 17.92 | 0.64243 |
| 10 | −275.27420 | 0.100 | | | |
| 11 | 171.98328 | 5.821 | 1.43875 | 94.66 | 0.53402 |
| 12 | −113.39789 | 0.010 | | | |
| 13 | 46.43027 | 5.041 | 1.59522 | 67.73 | 0.54426 |
| 14 | 84.61748 | DD[14] | | | |
| 15 | 55.77297 | 4.000 | 2.00000 | 15.00 | 0.65515 |
| 16 | 202.80478 | 0.605 | | | |
| 17 | 27.63715 | 8.988 | 1.58689 | 61.66 | 0.54186 |
| 18 | −134.09655 | 1.550 | 1.85789 | 22.11 | 0.62292 |
| 19 | 19.09448 | 5.638 | | | |
| 20(St) | ∞ | 5.927 | | | |
| *21 | −28.03700 | 1.500 | 1.89872 | 28.11 | 0.60520 |
| *22 | −44.46753 | 1.250 | | | |
| 23 | −96.25411 | 6.671 | 1.74032 | 53.97 | 0.54394 |
| 24 | −23.20962 | 0.500 | | | |
| 25 | 63.33337 | 6.000 | 1.90048 | 37.95 | 0.57345 |
| 26 | −32.84508 | 1.310 | 1.47999 | 58.75 | 0.54320 |
| 27 | 33.51612 | DD[27] | | | |
| 28 | ∞ | 2.850 | 1.51680 | 64.20 | 0.53430 |
| 29 | ∞ | 1.000 | | | |

TABLE 55

Example 15

| f | 29.906 |
|---|---|
| FNo. | 1.03 |
| 2ωmax | 51.4 |

TABLE 56

Example 15

| | Infinity | 0.3 m |
|---|---|---|
| DD[14] | 6.500 | 1.468 |
| DD[27] | 11.900 | 16.932 |

TABLE 57

Example 15

| Sn | 21 | 22 |
|---|---|---|
| KA | 1.0000000E+00 | 1.0000000E+00 |
| A4 | −5.0827829E−05 | −2.1426467E−05 |
| A6 | −1.1853379E−07 | −4.7548185E−08 |
| A8 | 9.4795512E−09 | 5.2403072E−09 |

TABLE 57-continued

Example 15

| Sn | 21 | 22 |
|---|---|---|
| A10 | −2.7750209E−10 | −1.0968658E−10 |
| A12 | 5.8490730E−12 | 2.0277440E−12 |
| A14 | −7.6027021E−14 | −2.5419242E−14 |
| A16 | 5.7225628E−16 | 1.8641103E−16 |
| A18 | −2.2972054E−18 | −7.2476475E−19 |
| A20 | 3.8030548E−21 | 1.1546366E−21 |

Example 16

Figure 46:
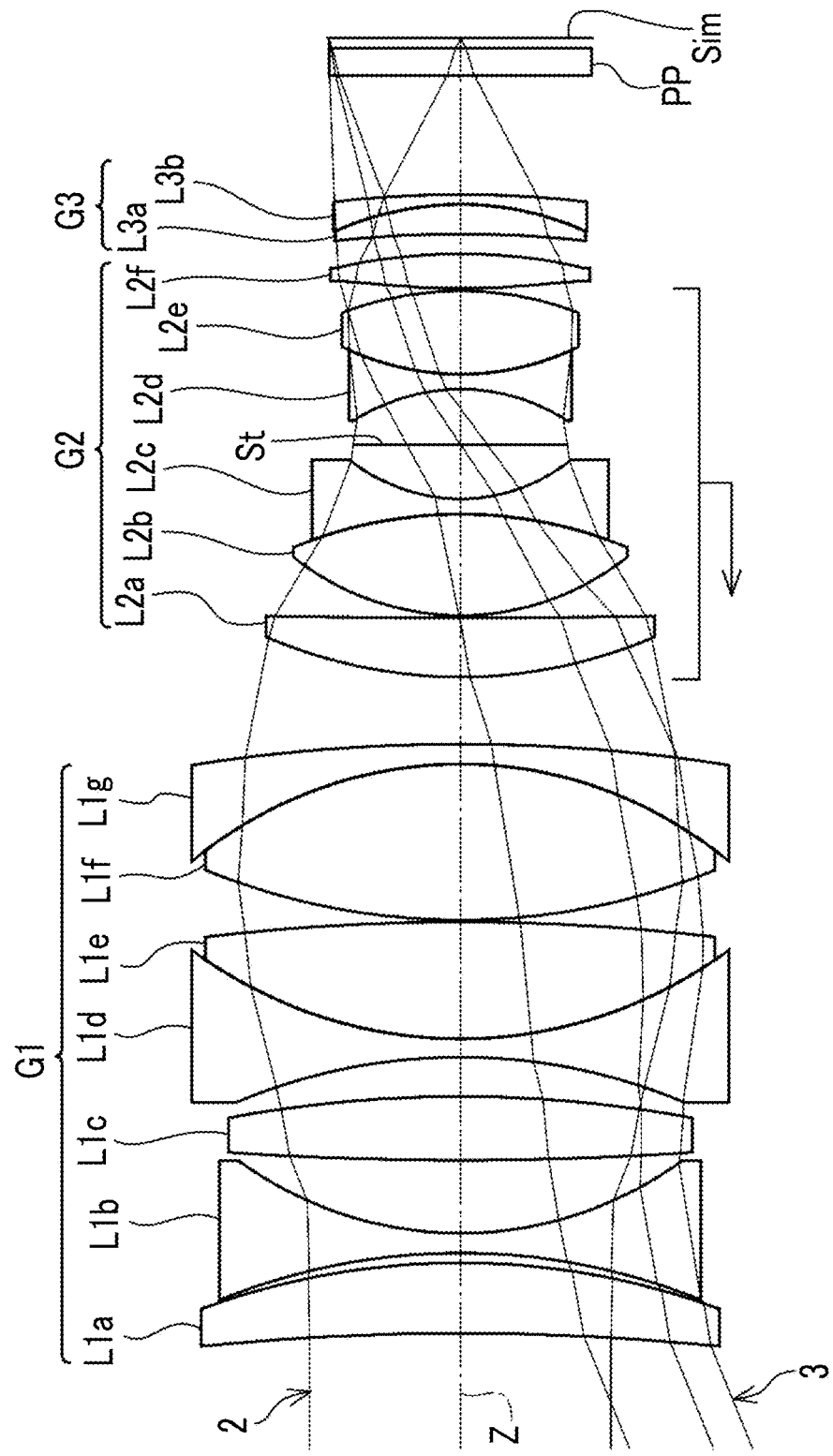
FIG. 46 is a cross-sectional view showing a configuration and rays of an imaging lens of Example 16.

FIG. 46 shows a cross-sectional configuration of the imaging lens of Example 16. The imaging lens of Example 16 consists of, in order from the object side, a first lens group G1 having a positive refractive power, a second lens group G2 having a positive refractive power, and a third lens group G3 having a negative refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of seven lenses L1a to L1g in order from the object side. The second lens group G2 consists of, in order from the object side, lenses L2a to L2c, an aperture stop St, and lenses L2d to L2f. The third lens group G3 consists of two lenses L3a and L3b in order from the object side.

Figure 47:
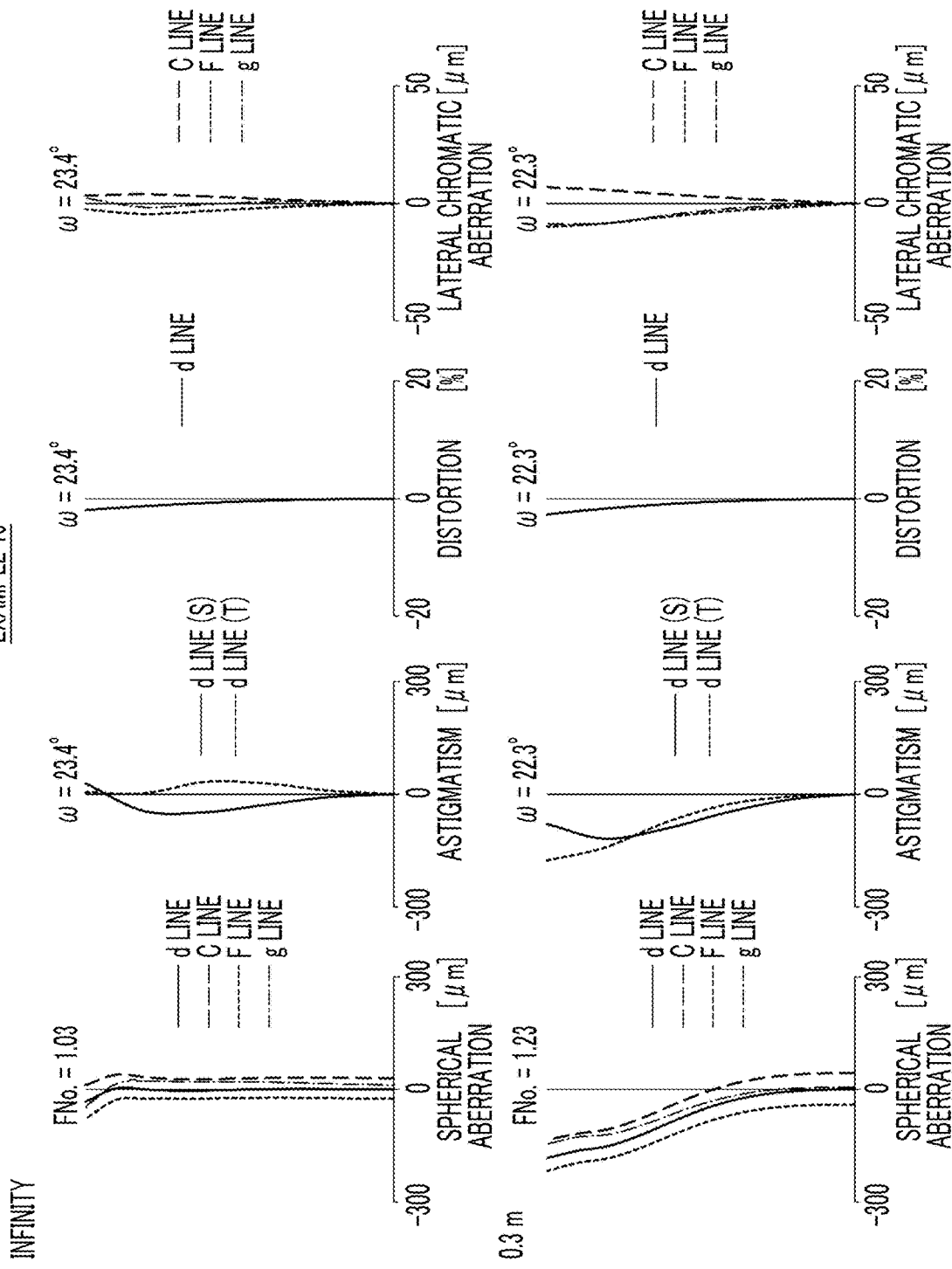
FIG. 47 shows spherical aberration diagrams, astigmatism diagrams, distortion diagrams, lateral chromatic aberration diagrams of the imaging lens of Example 16.
Figure 48:
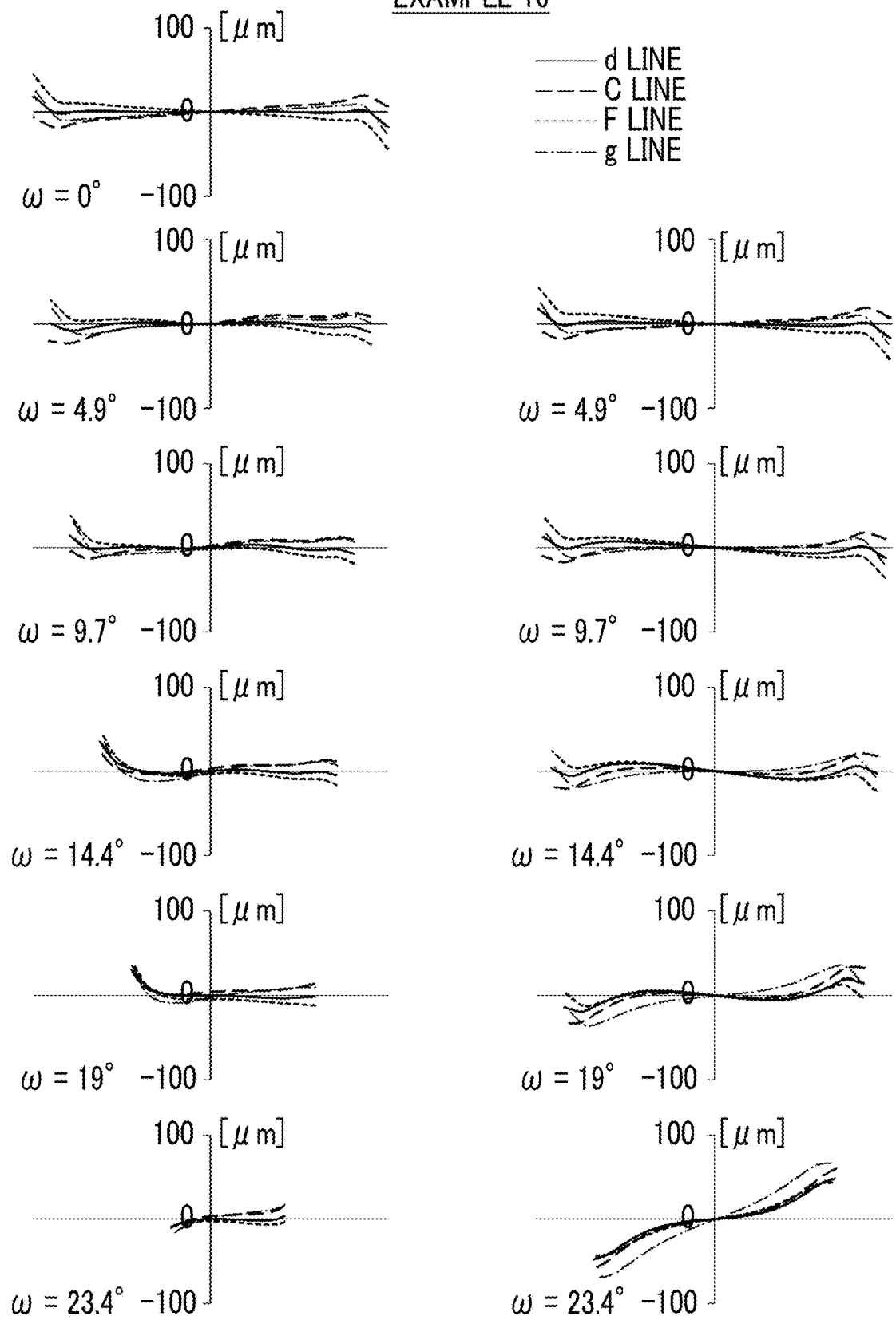
FIG. 48 shows lateral aberration diagrams of the imaging lens according to Example 16.

Regarding the imaging lens of Example 16, Table 58 shows basic lens data, Table 59 shows specification, Table 60 shows variable surface distances, Table 61 shows aspheric surface coefficients, and FIGS. 47 and 48 show aberration diagrams. In FIG. 47, the upper part shows aberration diagrams in a state where the object at infinity is in focus, and the lower part shows aberration diagrams in a state where the object at the distance of 0.3 m (meter) from the object to the image plane Sim is in focus. FIG. 48 shows lateral aberration diagram in a state where the object at infinity is in focus.

TABLE 58

Example 16

| Sn | R | D | Nd | vd | θgF |
|---|---|---|---|---|---|
| 1 | −297.13714 | 7.166 | 1.87070 | 40.73 | 0.56825 |
| 2 | −85.86719 | 1.000 | | | |
| 3 | −73.16221 | 2.000 | 1.74077 | 27.79 | 0.60961 |
| 4 | 42.66024 | 7.413 | | | |
| 5 | 392.24356 | 6.462 | 1.87070 | 40.73 | 0.56825 |
| 6 | −146.01920 | 4.000 | | | |
| 7 | −66.16556 | 1.860 | 1.72825 | 28.46 | 0.60772 |
| 8 | 51.18899 | 11.866 | 2.10420 | 17.02 | 0.66311 |
| 9 | −245.64485 | 0.200 | | | |
| 10 | 77.22649 | 15.828 | 1.88300 | 40.80 | 0.56557 |
| 11 | −47.49919 | 2.020 | 1.98613 | 16.48 | 0.66558 |
| 12 | −198.94323 | DD[12] | | | |
| 13 | 55.79899 | 6.000 | 1.92286 | 20.88 | 0.63900 |
| 14 | 1076.94076 | 0.250 | | | |
| 15 | 30.39757 | 10.286 | 1.59410 | 60.47 | 0.55516 |
| 16 | −49.75521 | 1.550 | 1.92286 | 20.88 | 0.63900 |
| 17 | 20.04359 | 5.500 | | | |
| 18(St) | ∞ | 5.642 | | | |
| 19 | −22.24985 | 1.510 | 1.59270 | 35.31 | 0.59336 |
| 20 | 30.44450 | 8.452 | 1.90043 | 37.37 | 0.57668 |
| 21 | −37.69952 | 0.270 | | | |
| *22 | 87.14518 | 3.500 | 1.83481 | 42.72 | 0.56486 |
| *23 | −62.14252 | DD[23] | | | |

TABLE 58-continued

Example 16

| Sn | R | D | Nd | vd | θgF |
|---|---|---|---|---|---|
| 24 | −134.06447 | 3.010 | 1.64000 | 60.08 | 0.53704 |
| 25 | −34.88724 | 1.000 | 1.65412 | 39.68 | 0.57378 |
| 26 | −129.28425 | 12.064 | | | |
| 27 | ∞ | 2.850 | 1.51680 | 64.20 | 0.53430 |
| 28 | ∞ | 1.000 | | | |

TABLE 59

Example 16

| | |
|---|---|
| f | 33.489 |
| FNo. | 1.03 |
| 2ωmax | 46.8 |

TABLE 60

Example 16

| | Infinity | 0.3 m |
|---|---|---|
| DD[12] | 6.714 | 0.856 |
| DD[23] | 2.000 | 7.858 |

TABLE 61

Example 16

| Sn | 22 | 23 |
|---|---|---|
| KA | 1.0000000E+00 | 1.0000000E+00 |
| A4 | −5.8591082E−06 | 2.8872810E−06 |
| A6 | 8.0450854E−09 | −1.4218337E−08 |
| A8 | −1.8982768E−10 | 4.2017521E−11 |
| A10 | 6.8830323E−13 | −2.5968320E−13 |
| A12 | −2.8216339E−15 | −1.0662872E−15 |

Example 17

Figure 49:
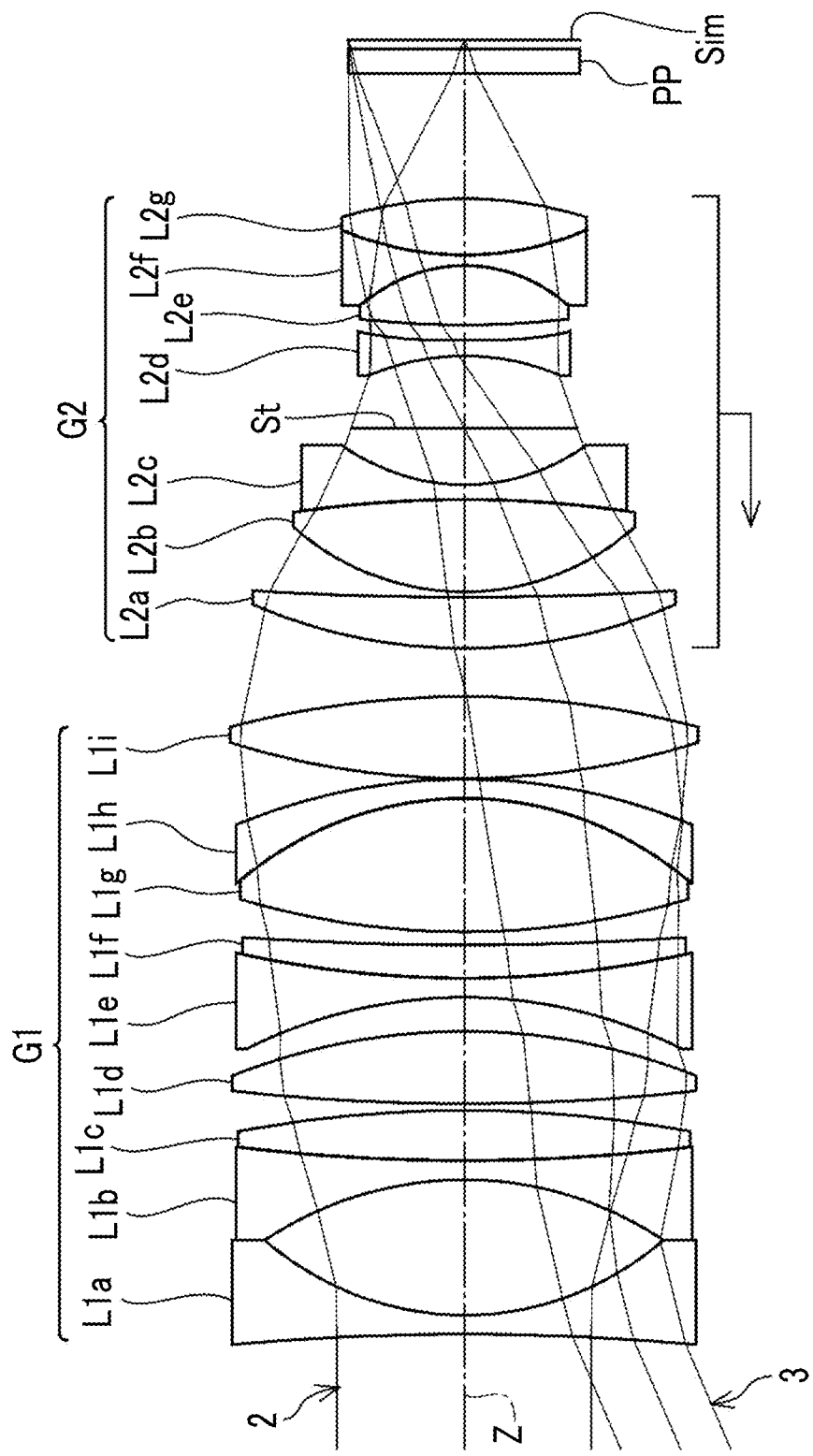
FIG. 49 is a cross-sectional view showing a configuration and rays of an imaging lens of Example 17.

FIG. 49 shows a cross-sectional configuration of the imaging lens of Example 17. The imaging lens of Example 17 consists of, in order from the object side, a first lens group G1 that has a positive refractive power, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of nine lenses L1a to L1i in order from the object side. The second lens group G2 consists of lenses L2a to L2c, an aperture stop St, and lenses L2d to L2g in order from the object side.

Figure 50:
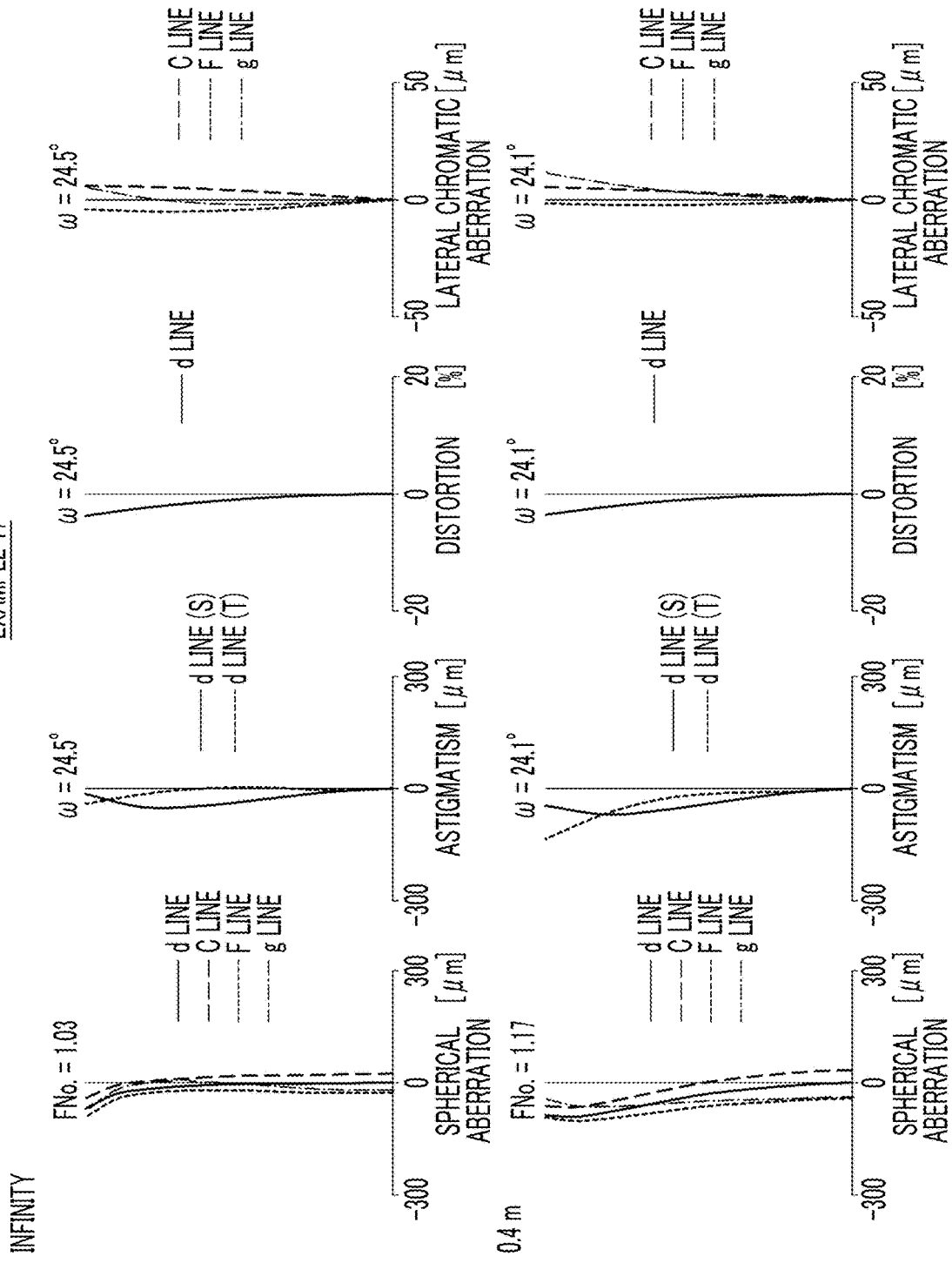
FIG. 50 shows spherical aberration diagrams, astigmatism diagrams, distortion diagrams, lateral chromatic aberration diagrams of the imaging lens of Example 17.
Figure 51:
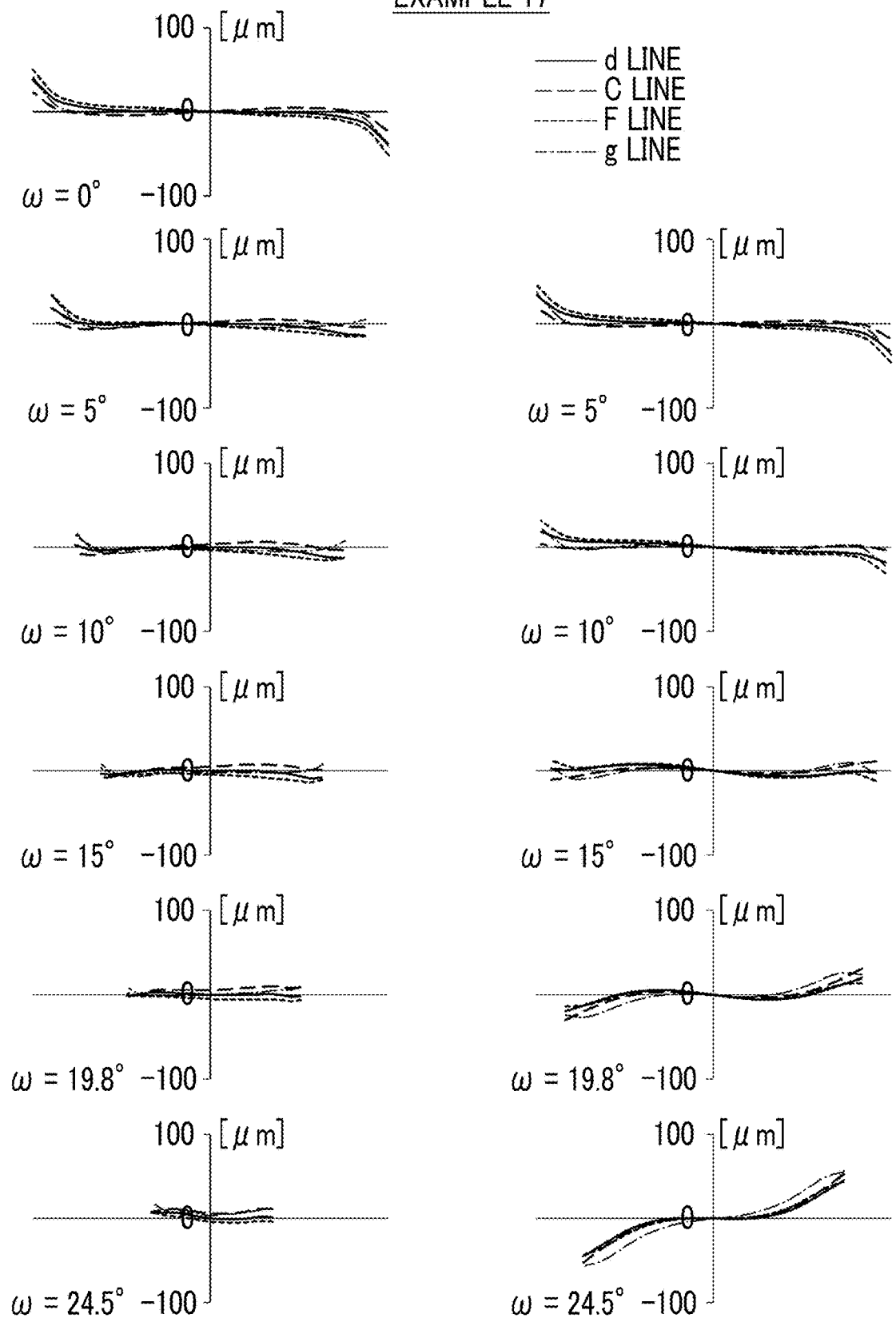
FIG. 51 shows lateral aberration diagrams of the imaging lens according to Example 17.

Regarding the imaging lens of Example 17, Table 62 shows basic lens data, Table 63 shows specification, Table 64 shows variable surface distances, Table 65 shows aspheric surface coefficients, and FIGS. 50 and 51 show aberration diagrams. In FIG. 50, the upper part shows aberration diagrams in a state where the object at infinity is in focus, and the lower part shows aberration diagrams in a state where the object at the distance of 0.4 m (meter) from the object to the image plane Sim is in focus. FIG. 51 shows lateral aberration diagram in a state where the object at infinity is in focus.

TABLE 62

Example 17

| Sn | R | D | Nd | vd | θgF |
|---|---|---|---|---|---|
| 1 | −336.27458 | 2.200 | 1.48749 | 70.24 | 0.53007 |
| 2 | 38.98761 | 15.631 | | | |
| 3 | −46.53554 | 2.210 | 1.59551 | 39.24 | 0.58043 |
| 4 | 249.77972 | 5.766 | 1.88300 | 39.22 | 0.57295 |
| 5 | −160.59902 | 0.800 | | | |
| 6 | 276.62948 | 8.350 | 2.00069 | 25.46 | 0.61364 |
| 7 | −81.36890 | 3.916 | | | |
| 8 | −63.06549 | 2.210 | 1.69895 | 30.13 | 0.60298 |
| 9 | 135.70322 | 3.841 | 1.88300 | 39.22 | 0.57295 |
| 10 | 422.33573 | 1.500 | | | |
| 11 | 102.34565 | 15.415 | 1.43875 | 94.66 | 0.53402 |
| 12 | −44.71698 | 2.200 | 1.85896 | 22.73 | 0.62844 |
| 13 | −77.19256 | 0.100 | | | |
| 14 | 101.83391 | 9.311 | 1.59282 | 68.62 | 0.54414 |
| 15 | −119.76934 | DD[15] | | | |
| 16 | 69.07462 | 5.899 | 1.95906 | 17.47 | 0.65993 |
| 17 | 449.86569 | 0.600 | | | |
| 18 | 33.09295 | 10.662 | 1.59282 | 68.62 | 0.54414 |
| 19 | −150.72672 | 1.700 | 1.85896 | 22.73 | 0.62844 |
| 20 | 26.86774 | 6.577 | | | |
| 21(St) | ∞ | 8.310 | | | |
| *22 | −28.92910 | 1.800 | 1.68948 | 31.02 | 0.59874 |
| *23 | 419.15250 | 1.784 | | | |
| 24 | 124.99078 | 6.834 | 1.88300 | 39.22 | 0.57295 |
| 25 | −19.93892 | 1.220 | 1.59270 | 35.31 | 0.59336 |
| 26 | 40.55156 | 6.493 | 1.87070 | 40.73 | 0.56825 |
| 27 | −53.64933 | DD[27] | | | |
| 28 | ∞ | 2.850 | 1.51680 | 64.20 | 0.53430 |
| 29 | ∞ | 1.000 | | | |

TABLE 63

Example 17

| | |
|---|---|
| f | 32.299 |
| FNo. | 1.03 |
| 2ωmax | 49.0 |

TABLE 64

Example 17

| | Infinity | 0.4 m |
|---|---|---|
| DD[15] | 5.583 | 1.508 |
| DD[27] | 14.463 | 18.538 |

TABLE 65

Example 17

| Sn | 22 | 23 |
|---|---|---|
| KA | 1.0000000E+00 | 1.0000000E+00 |
| A3 | 0.0000000E+00 | 0.0000000E+00 |
| A4 | 3.5406543E−05 | 4.9366505E−05 |
| A5 | 7.0264041E−06 | 7.9379491E−06 |
| A6 | −1.1816569E−06 | −1.4343119E−06 |
| A7 | −2.2756224E−07 | −2.0060437E−07 |
| A8 | 3.4450831E−08 | 4.3102131E−08 |
| A9 | 5.4529188E−09 | 3.4605387E−09 |
| A10 | −8.2702494E−10 | −9.3263727E−10 |
| A11 | −8.7833902E−11 | −3.7283303E−11 |
| A12 | 1.3514381E−11 | 1.3092859E−11 |
| A13 | 8.9890230E−13 | 2.4405774E−13 |
| A14 | −1.4076774E−13 | −1.1755255E−13 |
| A15 | −5.5890568E−15 | −9.1931741E−16 |
| A16 | 8.9135105E−16 | 6.5486383E−16 |
| A17 | 1.9220049E−17 | 1.7211209E−18 |

TABLE 65-continued

Example 17

| Sn | 22 | 23 |
|---|---|---|
| A18 | −3.1226127E−18 | −2.0673300E−18 |
| A19 | −2.7989666E−20 | −1.0111723E−21 |
| A20 | 4.6368363E−21 | 2.8305920E−21 |

Example 18

Figure 52:
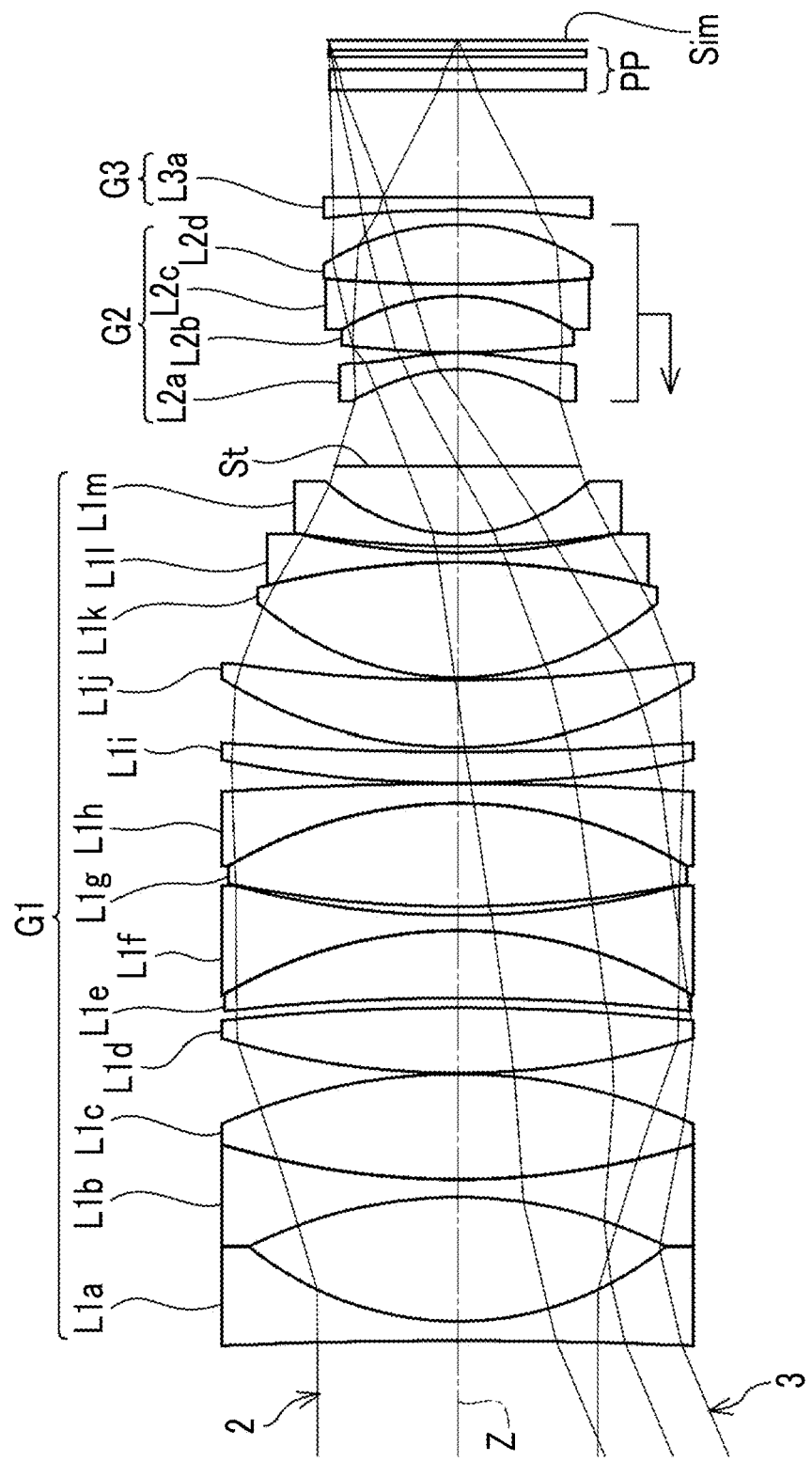
FIG. 52 is a cross-sectional view showing a configuration and rays of an imaging lens of Example 18.

FIG. 52 shows a cross-sectional configuration of the imaging lens of Example 18. The imaging lens of Example 18 consists of, in order from the object side, a first lens group G1 having a positive refractive power, an aperture stop St, a second lens group G2 having a positive refractive power, and a third lens group G3 having a negative refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of thirteen lenses L1a to L1m in order from the object side. The second lens group G2 consists of four lenses L2a to L2d in order from the object side. The third lens group G3 consists of one lens L3a.

Figure 53:
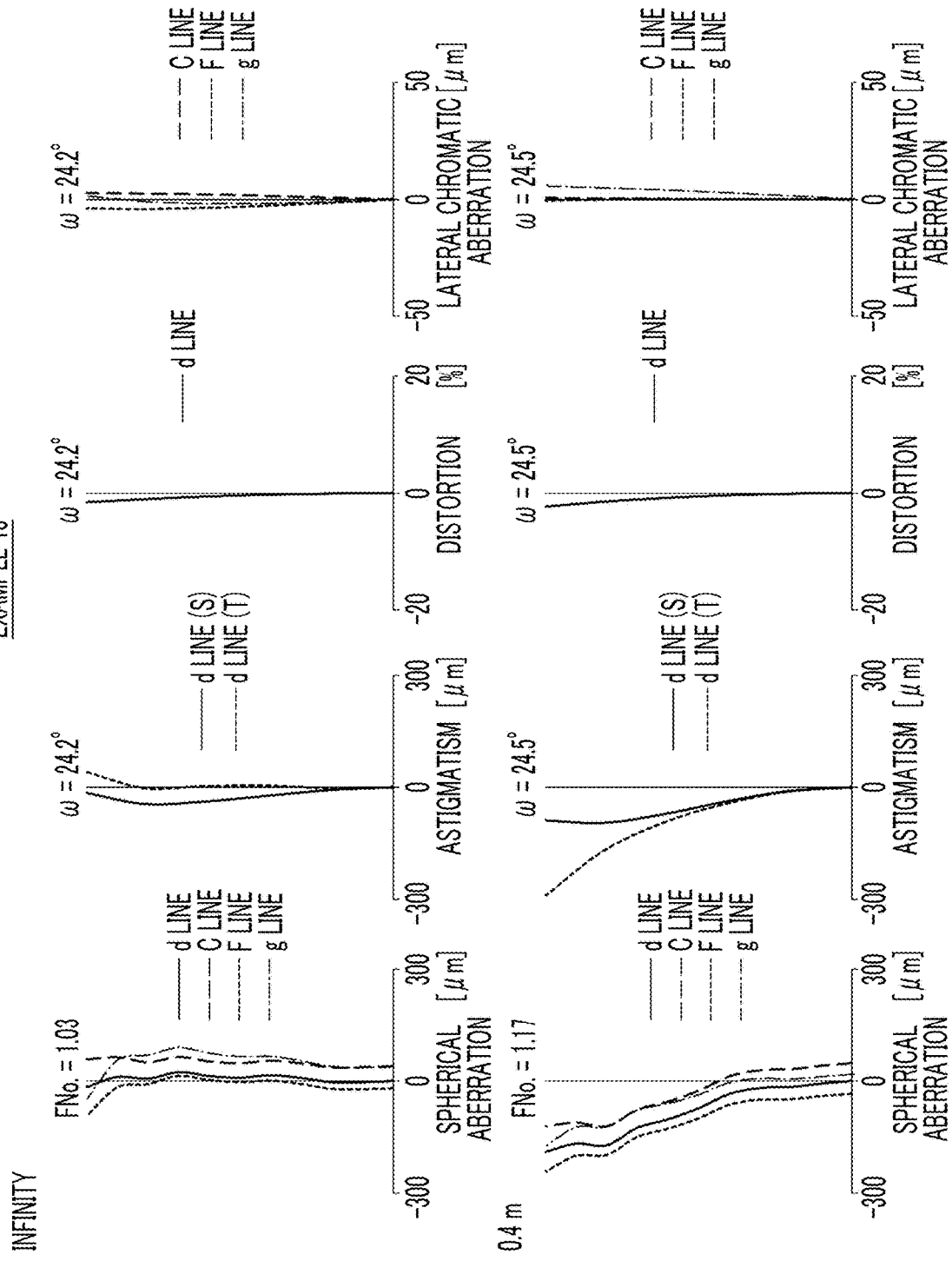
FIG. 53 shows spherical aberration diagrams, astigmatism diagrams, distortion diagrams, lateral chromatic aberration diagrams of the imaging lens of Example 18.
Figure 54:
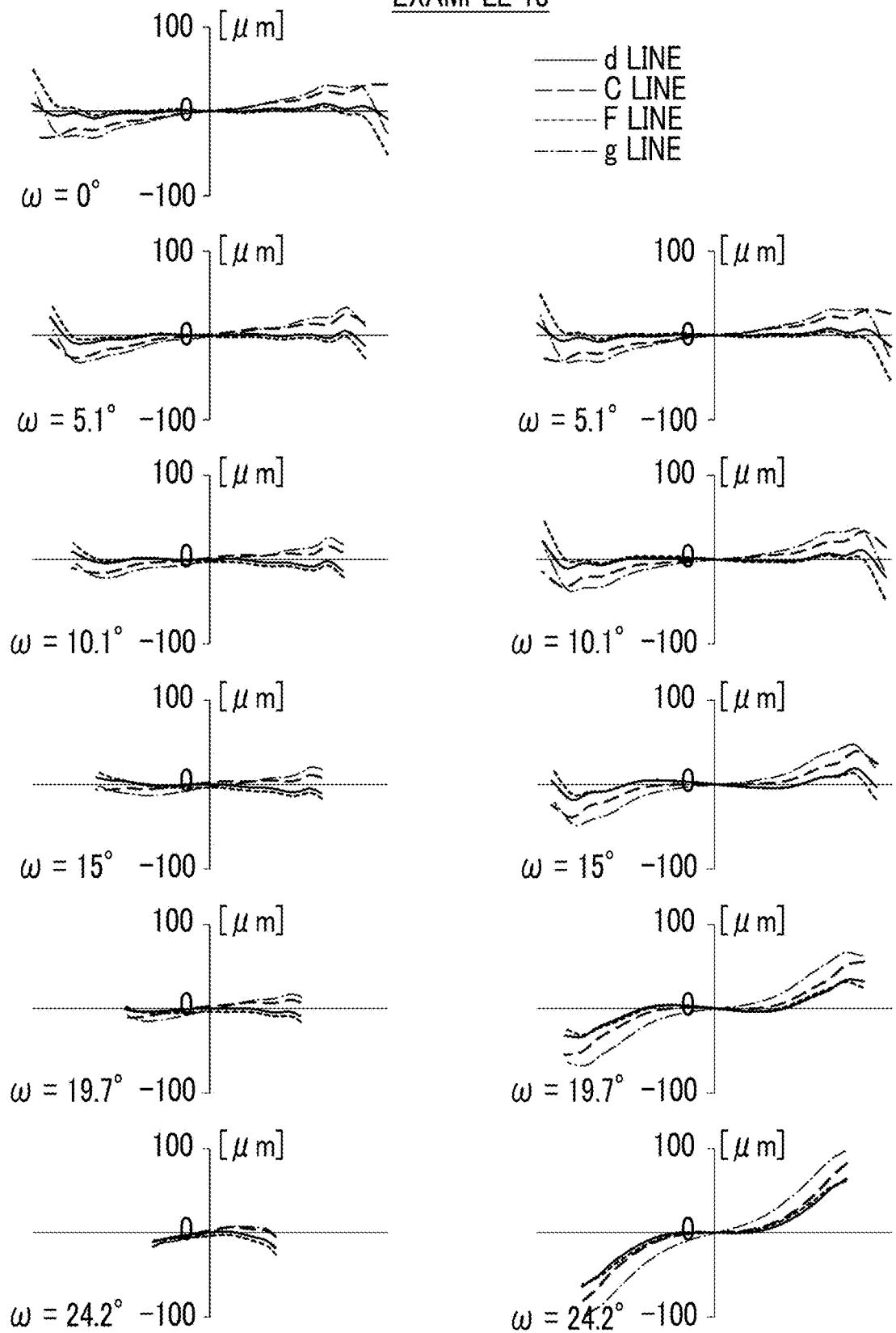
FIG. 54 shows lateral aberration diagrams of the imaging lens according to Example 18.

Regarding the imaging lens of Example 18, Table 66 shows basic lens data, Table 67 shows specification, Table 68 shows variable surface distances, Table 69 shows aspheric surface coefficients, and FIGS. 53 and 54 show aberration diagrams. In FIG. 53, the upper part shows aberration diagrams in a state where the object at infinity is in focus, and the lower part shows aberration diagrams in a state where the object at the distance of 0.4 m (meter) from the object to the image plane Sim is in focus. FIG. 54 shows lateral aberration diagram in a state where the object at infinity is in focus.

TABLE 66

Example 18

| Sn | R | D | Nd | vd | θgF |
|---|---|---|---|---|---|
| 1 | −633.25261 | 2.000 | 1.59551 | 39.24 | 0.58043 |
| 2 | 38.00665 | 12.863 | | | |
| 3 | −54.28519 | 1.850 | 1.80100 | 34.97 | 0.58642 |
| 4 | 95.00850 | 10.922 | 1.71300 | 53.87 | 0.54587 |
| 5 | −67.98194 | 0.100 | | | |
| 6 | 95.72298 | 6.765 | 2.00272 | 19.32 | 0.64514 |
| 7 | −251.63874 | 1.000 | | | |
| 8 | −246.42407 | 6.991 | 1.80100 | 34.97 | 0.58642 |
| 9 | −53.58723 | 1.610 | 1.69895 | 30.13 | 0.60298 |
| 10 | 99.80167 | 0.909 | | | |
| 11 | 137.54054 | 10.681 | 1.62041 | 60.29 | 0.54266 |
| 12 | −52.34651 | 2.010 | 1.60342 | 38.03 | 0.58356 |
| 13 | −414.75790 | 0.100 | | | |
| 14 | 143.20008 | 3.225 | 1.69680 | 55.53 | 0.54341 |
| 15 | 366.55185 | 0.462 | | | |
| 16 | 51.74239 | 6.881 | 1.91082 | 35.25 | 0.58224 |
| 17 | 180.97539 | 0.260 | | | |
| 18 | 35.24471 | 11.944 | 1.81600 | 46.62 | 0.55682 |
| 19 | −93.14313 | 1.010 | 1.72825 | 28.46 | 0.60772 |
| 20 | 79.60733 | 0.642 | | | |
| 21 | 118.00563 | 1.300 | 1.85896 | 22.73 | 0.62844 |
| 22 | 22.08603 | 7.000 | | | |
| 23(St) | ∞ | DD[23] | | | |
| *24 | −18.33819 | 1.700 | 1.68948 | 31.02 | 0.59874 |
| *25 | −31.12948 | 0.100 | | | |
| 26 | 111.28451 | 5.800 | 1.87070 | 40.73 | 0.56825 |
| 27 | −25.06585 | 1.220 | 1.69895 | 30.13 | 0.60298 |

TABLE 66-continued

Example 18

| Sn | R | D | Nd | vd | θgF |
|---|---|---|---|---|---|
| 28 | 182.89249 | 6.206 | 1.81600 | 46.62 | 0.55682 |
| 29 | −28.43888 | DD[29] | | | |
| 30 | −125.00563 | 1.300 | 1.51742 | 52.43 | 0.55649 |
| 31 | ∞ | 11.118 | | | |
| 32 | ∞ | 2.150 | 1.54763 | 54.98 | 0.55247 |
| 33 | ∞ | 1.317 | | | |
| 34 | ∞ | 0.700 | 1.49784 | 54.98 | 0.55000 |
| 35 | ∞ | 1.000 | | | |

TABLE 67

Example 18

| f | 32.025 |
|---|---|
| FNo. | 1.03 |
| 2ωmax | 48.4 |

TABLE 68

Example 18

| | Infinity | 0.4 m |
|---|---|---|
| DD[23] | 10.027 | 6.297 |
| DD[29] | 1.500 | 5.230 |

TABLE 69

Example 18

| Sn | 24 | 25 |
|---|---|---|
| KA | 1.0000000E+00 | 1.0000000E+00 |
| A4 | 7.6509788E−05 | 8.6420274E−05 |
| A6 | −1.2736248E−06 | −6.0388926E−07 |
| A8 | 5.0778640E−08 | 1.1474585E−08 |
| A10 | −1.3097284E−09 | −7.5854198E−11 |
| A12 | 2.0623870E−11 | −1.6331770E−12 |
| A14 | −2.0059301E−13 | 3.9524334E−14 |
| A16 | 1.1722812E−15 | −3.5644909E−16 |
| A18 | −3.7566167E−18 | 1.5341315E−18 |
| A20 | 5.0432936E−21 | −2.6183645E−21 |

Example 19

Figure 55:
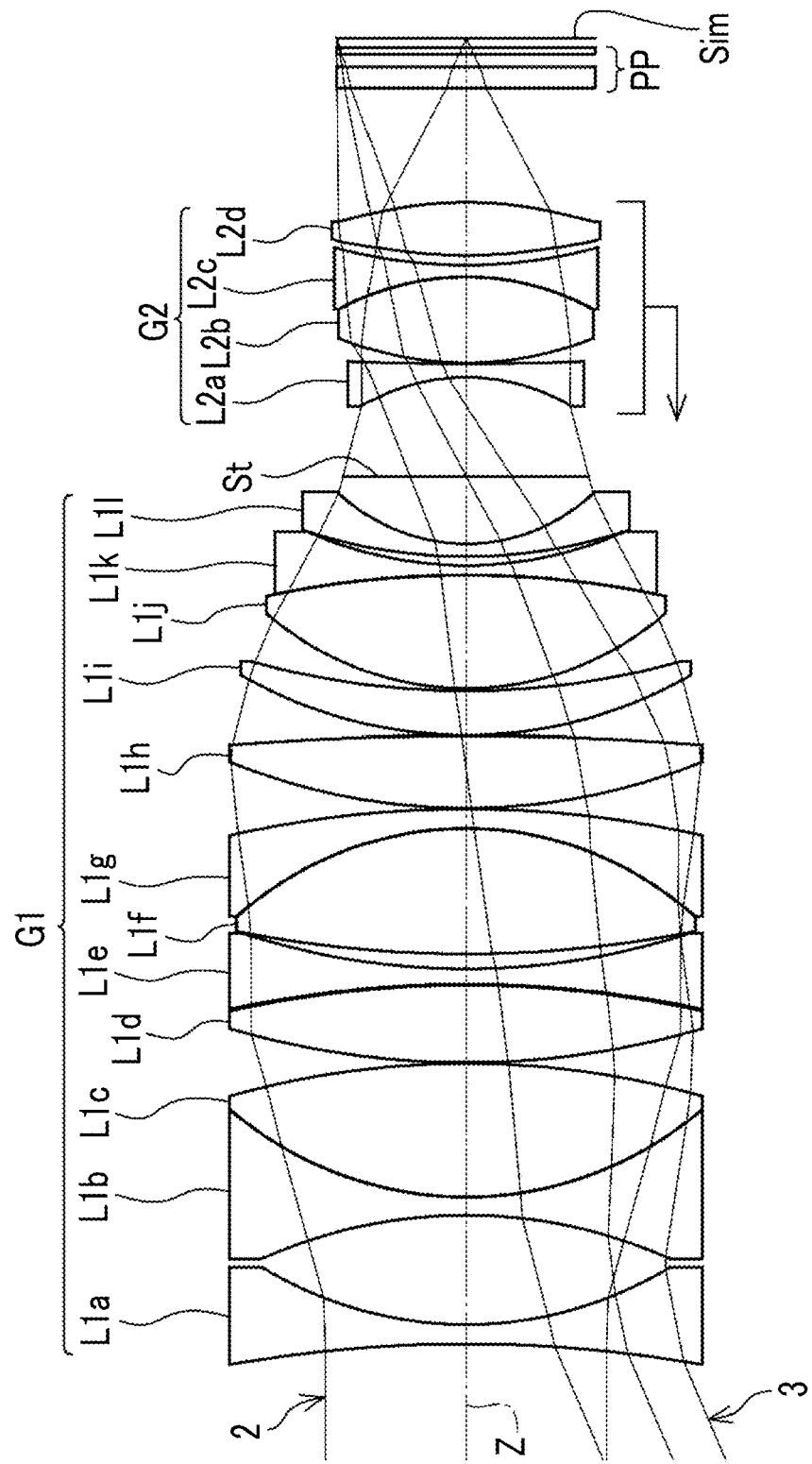
FIG. 55 is a cross-sectional view showing a configuration and rays of an imaging lens of Example 19.

FIG. 55 shows a cross-sectional configuration of the imaging lens of Example 19. The imaging lens of Example 19 consists of, in order from the object side, a first lens group G1 that has a positive refractive power, an aperture stop St, and a second lens group G2 that has a positive refractive power. During focusing from the object at infinity to the closest object, the first lens group G1 remains stationary with respect to the image plane Sim, and the second lens group G2 moves to the object side along the optical axis Z. The first lens group G1 consists of twelve lenses L1a to L1l in order from the object side. The second lens group G2 consists of four lenses L2a to L2d in order from the object side.

Figure 56:
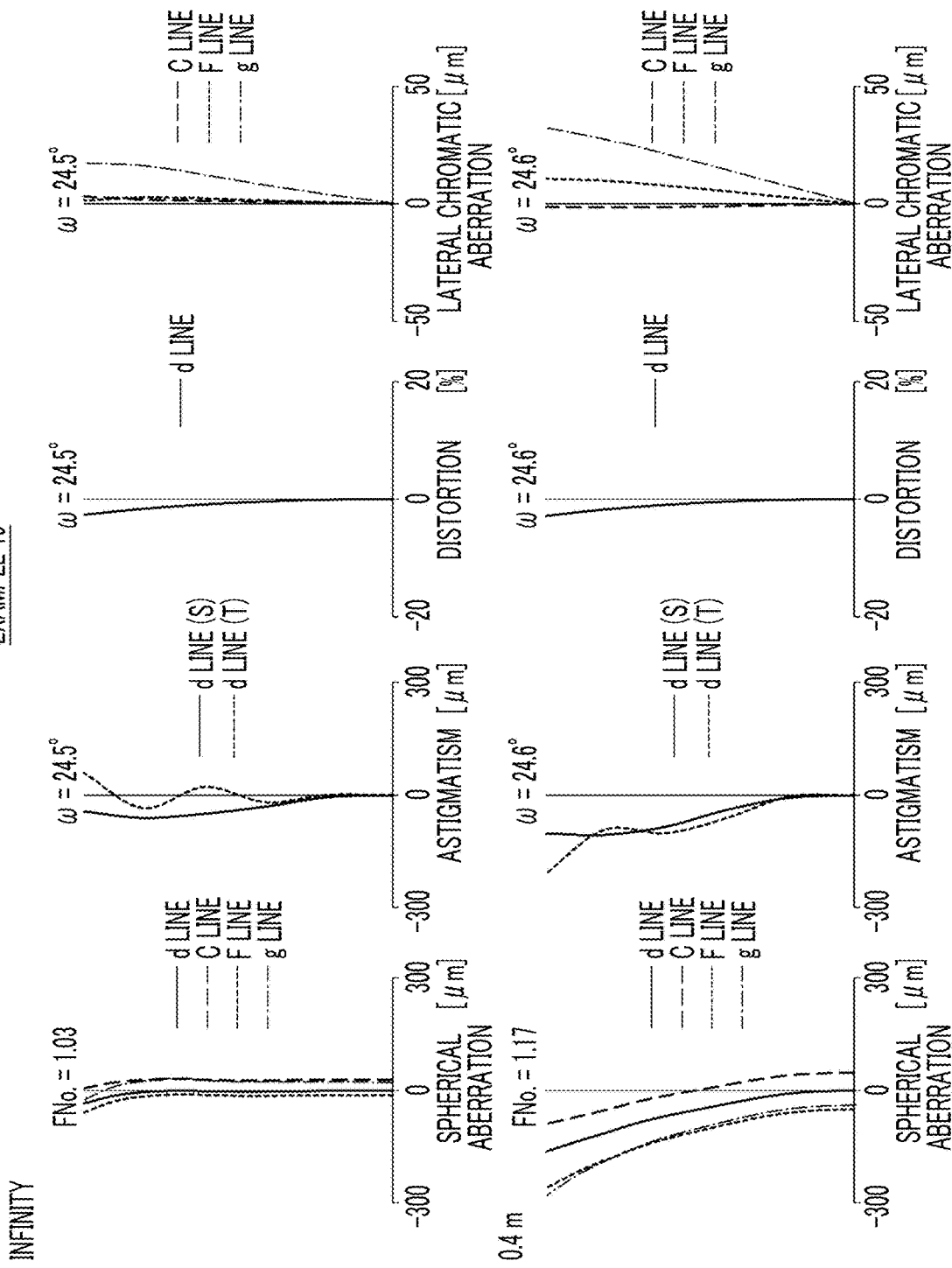
FIG. 56 shows spherical aberration diagrams, astigmatism diagrams, distortion diagrams, lateral chromatic aberration diagrams of the imaging lens of Example 19.
Figure 57:
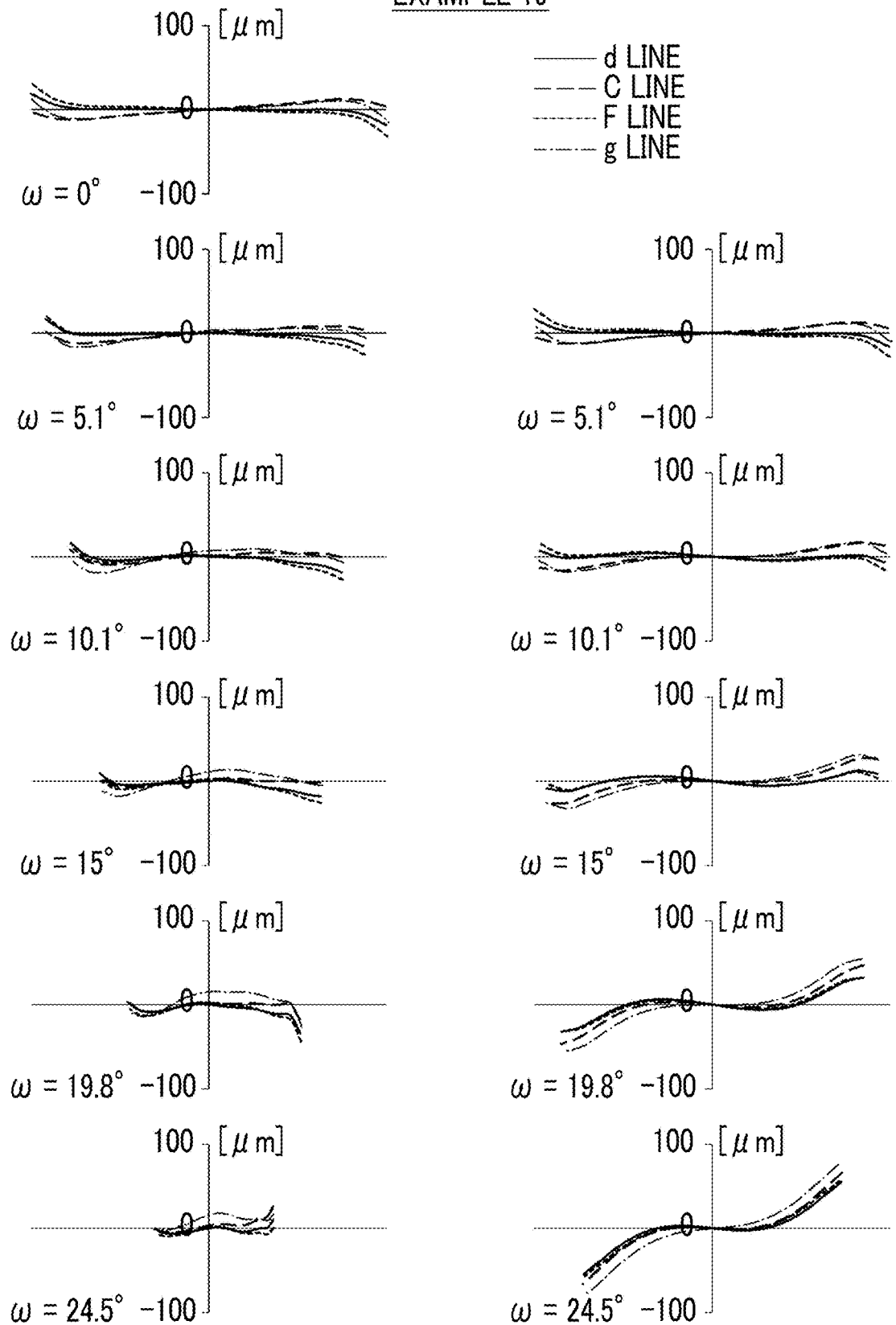
FIG. 57 shows lateral aberration diagrams of the imaging lens according to Example 19.

Regarding the imaging lens of Example 19, Table 70 shows basic lens data, Table 71 shows specification, Table 72 shows variable surface distances, Table 73 shows aspheric surface coefficients, and FIGS. 56 and 57 show aberration diagrams. In FIG. 56, the upper part shows aberration diagrams in a state where the object at infinity is in focus, and the lower part shows aberration diagrams in a state where the object at the distance of 0.4 m (meter) from the object to the image plane Sim is in focus. FIG. 57 shows lateral aberration diagram in a state where the object at infinity is in focus.

TABLE 70

Example 19

| Sn | R | D | Nd | vd | θgF |
|---|---|---|---|---|---|
| 1 | −158.58566 | 2.000 | 1.56926 | 62.34 | 0.54137 |
| 2 | 45.50663 | 11.311 | | | |
| 3 | −58.28419 | 1.860 | 1.82401 | 23.80 | 0.61679 |
| 4 | 41.90339 | 13.828 | 1.88018 | 21.34 | 0.62618 |
| 5 | −101.81510 | 0.100 | | | |
| 6 | 98.28394 | 8.000 | 1.99999 | 15.00 | 0.65515 |
| 7 | −127.35841 | 0.100 | | | |
| 8 | −132.35649 | 1.600 | 1.85117 | 22.44 | 0.62166 |
| 9 | 84.30253 | 1.535 | | | |
| 10 | 137.70215 | 12.985 | 1.66628 | 58.19 | 0.54256 |
| 11 | −39.49589 | 2.000 | 1.86788 | 21.61 | 0.62483 |
| 12 | −124.45426 | 0.100 | | | |
| 13 | 73.44245 | 7.449 | 1.82042 | 45.96 | 0.55588 |
| 14 | −358.81915 | 0.000 | | | |
| 15 | 52.60700 | 4.584 | 1.71060 | 55.97 | 0.54269 |
| 16 | 93.76319 | 0.250 | | | |
| 17 | 35.01559 | 11.718 | 1.81600 | 46.62 | 0.55682 |
| 18 | −112.02490 | 1.000 | 1.83429 | 23.29 | 0.61859 |
| 19 | 45.38534 | 0.919 | | | |
| 20 | 60.40304 | 1.300 | 1.80688 | 24.66 | 0.61389 |
| 21 | 21.37711 | 7.000 | | | |
| 22(St) | ∞ | DD[22] | | | |
| 23 | −24.07079 | 1.400 | 1.48001 | 58.75 | 0.54321 |
| 24 | 352.80309 | 0.100 | | | |
| 25 | 39.97798 | 8.898 | 1.94001 | 31.43 | 0.59353 |
| 26 | −30.93442 | 1.210 | 1.76519 | 26.74 | 0.60732 |
| 27 | 59.03069 | 1.000 | | | |
| *28 | 53.18296 | 5.500 | 1.80610 | 40.73 | 0.56940 |
| *29 | −44.23856 | DD[29] | | | |
| 30 | ∞ | 2.150 | 1.54763 | 54.98 | 0.55247 |
| 31 | ∞ | 1.320 | | | |
| 32 | ∞ | 0.700 | 1.49784 | 54.98 | 0.55000 |
| 33 | ∞ | 1.000 | | | |

TABLE 71

Example 19

| f | 32.017 |
|---|---|
| FNo. | 1.03 |
| 2ωmax | 49.0 |

TABLE 72

Example 19

| | Infinity | 0.4 m |
|---|---|---|
| DD[22] | 10.229 | 5.964 |
| DD[29] | 11.831 | 16.096 |

TABLE 73

Example 19

| Sn | 28 | 29 |
|---|---|---|
| KA | 1.0000000E+00 | 1.0000000E+00 |
| A4 | −1.0078045E−05 | 8.8298530E−06 |
| A6 | −3.5300117E−08 | −1.8081425E−07 |
| A8 | −8.3277198E−10 | 5.3397794E−09 |

TABLE 73-continued

Example 19

| Sn | 28 | 29 |
|---|---|---|
| A10 | 4.3699816E−11 | −9.6079166E−11 |
| A12 | −7.6172757E−13 | 1.0902419E−12 |
| A14 | 6.9072493E−15 | −7.9169687E−15 |
| A16 | −3.4626193E−17 | 3.6005727E−17 |
| A18 | 9.0691746E−20 | −9.3635343E−20 |
| A20 | −9.6047967E−23 | 1.0660537E−22 |

Example 20

Figure 58:
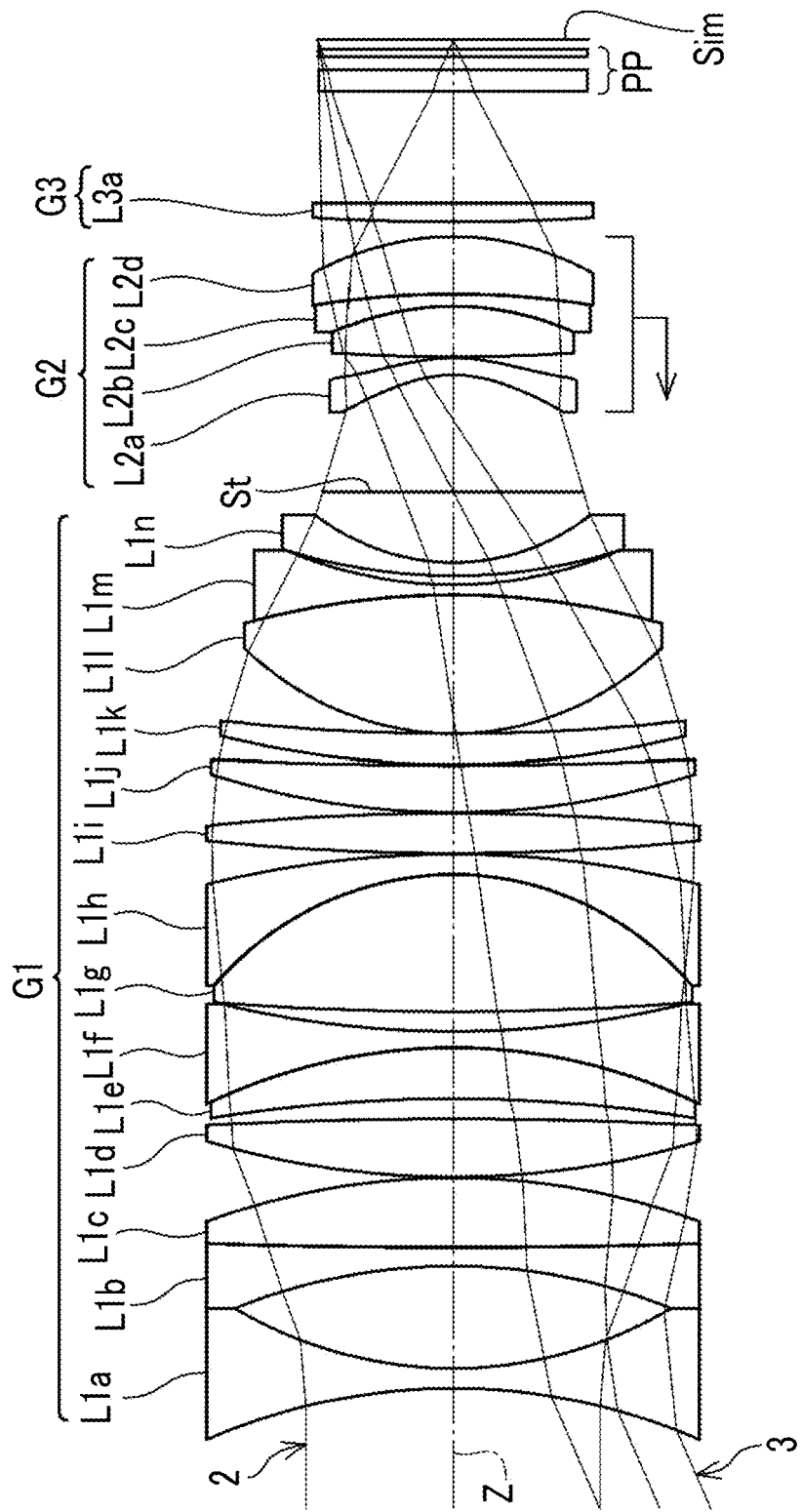
FIG. 58 is a cross-sectional view showing a configuration and rays of an imaging lens of Example 20.

FIG. 58 shows a cross-sectional configuration of the imaging lens of Example 20. The imaging lens of Example 20 consists of, in order from the object side, a first lens group G1 that has a positive refractive power, an aperture stop St, a second lens group G2 that has a positive refractive power, and a third lens group G3 that has a positive refractive power. During focusing from the object at infinity to the closest object, the first lens group G1 and the third lens group G3 remain stationary with respect to the image plane Sim, and the second lens group G2 moves to the object side along the optical axis Z. The first lens group G1 consists of fourteen lenses L1a to L1n in order from the object side. The second lens group G2 consists of four lenses L2a to L2d in order from the object side. The third lens group G3 consists of one lens L3a.

Figure 59:
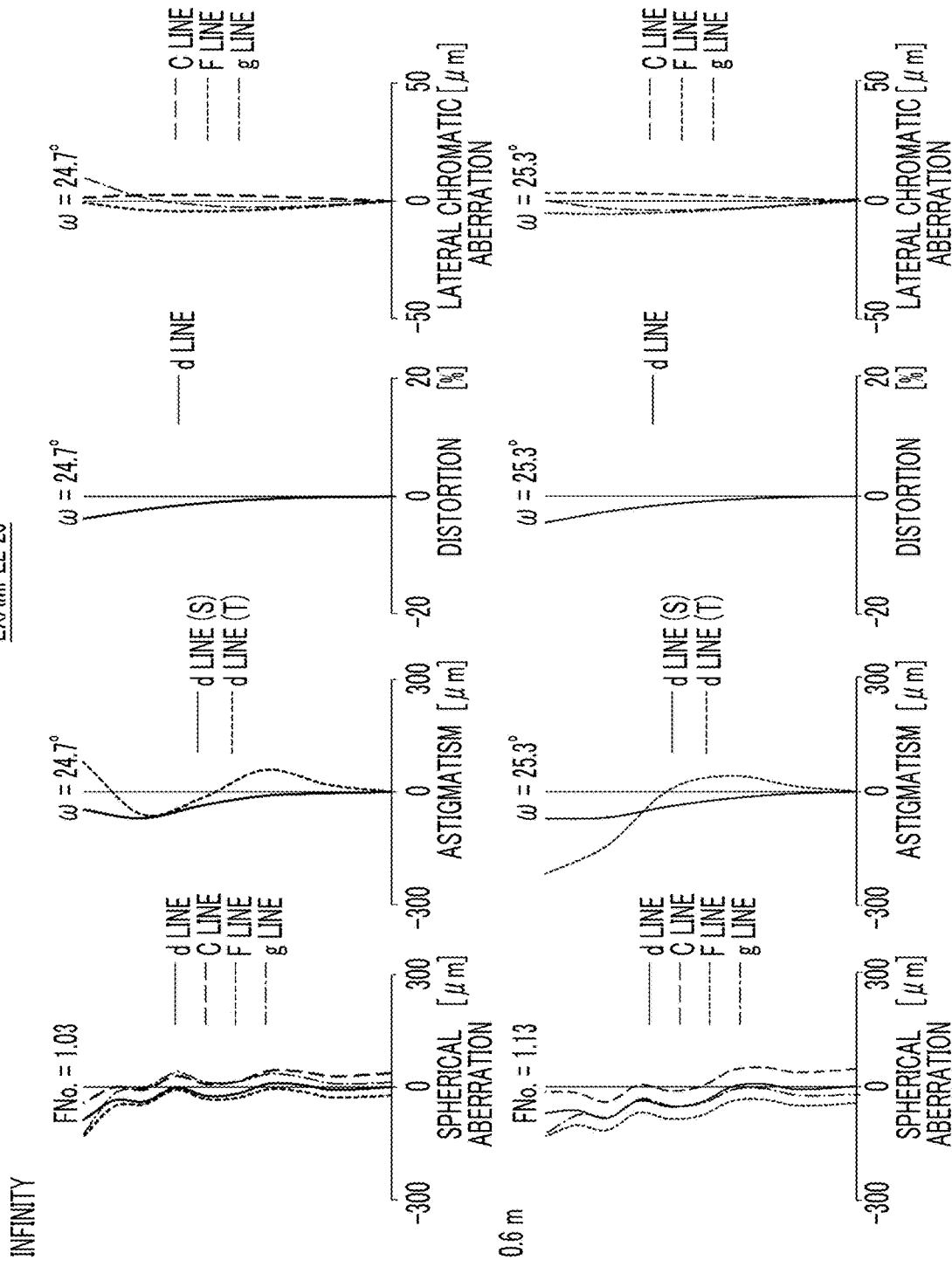
FIG. 59 shows spherical aberration diagrams, astigmatism diagrams, distortion diagrams, lateral chromatic aberration diagrams of the imaging lens of Example 20.
Figure 60:
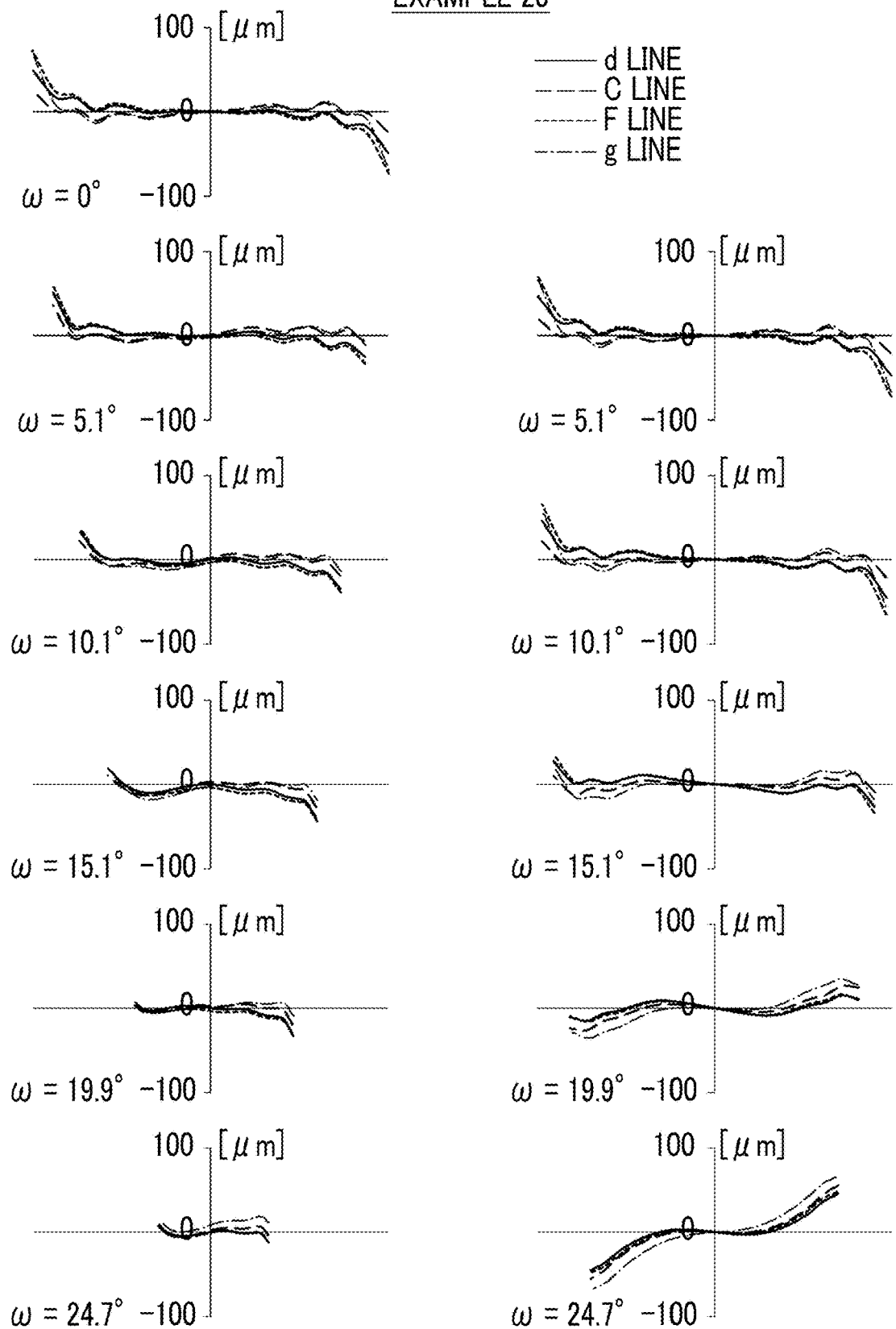
FIG. 60 shows lateral aberration diagrams of the imaging lens according to Example 20.

Regarding the imaging lens of Example 20, Table 74 shows basic lens data, Table 75 shows specification, Table 76 shows variable surface distances, Table 77 shows aspheric surface coefficients, and FIGS. 59 and 60 show aberration diagrams. In FIG. 59, the upper part shows aberration diagrams in a state where the object at infinity is in focus, and the lower part shows aberration diagrams in a state where the object at the distance of 0.6 m (meter) from the object to the image plane Sim is in focus. FIG. 60 shows lateral aberration diagram in a state where the object at infinity is in focus.

TABLE 74

Example 20

| Sn | R | D | Nd | vd | θgF |
|---|---|---|---|---|---|
| 1 | −69.40351 | 2.000 | 1.58913 | 61.13 | 0.54067 |
| 2 | 47.39750 | 10.135 | | | |
| 3 | −65.36696 | 1.860 | 1.85896 | 22.73 | 0.62844 |
| 4 | 898.20220 | 6.892 | 1.88300 | 39.22 | 0.57295 |
| 5 | −80.44512 | 0.100 | | | |
| 6 | 97.48909 | 5.741 | 1.98613 | 16.48 | 0.66558 |
| 7 | −546.89782 | 2.000 | | | |
| 8 | −171.12562 | 5.073 | 1.88300 | 39.22 | 0.57295 |
| 9 | −63.25974 | 1.610 | 1.60342 | 38.03 | 0.58356 |
| 10 | 111.43989 | 1.962 | | | |
| 11 | 341.07330 | 13.611 | 1.62041 | 60.29 | 0.54266 |
| 12 | −34.36799 | 2.010 | 1.59270 | 35.31 | 0.59336 |
| 13 | −113.99006 | 0.100 | | | |
| 14 | 276.49914 | 3.956 | 1.59282 | 68.62 | 0.54414 |
| 15 | −272.14204 | 0.100 | | | |
| 16 | 88.96039 | 4.616 | 1.59282 | 68.62 | 0.54414 |
| 17 | 546.58221 | 0.100 | | | |
| 18 | 109.73550 | 3.000 | 1.63854 | 55.38 | 0.54858 |
| 19 | 235.51602 | 0.000 | | | |
| 20 | 32.76798 | 13.753 | 1.75500 | 52.32 | 0.54737 |
| 21 | −86.78027 | 1.010 | 1.74000 | 28.30 | 0.60790 |
| 22 | 46.97326 | 0.897 | | | |
| 23 | 62.86769 | 1.300 | 1.80518 | 25.42 | 0.61616 |
| 24 | 24.63660 | 7.000 | | | |

TABLE 74-continued

Example 20

| Sn | R | D | Nd | vd | θgF |
|---|---|---|---|---|---|
| 25(St) | ∞ | DD[25] | | | |
| *26 | −14.19913 | 1.700 | 1.68948 | 31.02 | 0.59874 |
| *27 | −19.92300 | 0.100 | | | |
| 30 | 217.66762 | 5.000 | 1.87070 | 40.73 | 0.56825 |
| 30 | −32.97025 | 1.220 | 1.69895 | 30.13 | 0.60298 |
| 30 | −98.98873 | 5.691 | 1.88300 | 39.22 | 0.57295 |
| 31 | −31.65160 | DD[31] | | | |
| 32 | 300.00000 | 1.800 | 1.48749 | 70.24 | 0.53007 |
| 33 | ∞ | 11.121 | | | |
| 34 | ∞ | 2.150 | 1.54763 | 54.98 | 0.55247 |
| 35 | ∞ | 1.315 | | | |
| 36 | ∞ | 0.700 | 1.49784 | 54.98 | 0.55000 |
| 37 | ∞ | 1.000 | | | |

TABLE 75

Example 20

| | |
|---|---|
| f | 32.027 |
| FNo. | 1.03 |
| 2ωmax | 49.4 |

TABLE 76

Example 20

| | Infinity | 0.6 m |
|---|---|---|
| DD[25] | 11.613 | 8.481 |
| DD[31] | 1.500 | 4.632 |

TABLE 77

Example 20

| Sn | 26 | 27 |
|---|---|---|
| KA | 1.0000000E+00 | 1.0000000E+00 |
| A4 | 1.6825325E−04 | 1.4660302E−04 |
| A6 | −2.4177276E−06 | −1.2134963E−06 |
| A8 | 9.3324700E−08 | 1.6766078E−08 |
| A10 | −2.2900676E−09 | 1.0718903E−10 |
| A12 | 3.4816388E−11 | −8.2761040E−12 |
| A14 | −3.2819139E−13 | 1.3329649E−13 |
| A16 | 1.8701820E−15 | −1.0468186E−15 |
| A18 | −5.8954769E−18 | 4.1491271E−18 |
| A20 | 7.8960041E−21 | −6.6428045E−21 |

Tables 78 to 82 show values corresponding to Conditional Expressions (1) to (19) of the imaging lenses of Examples 1 to 20. In the example including a plurality of LA positive lenses LA, values are shown for all LA positive lenses LA. In Examples 1 to 20, the d line is set as the reference wavelength. Tables 78 to 82 show the values based on the d line. $\Delta\theta gFA$, $\Delta\theta gFB$, and $\Delta\theta gFn1$ in Tables 78 to 82 represent the following values, respectively.

$$\Delta\theta gFA = \theta gFA + 0.00162 \times vdA - 0.64159$$

$$\Delta\theta gFB = \theta gFB + 0.00162 \times vdB - 0.64159$$

$$\Delta\theta gFn1 = \theta gFn1 + 0.00162 \times vdn1 - 0.64159$$

TABLE 78

| Expression Number | | Example 1 | Example 2 | Example 3 | Example 4 |
|---|---|---|---|---|---|
| (1) | NdA | 2.00272 | 1.92286 | 1.95906 | 1.98613 |
| (2) | vdA | 19.32 | 20.88 | 17.47 | 16.48 |
| (3) | vdB | 90.19 | 81.61 | 68.62 | 68.62 |
| (4) | vdn1 | 19.61 | 18.42 | 21.56 | 21.55 |
| (5) | $TL \times FNo/f$ | 2.246 | 2.417 | 2.293 | 2.225 |
| (6) | vdC | 68.62 | 81.61 | 68.62 | 68.62 |
| (7) | Ndfm | 1.45860 | 1.49700 | 1.59282 | 1.59282 |
| (8) | Ndpr | 1.93784 | 2.00100 | 1.88300 | 1.88300 |
| (9) | Nd2p | 1.95375 | 2.00100 | 1.88300 | 1.88300 |
| (10) | f1/f | 2.568 | 2.372 | 2.311 | 2.184 |
| (11) | $1/\{\tan(\omega max) \times FNo\}$ | 3.555 | 3.375 | 3.448 | 3.330 |
| (12) | $|f2|/f$ | 0.795 | 0.721 | 0.705 | 0.699 |
| (13) | f1/f2 | 3.231 | 3.288 | 3.281 | 3.122 |
| (14) | $|(1-\beta 2^2) \times \beta r^2|$ | 0.692 | 0.822 | 0.813 | 0.790 |
| (15) | Tf/TL | 0.544 | 0.576 | 0.547 | 0.534 |
| (16) | f/fm | 0.859 | 0.803 | 0.872 | 0.825 |
| (17) | $\Delta\theta gFA$ | 0.03485 | 0.03124 | 0.04664 | 0.05069 |
| (18) | $\Delta\theta gFB$ | 0.03968 | 0.02949 | 0.01371 | 0.01371 |
| (19) | $\Delta\theta gFn1$ | 0.03718 | 0.04076 | 0.02842 | 0.02725 |

TABLE 79

| Expression Number | | Example 5 | Example 6 | Example 7 | Example 8 |
|---|---|---|---|---|---|
| (1) | NdA | 1.89286 | 1.92286 | 2.10420 | 2.00069 |
| (2) | vdA | 20.36 | 18.90 | 17.02 | 25.46 |
| (3) | vdB | 67.73 | 74.70 | 94.66 | 75.50 |
| (4) | vdn1 | 23.02 | 22.62 | 20.89 | 24.40 |
| (5) | $TL \times FNo/f$ | 2.230 | 2.443 | 2.660 | 2.262 |
| (6) | vdC | 67.73 | 74.70 | 94.66 | 75.50 |
| (7) | Ndfm | 1.59522 | 1.53775 | 1.43875 | 1.55032 |
| (8) | Ndpr | 1.90043 | 1.85067 | 1.84786 | 1.86725 |
| (9) | Nd2p | 1.90043 | 1.85067 | 1.84786 | 1.86725 |
| (10) | f1/f | 2.366 | 2.003 | 2.051 | 2.513 |
| (11) | $1/\{\tan(\omega max) \times FNo\}$ | 3.462 | 3.329 | 3.279 | 3.512 |
| (12) | $|f2|/f$ | 0.684 | 0.715 | 0.730 | 0.661 |
| (13) | f1/f2 | 3.457 | 2.800 | 2.808 | 3.800 |
| (14) | $|(1-\beta 2^2) \times \beta r^2|$ | 0.821 | 0.751 | 0.762 | 0.842 |
| (15) | Tf/TL | 0.540 | 0.589 | 0.620 | 0.550 |
| (16) | f/fm | 0.860 | 0.822 | 0.796 | 0.933 |
| (17) | $\Delta\theta gFA$ | 0.03083 | 0.03863 | 0.04909 | 0.01330 |
| (18) | $\Delta\theta gFB$ | 0.01239 | 0.01878 | 0.04578 | 0.02073 |
| (19) | $\Delta\theta gFn1$ | 0.02068 | 0.01986 | 0.02360 | 0.01811 |

TABLE 80

| Expression Number | | Example 9 | Example 10 | Example 11 | Example 12 |
|---|---|---|---|---|---|
| (1) | NdA | 1.92119 | 2.05090 | 1.95375 | 1.92119 |
| (2) | vdA | 23.96 | 26.94 | 32.32 | 23.96 |
| (3) | vdB | 81.61 | 68.62 | 94.66 | 75.50 |
| (4) | vdn1 | 23.02 | 22.73 | 27.01 | 24.10 |
| (5) | $TL \times FNo/f$ | 2.244 | 2.709 | 2.685 | 2.740 |
| (6) | vdC | 81.61 | 68.62 | 90.19 | 67.73 |
| (7) | Ndfm | 1.49700 | 1.56883 | 1.43875 | 1.55032 |
| (8) | Ndpr | 1.88300 | 1.73630 | 1.82897 | 1.78517 |
| (9) | Nd2p | 1.88300 | 1.79841 | 1.93835 | 1.83756 |
| (10) | f1/f | 2.380 | 0.872 | 1.076 | 1.050 |
| (11) | $1/\{\tan(\omega max) \times FNo\}$ | 3.482 | 3.302 | 3.395 | 3.309 |
| (12) | $|f2|/f$ | 0.679 | 0.583 | 0.851 | 0.786 |
| (13) | f1/f2 | 3.503 | — | — | — |
| (14) | $|(1-\beta 2^2) \times \beta r^2|$ | 0.823 | 1.294 | 0.821 | 0.875 |
| (15) | Tf/TL | 0.546 | 0.285 | 0.335 | 0.339 |
| (16) | f/fm | 0.856 | — | 0.925 | 0.955 |
| (17) | $\Delta\theta gFA$ | 0.01748 | 0.00724 | 0.00092 | 0.01748 |
| (18) | $\Delta\theta gFB$ | 0.02949 | 0.01371 | 0.04578 | 0.02073 |
| (19) | $\Delta\theta gFn1$ | 0.02068 | 0.02367 | 0.01127 | 0.01848 |

TABLE 81

| Expression Number | | Example 13 | Example 14 | Example 15 | Example 16 |
|---|---|---|---|---|---|
| (1) | NdA | 2.00069 | 2.00001 | 2.00001 | 2.10420 |
| | | 1.95906 | 1.99166 | 1.98542 | 1.92286 |
| | | — | 2.00001 | 2.00000 | — |
| (2) | vdA | 25.46 | 16.35 | 16.89 | 17.02 |
| | | 17.47 | 26.42 | 25.79 | 20.88 |
| | | — | 15.00 | 15.00 | — |
| (3) | vdB | 94.66 | 94.66 | 94.66 | 60.47 |
| (4) | vdn1 | 26.87 | 22.80 | 24.57 | 22.14 |
| (5) | TL × FNo/f | 4.077 | 4.677 | 4.548 | 4.012 |
| (6) | vdC | 81.54 | 67.73 | 67.73 | — |
| (7) | Ndfm | 1.43875 | 1.43875 | 1.43875 | 1.59410 |
| (8) | Ndpr | 1.84950 | 1.64162 | 1.82040 | 1.79175 |
| (9) | Nd2p | 1.81272 | 1.71964 | 1.80692 | 1.81305 |
| (10) | f1/f | 3.011 | 2.883 | 2.441 | 2.818 |
| (11) | $1/\{\tan(\omega max) \times FNo\}$ | 2.132 | 1.939 | 2.021 | 2.248 |
| (12) | |f2|/f | 1.395 | 1.501 | 1.493 | 1.281 |
| (13) | f1/f2 | 2.158 | 1.921 | 1.634 | 2.200 |
| (14) | $|(1-\beta 2^2) \times \beta r^2|$ | 0.890 | 0.880 | 0.832 | 0.900 |
| (15) | Tf/TL | 0.696 | 0.713 | 0.713 | 0.691 |
| (16) | f/fm | 0.589 | 0.588 | 0.630 | 0.689 |
| (17) | ΔθgFA | 0.01330 | 0.03483 | 0.03363 | 0.04909 |
| | | 0.04664 | 0.01225 | 0.01358 | 0.03124 |
| | | — | 0.03786 | 0.03786 | — |
| (18) | ΔθgFB | 0.04578 | 0.04578 | 0.04578 | 0.01153 |
| (19) | ΔθgFn1 | 0.02590 | 0.01910 | 0.01733 | 0.03186 |

TABLE 82

| Expression Number | | Example 17 | Example 18 | Example 19 | Example 20 |
|---|---|---|---|---|---|
| (1) | NdA | 2.00069 | 2.00272 | 1.88018 | 1.98613 |
| | | 1.95906 | — | 1.99999 | |
| (2) | vdA | 25.46 | 19.32 | 21.34 | 16.48 |
| | | 17.47 | — | 15.00 | — |
| (3) | vdB | 94.66 | 60.29 | 58.19 | 68.62 |
| (4) | vdn1 | 26.43 | 25.60 | 22.03 | 24.08 |
| (5) | TL × FNo/f | 4.728 | 4.324 | 4.310 | 4.269 |
| (6) | vdC | 68.62 | — | — | 68.62 |
| (7) | Ndfm | 1.43875 | 1.62041 | 1.66628 | 1.59282 |
| (8) | Ndpr | 1.87685 | 1.84335 | 1.87306 | 1.74707 |
| (9) | Nd2p | 1.82640 | 1.84335 | 1.87306 | 1.87685 |
| (10) | f1/f | 2.675 | 1.780 | 1.921 | 1.685 |
| (11) | $1/\{\tan(\omega max) \times FNo\}$ | 2.127 | 2.145 | 2.132 | 2.107 |
| (12) | |f2|/f | 1.611 | 0.985 | 1.099 | 1.208 |
| (13) | f1/f2 | 1.660 | 1.806 | 1.748 | 1.395 |
| (14) | $|(1-\beta 2^2) \times \beta r^2|$ | 0.860 | 0.822 | 0.729 | 0.595 |
| (15) | Tf/TL | 0.705 | 0.677 | 0.669 | 0.669 |
| (16) | f/fm | — | — | — | — |
| (17) | ΔθgFA | 0.01330 | 0.03485 | 0.01916 | 0.05069 |
| | | 0.04664 | — | 0.03786 | — |
| (18) | ΔθgFB | 0.04578 | −0.00126 | −0.00476 | 0.01371 |
| (19) | ΔθgFn1 | 0.01694 | 0.01795 | 0.01734 | 0.01971 |

The F numbers of the imaging lenses of Examples 1 to 20 are smaller than 2. In particular, the F numbers of the imaging lenses of Examples 1 to 9 are smaller than 1.2. The imaging lens of Examples 1 to 20 have such a small F number, reduction in size is achieved, and various aberrations are satisfactorily corrected, whereby high optical performance is achieved.

Figure 61:
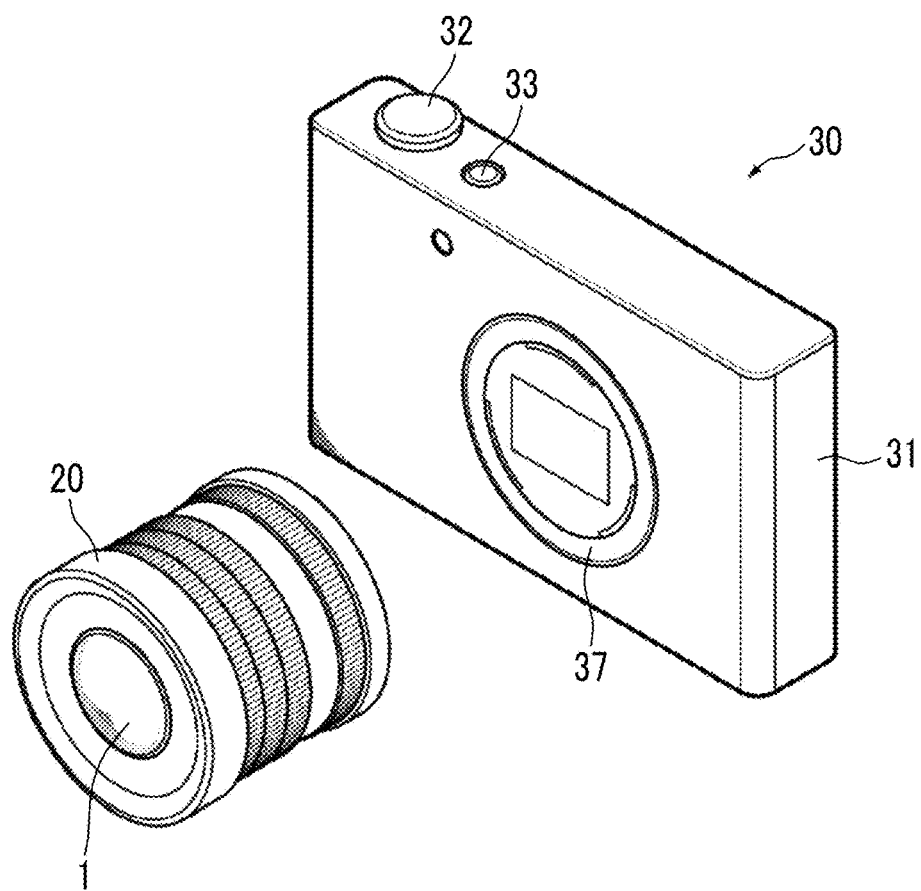
FIG. 61 is a perspective view of the front side of an imaging apparatus according to an embodiment.
Figure 62:
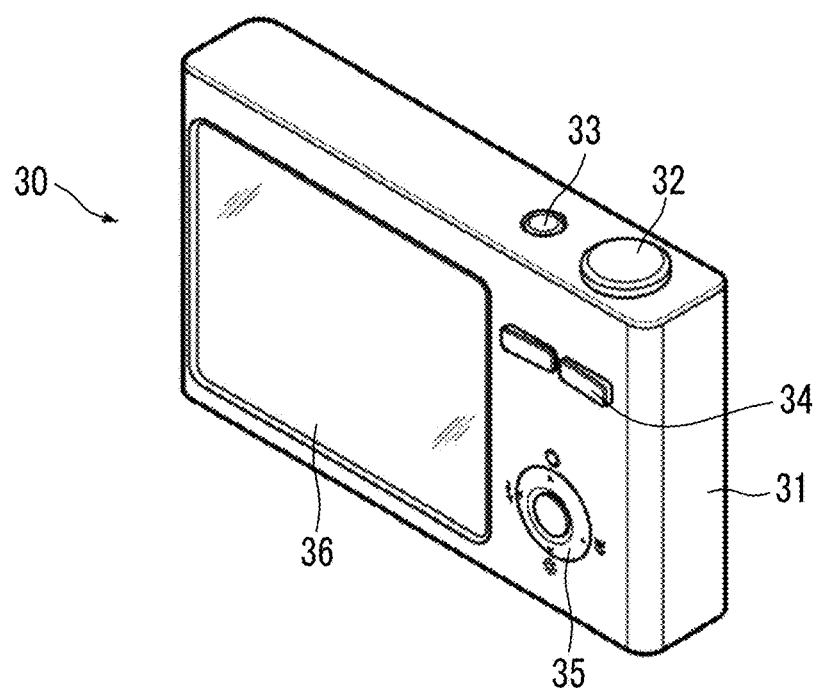
FIG. 62 is a perspective view of the rear side of an imaging apparatus according to an embodiment.

Next, an imaging apparatus according to an embodiment of the present disclosure will be described. FIGS. 61 and 62 are external views of a camera 30 which is the imaging apparatus according to the embodiment of the present disclosure. FIG. 61 is a perspective view of the camera 30 viewed from the front side, and FIG. 62 is a perspective view of the camera 30 viewed from the rear side. The camera 30 is a so-called mirrorless type digital camera, and the interchangeable lens 20 can be detachably attached thereto. The interchangeable lens 20 includes the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operation section 34, an operation section 35, and a display section 36 are provided on a rear surface of the camera body 31. The display section 36 displays a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video by pressing the shutter button 32, and is able to store image data, which is obtained through imaging, in the storage medium.

The technology of the present disclosure has been hitherto described through embodiments and examples, but the technology of the present disclosure is not limited to the abovementioned embodiments and examples, and may be modified into various forms. For example, values such as the radius of curvature, the surface distance, the refractive index, the Abbe number, and the aspheric surface coefficient of each lens are not limited to the values shown in the numerical examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens comprising, as lens groups, only three lens groups consisting of, in order from an object side to an image side: a first lens group that has a positive refractive power; a second lens group that has a refractive power; and a third lens group that has a refractive power, wherein during focusing from an object at infinity to a closest object, only the second lens group moves along an optical axis, during focusing, a distance between the first lens group and the second lens group changes, a distance between the second lens group and the third lens group changes, and mutual distances between all lenses in the first lens group, mutual distances between all lenses in the second lens group, and mutual distances between all lenses in the third lens group are constant, the first lens group includes at least two negative lenses, the number of positive single lenses included in the first lens group is three, the second lens group includes a negative lens at a position closest to the object side, a lens surface closest to the image side in the second lens group is concave, the imaging lens includes, within the lens groups, successively in order from a position closest to the image side to the object side, a first image side lens as a negative single lens of which an object side lens surface is concave, a second image side lens as a biconvex single lens, a third image side lens as a negative lens of which an image side lens surface is concave, a fourth image side lens as a positive lens, and a fifth image side lens as a biconvex single lens, the number of biconvex single lenses included in the imaging lens is three, including the second image side lens and the fifth image side lens, a stop is disposed closer to the object side than the fifth image side lens, and closer to the image side than a lens that is second from the object side in the first lens group, a cemented lens, in which a biconcave lens and a positive lens of which an object side surface is convex are cemented in this order from the object side to the image side, is disposed adjacent to an object side of the stop, and assuming that:

a sum of a distance on the optical axis from a lens surface closest to the object side to a lens surface closest to the image side and a back focal length at an air-converted distance in a state where the object at infinity is in focus is TL, an F number of the imaging lens in the state where the object at infinity is in focus is FNo, a focal length of the imaging lens in the state where the object at infinity is in focus is f, and a focal length of the second lens group is f2, Conditional Expressions (5-3) and (12-6) are satisfied, which are represented by $$2.685 \leq TL \times FNo/f < 5 \qquad (5\text{-}3), \text{ and}$$

$$0.786 \leq |f2|/f < 2.2 \qquad (12\text{-}6).$$

2. The imaging lens according to claim 1,
wherein the second lens group has a negative refractive power, and
the third lens group has a positive refractive power.

3. The imaging lens according to claim 2,
wherein
an image side surface of the fourth image side lens is convex.

4. The imaging lens according to claim 2, wherein Conditional Expression (12-7) is satisfied, which is represented by $$0.786 \leq |f2|/f < 1.9 \qquad (12\text{-}7).$$

5. The imaging lens according to claim 1,
wherein
an image side surface of the fourth image side lens is convex.

6. The imaging lens according to claim 5, wherein Conditional Expression (12-7) is satisfied, which is represented by $$0.786 \leq |f2|/f < 1.9 \qquad (12\text{-}7).$$

7. The imaging lens according to claim 1, wherein Conditional Expression (12-7) is satisfied, which is represented by $$0.786 < |f2|/f < 1.9 \qquad (12\text{-}7).$$

8. The imaging lens according to claim 1, wherein the number of lenses disposed closer to the object side than the stop is eight or less.

9. The imaging lens according to claim 1, wherein the number of lenses disposed closer to the object side than the stop is seven or less.

10. An imaging apparatus comprising the imaging lens according to claim 1.

* * * * *